United States Patent [19]
Widney

[11] Patent Number: 5,115,358
[45] Date of Patent: May 19, 1992

[54] CONFIGURABLE DISK MEMORY SERVOWRITER

[75] Inventor: Douglas F. Widney, Camarillo, Calif.

[73] Assignee: Data Exchange Corporation, Camarillo, Calif.

[21] Appl. No.: 618,511

[22] Filed: Nov. 20, 1990

Related U.S. Application Data

[63] Continuation of Ser. No. 265,837, Nov. 1, 1988, abandoned.

[51] Int. Cl.⁵ .............................................. G11B 31/00
[52] U.S. Cl. ...................................... 360/75; 364/716
[56] References Cited

U.S. PATENT DOCUMENTS

| | | |
|---|---|---|
| 4,371,902 | 2/1983 | Baxter et al. . |
| 4,414,589 | 11/1983 | Oliver et al. . |
| 4,531,167 | 7/1985 | Berger ................. 360/77.02 |
| 4,584,619 | 4/1986 | Nay et al. . |
| 4,724,307 | 2/1988 | Dutton et al. . |

OTHER PUBLICATIONS

XILINX, *The Programmable Gate Array Data Book*, 1988.

*Primary Examiner*—Aristotelis Psitos
*Assistant Examiner*—David L. Robertson

[57] ABSTRACT

A servo pattern writer which may be programmed to write a selected servo pattern for a magnetic disk drive memory is provided. The servo pattern writer includes logic circuitry of which the logic functions and interconnections may be configured as appropriate in response to the configuration program to generate the desired servo pattern.

5 Claims, 22 Drawing Sheets

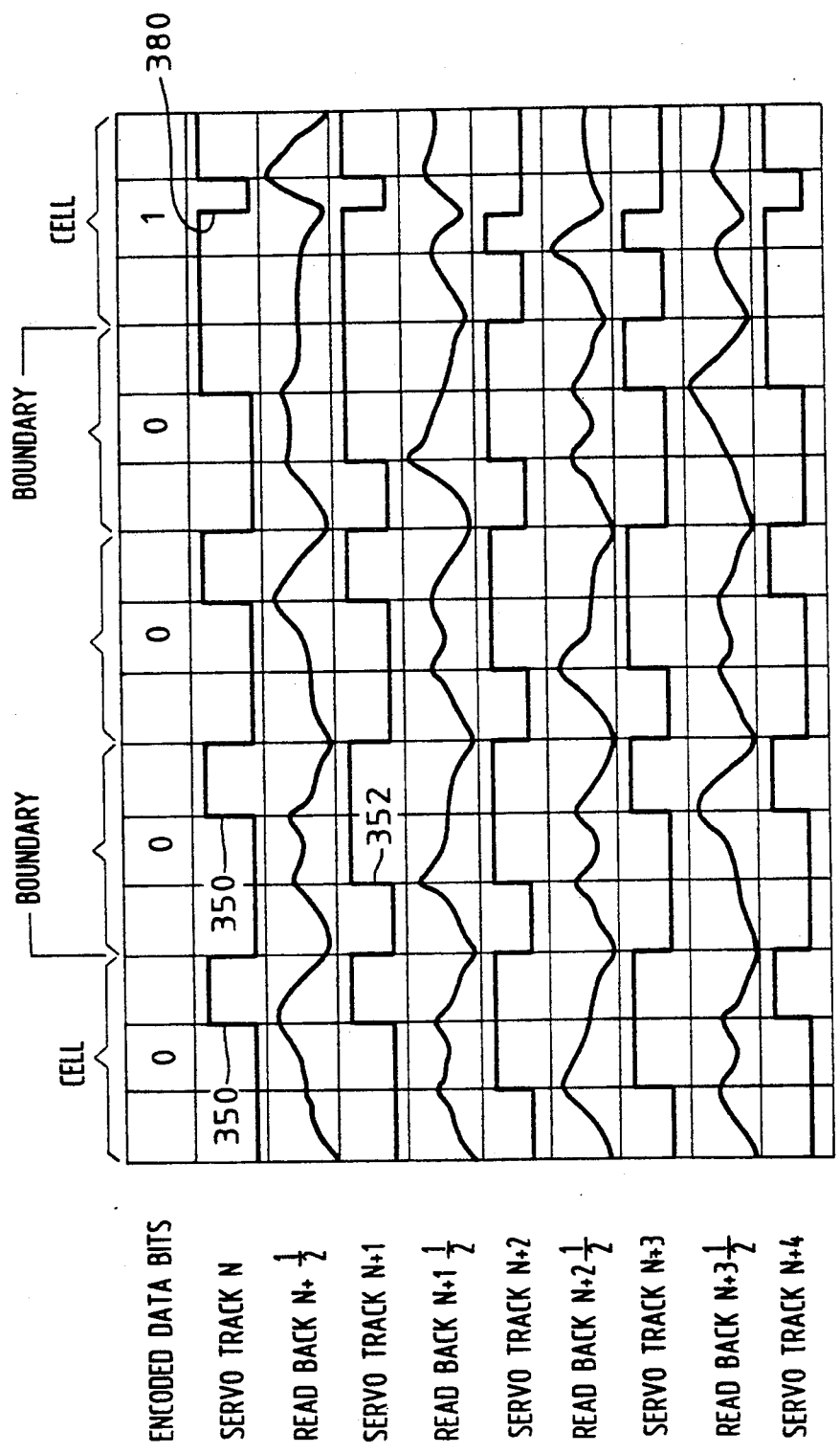
FIG. 2  PRIAM MODEL 6650 SERVO WAVEFORMS

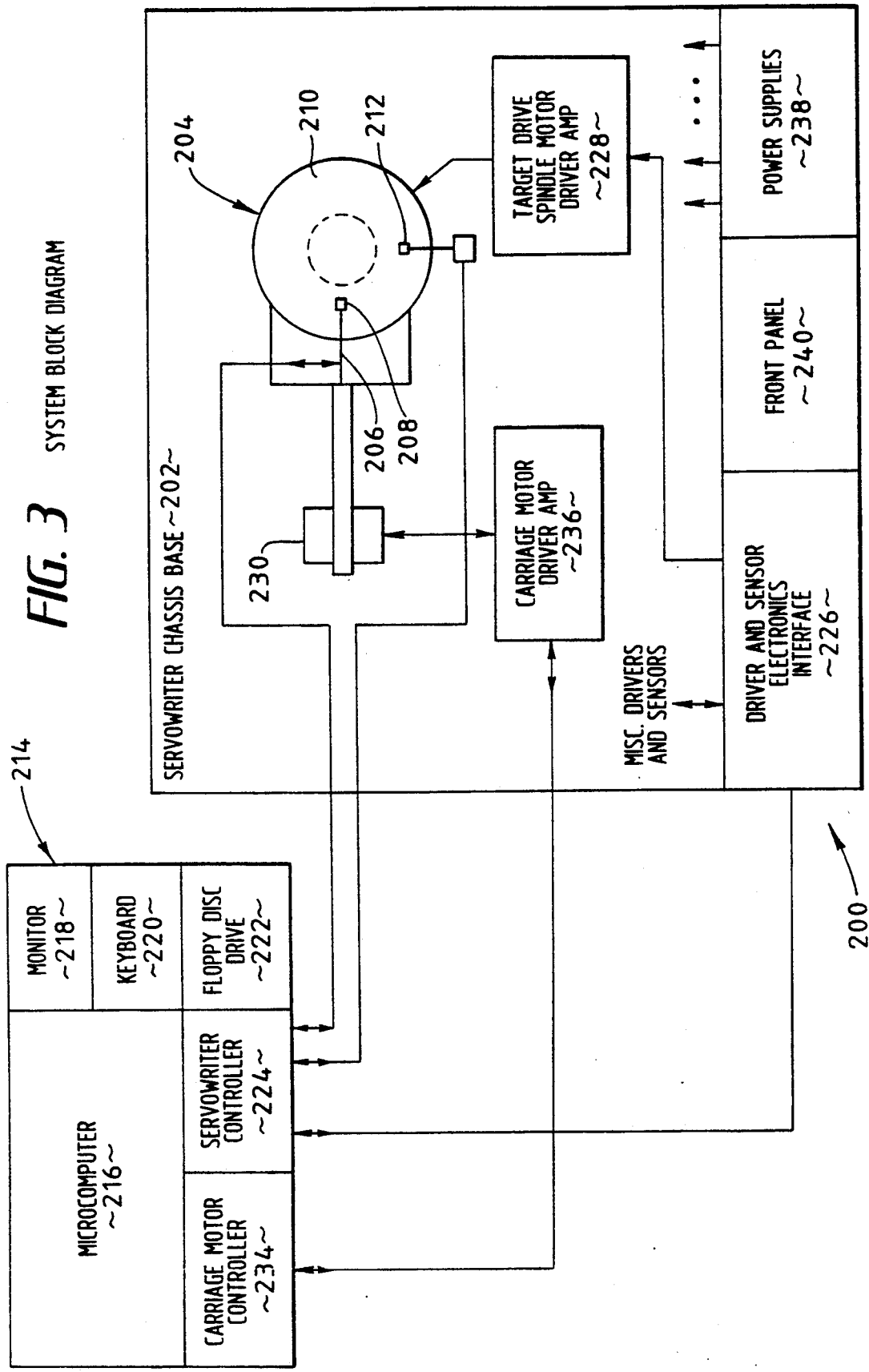

FIG. 4A
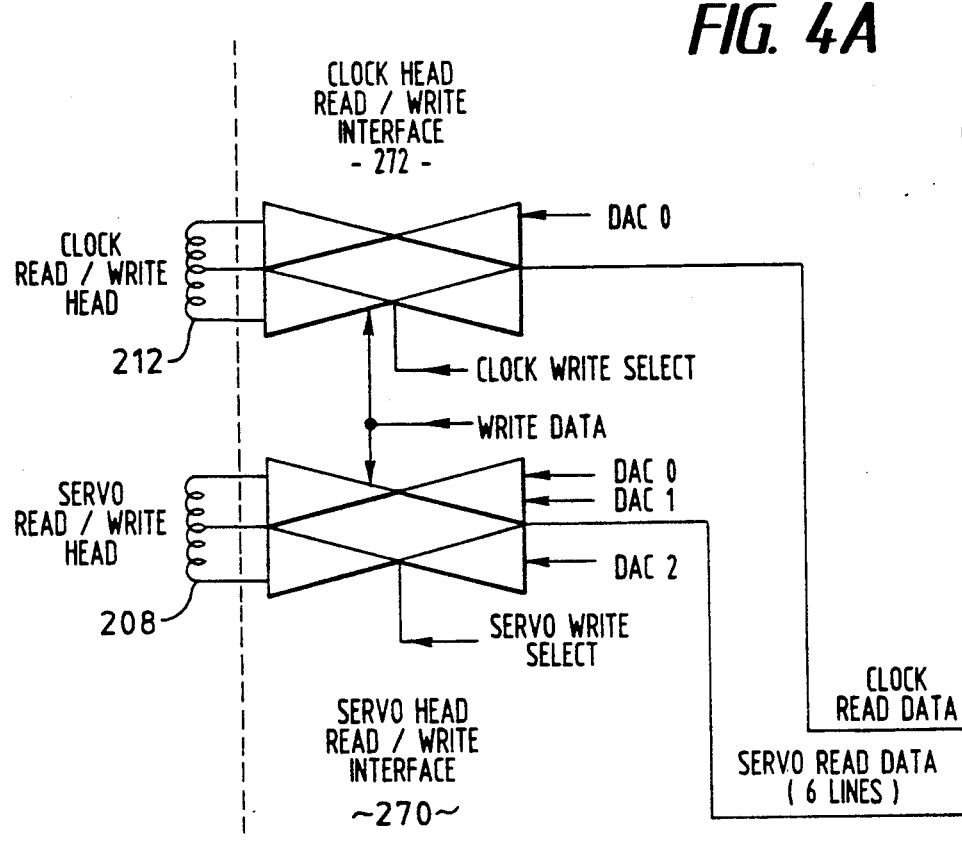
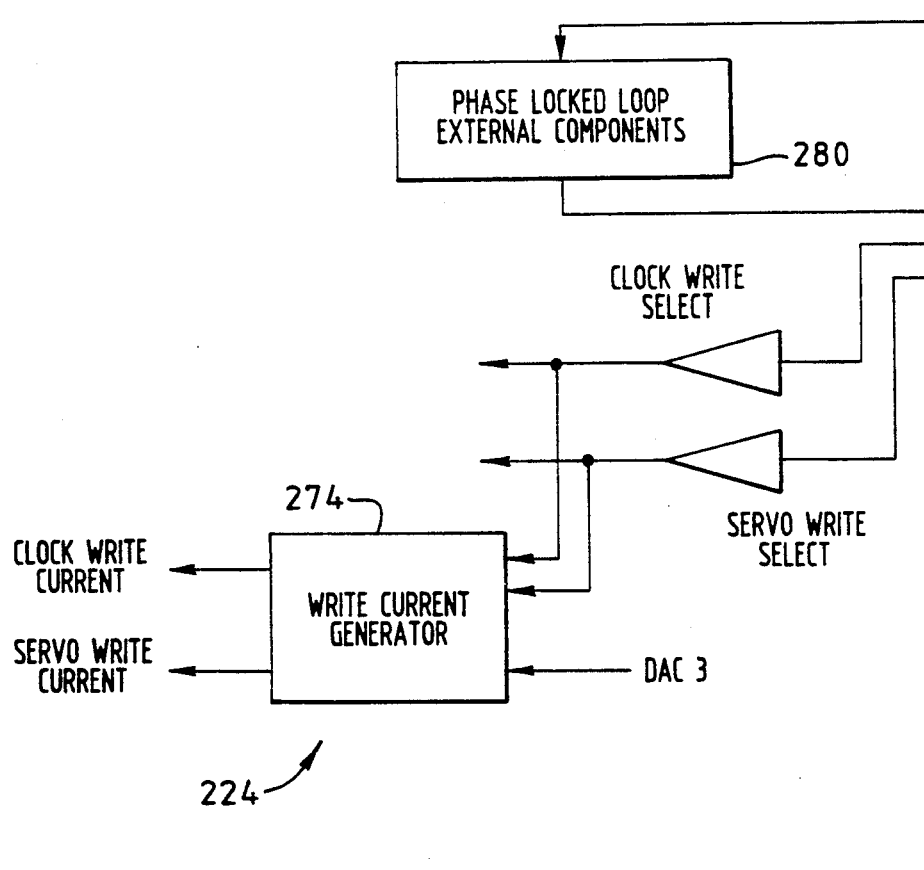

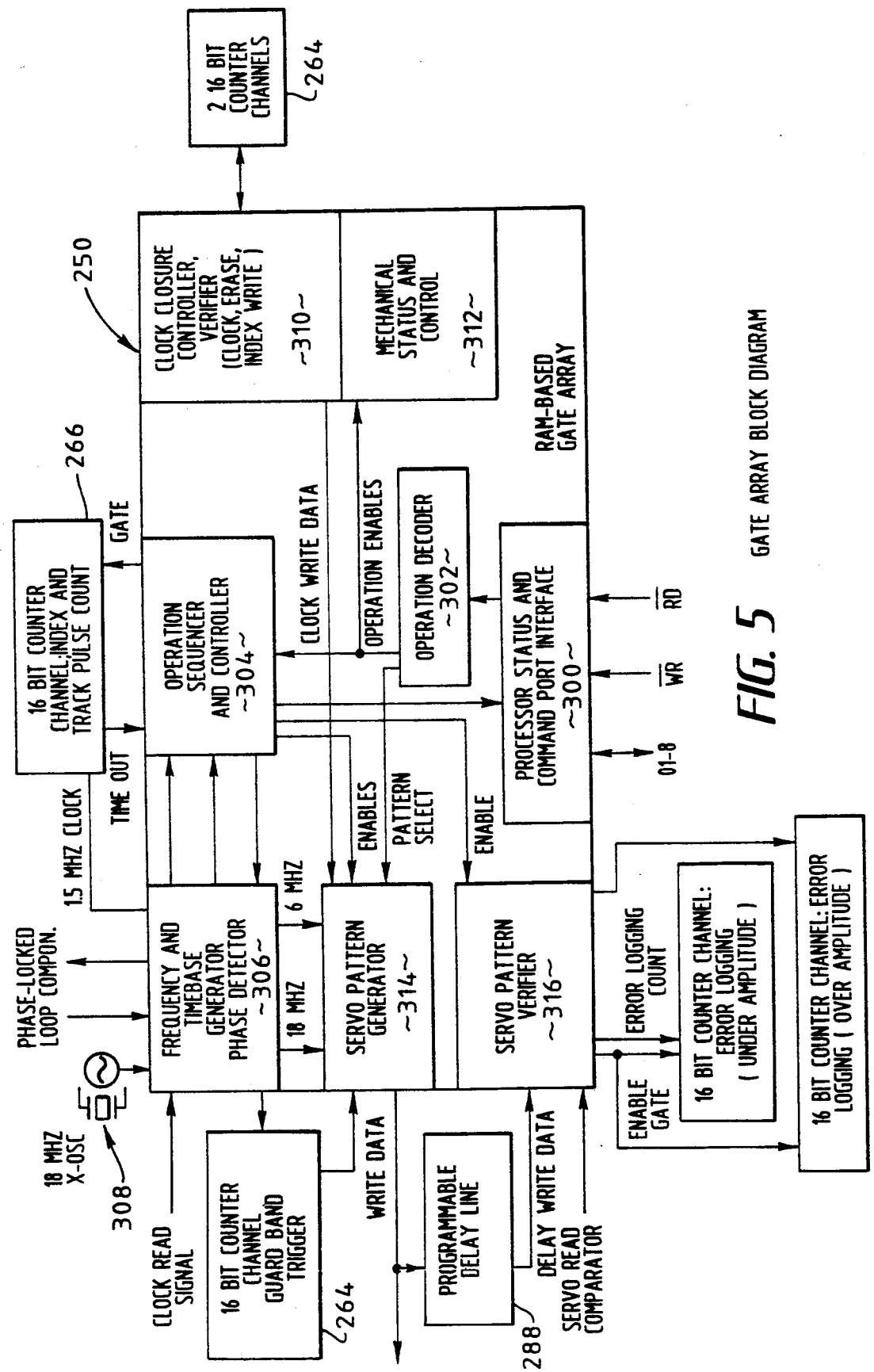
FIG. 5    GATE ARRAY BLOCK DIAGRAM

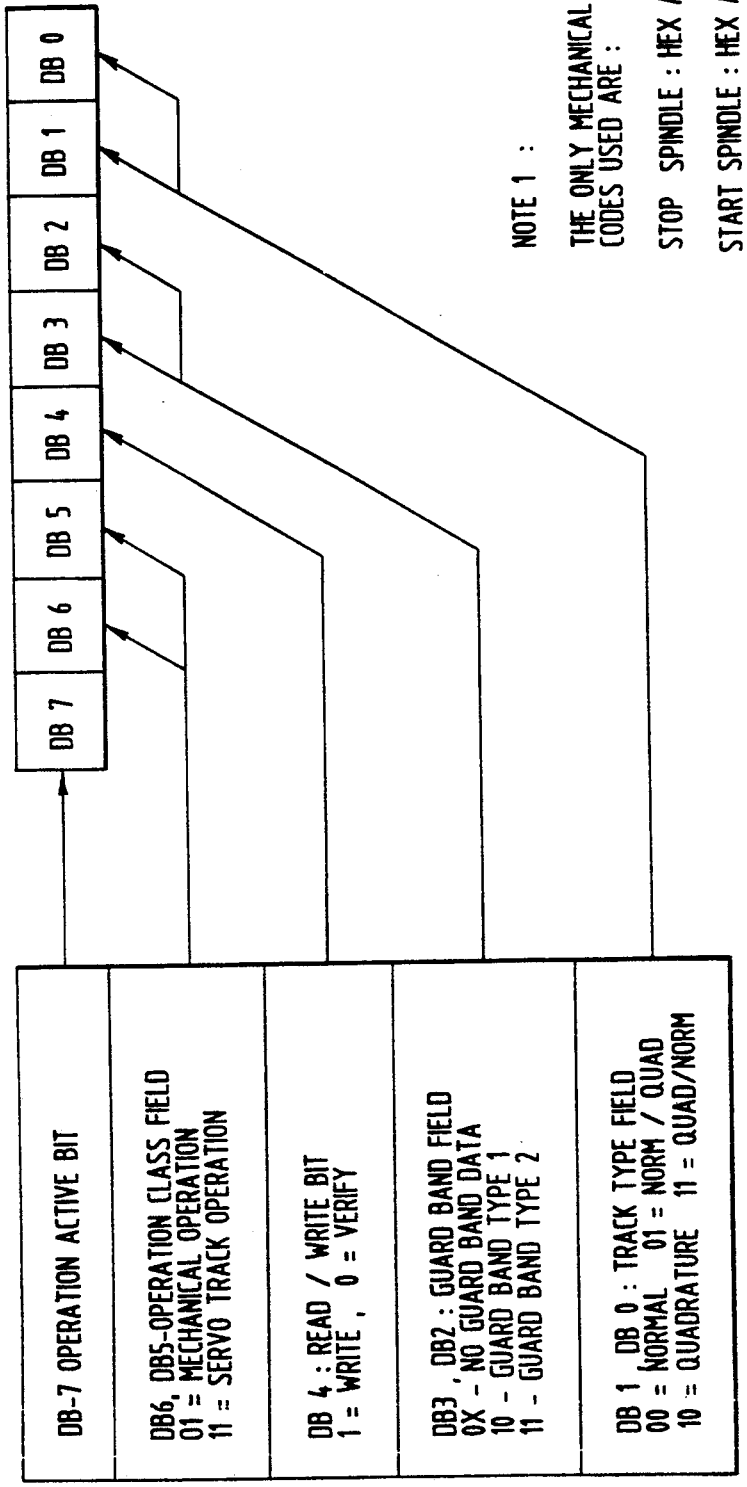

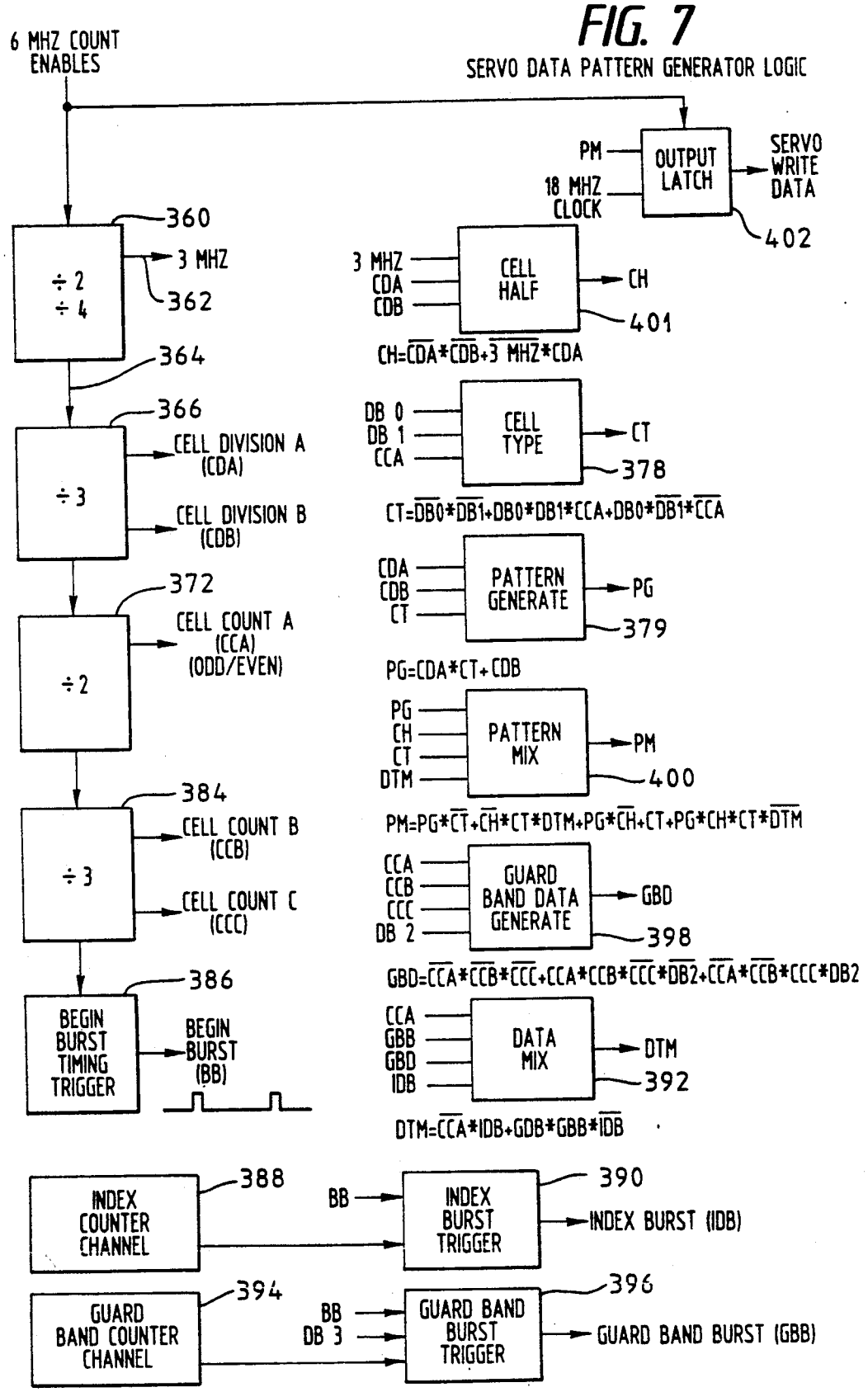

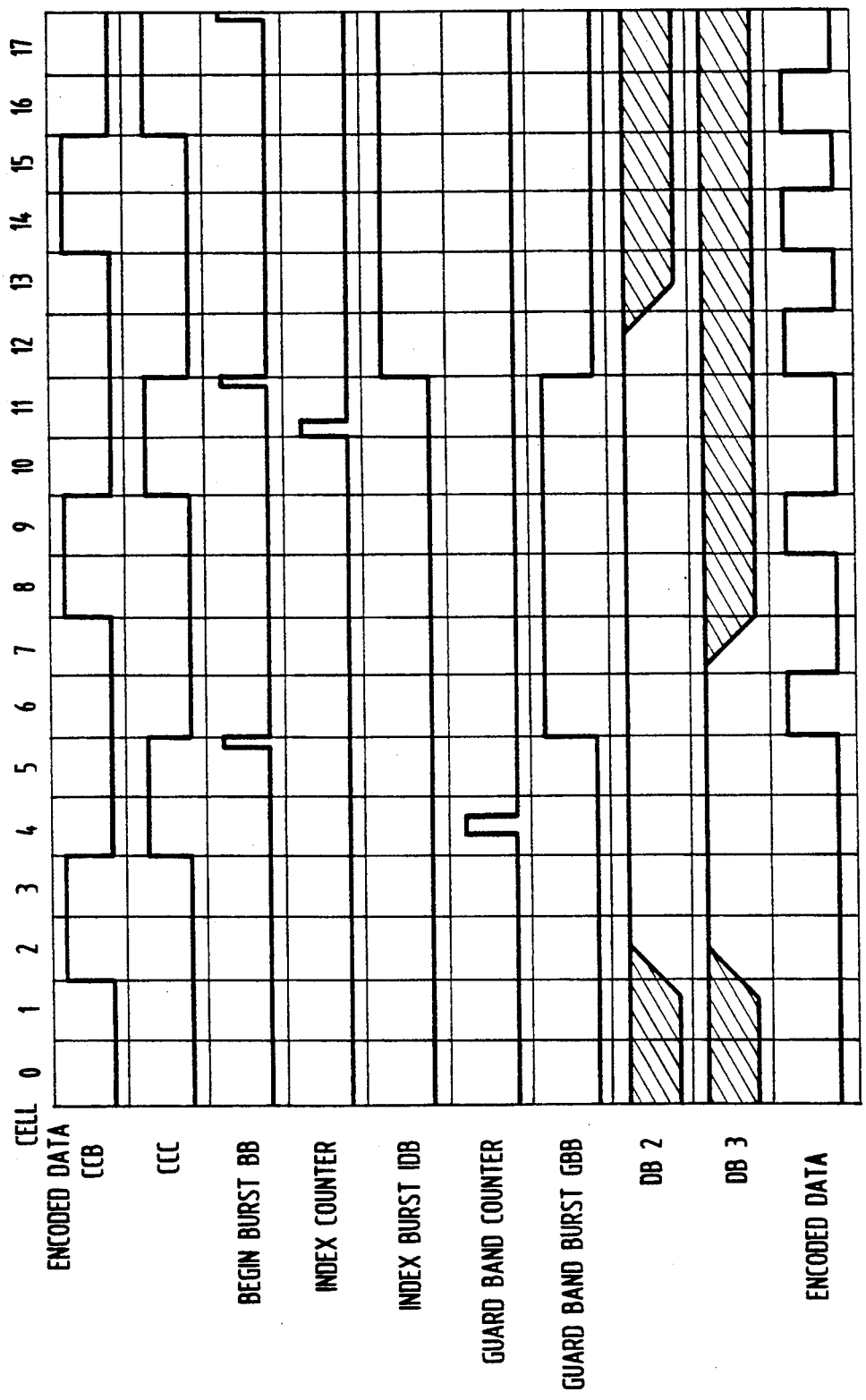

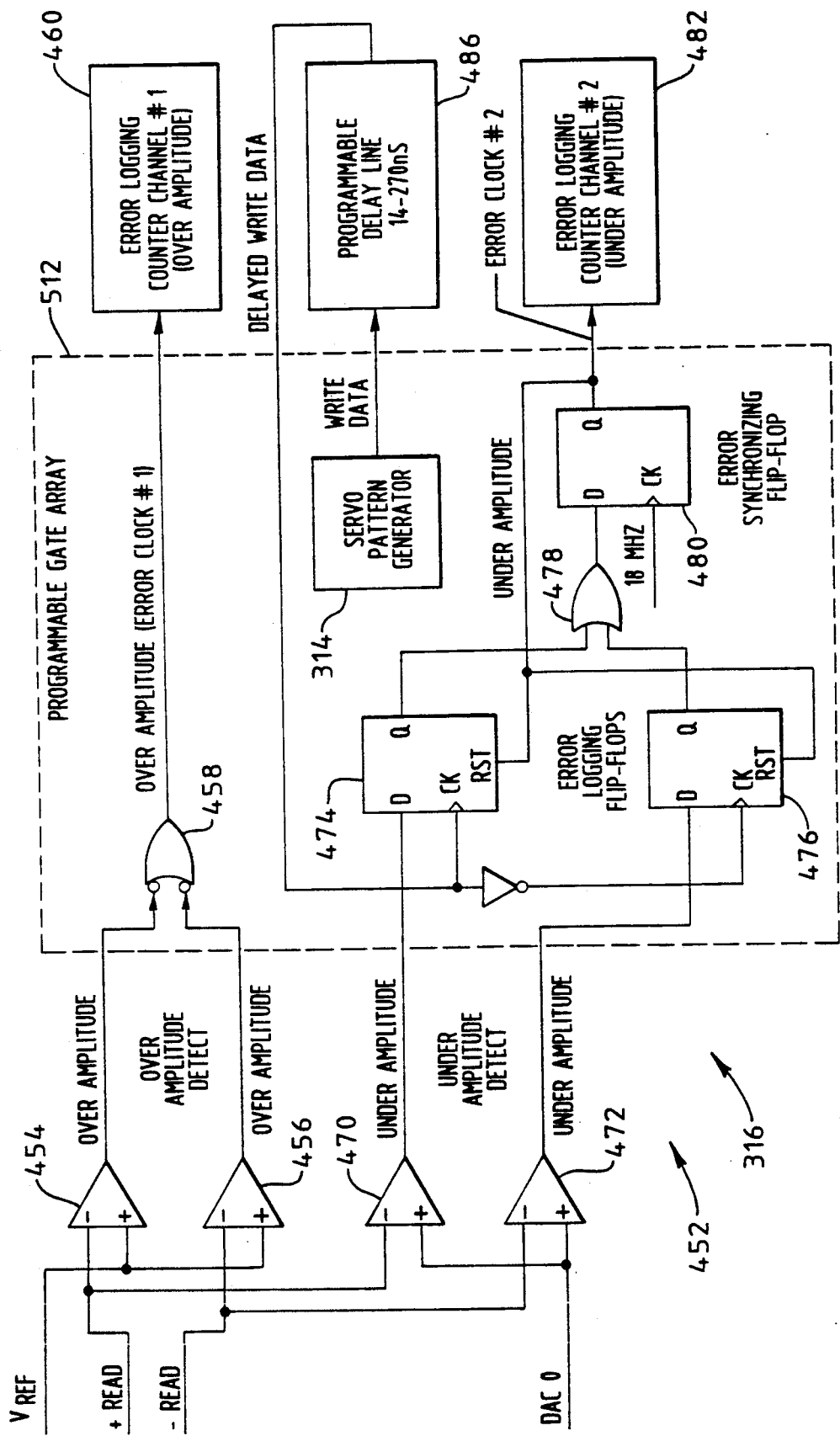
FIG. 9 PATTERN VERIFIER DETAIL

FIG. 11 MECHANISM CONTROLS AND SENSORS

FIG. 12    LOGIC CELL ARRAY STRUCTURE

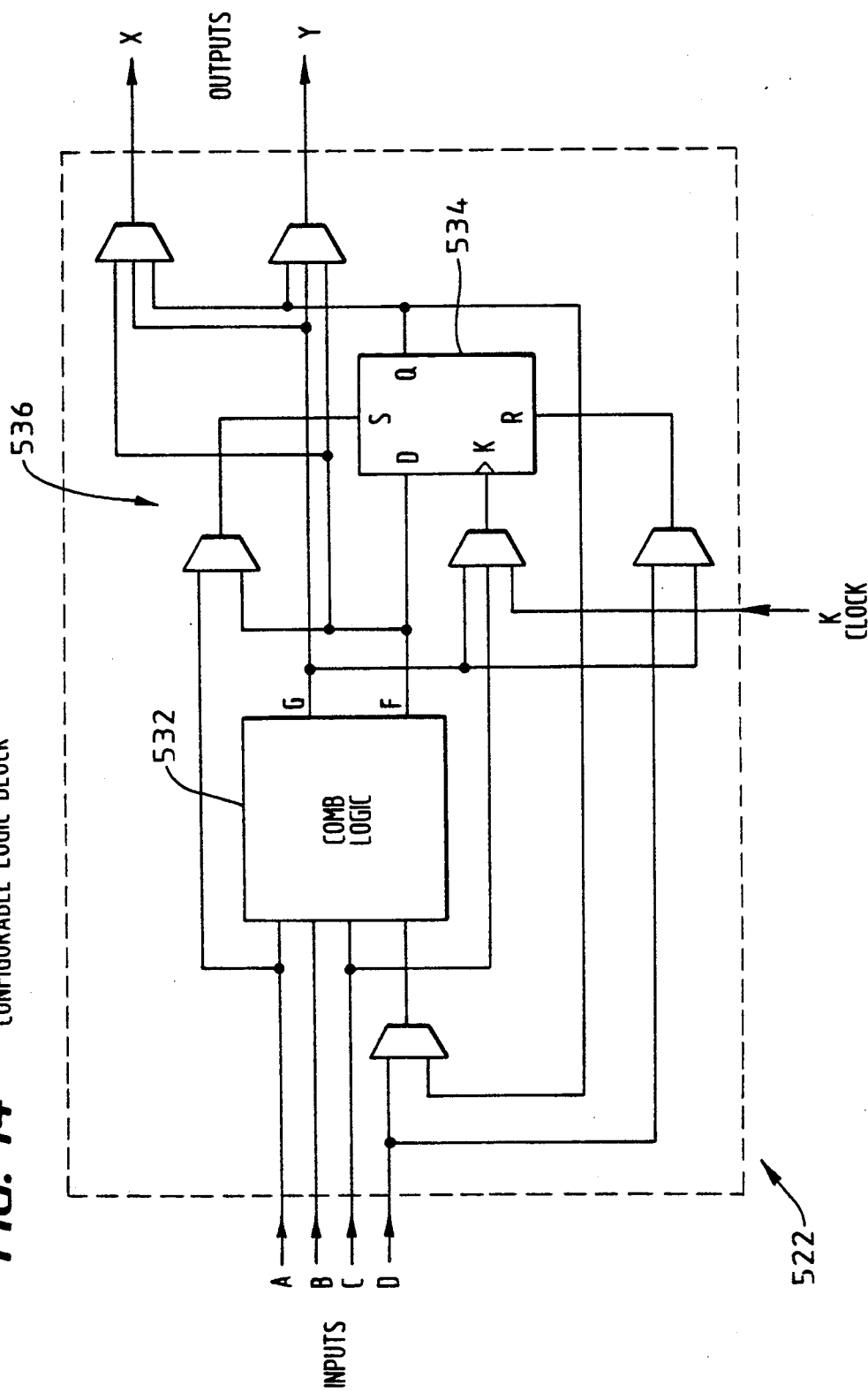
FIG. 14 CONFIGURABLE LOGIC BLOCK

GENERAL PURPOSE INTERCONNECT

FIG. 17 INTERCONNECTION SWITCHING MATRIX

SERVO WRITING FLOW CHART

CONFIGURABLE DISK MEMORY SERVOWRITER

This is a continuation of application Ser. No. 265,837 filed on Nov. 1, 1988, now abandoned.

BACKGROUND OF THE INVENTION

1. Field of the Invention present invention relates to servo-writers for magnetic disk drive memories.

2. Description of Related Art

Magnetic disk drive memories are well-known devices for storing large quantities of digital data. An example of a typical disk drive is indicated generally at 10 in FIG. 1. As the name suggests, a disk drive has one or more disks 12 coated with a magnetizable medium such as ferrous oxide on which the data may be magnetically stored. The disks, often referred to as platters, may be vertically stacked and caused to rotate about a central spindle 14. Data may be stored or "written" onto each surface of the media platters by read-write data heads 16 which are placed in close physical proximity to the surface of a platter. By passing a current through a read-write head, a small portion of the surface of the associated platter may be magnetized to form a magnetic domain and store a digital 1 or 0 onto the platter.

Typically, the read-write heads 16 are rigidly coupled to each other in a vertical stack, and may be moved together as an assembly 20 in a radial motion by a positioning mechanism 22 either towards or away from the spindle 14 of the platter stack. At each position of a head of the head stack, a unique circular track is defined in the surface of the associated platter as the platter rotates below the head. To read data written on the circular data tracks, currents induced in the read-write data heads by the magnetic domains on the media platter are sensed and amplified for transmission to other parts the computer system.

As data storage densities have increased, the spacing between data tracks has decreased. Many disk drives now have in excess of 2,000 tracks per inch of radial head movement. At such densities, special positioning mechanisms referred to as "servos", have been used to ensure proper positioning of the data heads over the data tracks of the disk drive. The servo mechanism of FIG. 1 includes a servo head 24 which reads position information from a special pattern of servo tracks written onto a surface 26 of one of the platters.

One type of servo system is referred to as the "dedicated servo" and employs a servo pattern written to the entirety of the platter surface 26. The position information read by the servo head is the sole source of positioning information for the head assembly.

Where high densities of data are required, the servo pattern is typically written by a special device referred to as a "servo pattern writer" or simply a "servowriter". To position the servo head for writing the servo pattern, a servowriter typically includes a precision lead screw mechanism which is usually controlled by an extremely accurate position control system such as a laser interferometer or an extremely high resolution optical encoder. The servo pattern to be written is typically generated by high speed, precisely clocked logic circuitry. Each disk drive manufacturer often has its own unique servo pattern which may even vary from model to model of the same manufacturer.

FIG. 2 illustrates a servo pattern for a model 6650 disk drive, manufactured by Priam Corporation. The servo pattern when read, allows the servo system to generate an error position signal relative to the current track being read. Often, the patterns of positioning pulses of the servo pattern are alternated from track to track to define "odd" and "even" servo tracks. The equilibrium position of the servo head is usually halfway between adjacent odd and even servo tracks. Thus, the signal read back from the servo head will be a composite of these adjacent even and odd tracks.

The servo system compares the amplitudes of the pulses of the read back signal at odd and even track positioning pulse time windows to generate a position error signal. When the servo head is centered precisely between the odd and even tracks, the odd and even position read back signals will be equal in amplitude, generating no error signal. However, if the servo head is off center between the even and odd tracks, an error signal is generated which is used to reposition the servo head appropriately. Since the data heads are coupled to the servo head, the data heads will follow the movement of the servo head. In this manner, the circular tracks of the servo pattern defines the data tracks on the other surfaces of the platter stack.

The servo pattern also can provide a timing reference. Typically, special timing reference pulses are included in the pattern in a manner in which the pulses can be detected, allowing a phase-locked loop to lock to the timing reference pulses during operation.

Another function of the servo pattern is to provide special position information to the servo system. For example, data may be encoded into the pattern to provide index and sector mark signals, indicating the angular position of the platter stack. Similarly, servo tracks outside of the range of data tracks may be encoded to form guard band zones.

Two primary types of servowriters are custom servowriters and configurable or universal servowriters. A custom servowriter is generally capable of writing a servo pattern for only one particular model of disk drives. Consequently, these servowriters typically generate only one type of servo pattern at a fixed frequency and are generally capable of positioning the heads at a single fixed track density.

Configurable or universal servowriters, on the other hand, are designed to be able to write a variety of servo patterns at different frequencies and track densities. The configurability or programmablity of a servowriter is highly desirable for several reasons. For example, the development of a particular disk drive must by accompanied by or perhaps even preceded by the availability of a servowriter which is capable of writing the servo pattern for that disk drive. Once a servowriter has been designed and constructed to write the selected servo pattern for a particular disk drive, a dedicated servowriter inhibits any modifications to the servo pattern. Furthermore, servowriters are relatively expensive devices, the cost of which can be ammortized more effectively if the servowriter can be adapted to other, or future disk drive designs. Still further, a servowriter which may be used for many different disk drive types is highly desirable for use in disk drive service and repair.

However, previous configurable servowriters have tended to be much more expensive than custom servowriters. For example, U.S. Pat. No. 4,584,619 to Nay, et al. describes a programmable servo pattern generator for a configurable servowriter which employs a pattern programming hierarchy. Different levels of pattern repetition are included in the hierarchy such as "cell", "frame", "sector", and "track type". The contents, length and repetition count of each level are programmable to an extent. A phase-locked loop of very high frequency (>80 megahertz) enables the user to write the pattern transitions at any arbitrary interval subject to a small quantization error. The clock frequency is programmable. A wide selection of sensor, driver and power options, with elaborate programmable controls, may also be provided as an interface to the disk drive mechanism. One problem with this approach is that in addition to being quite expensive, the resultant servowriter is quite complex and bulky.

SUMMARY OF THE INVENTION

It is an object of the present invention to provide an improved servowriter, obviating for practical purposes, the above-mentioned limitations, particularly in a manner requiring a relatively uncomplicated electronic arrangement.

These and other objects and advantages are achieved in a configurable servo pattern writer which includes, in accordance with a preferred embodiment of the present invention, a plurality of logic gates coupled to the output of a clock, and programmable interconnection circuitry for interconnecting the logic gates in response to a logic gate interconnection program so that the output of the logic gates is a selected servo pattern. As will be explained more fully below in connection with the detailed description of the present embodiment, the servo pattern to be written may be readily changed by supplying an appropriate logic gate interconnection program to the plurality of logic gates.

In another aspect of the present invention, the logic gate interconnection program may readily accommodate the particular hardware control requirements of the particular disk drive. Similarly, a variety of clock closure and phase-locked loop requirements may be readily met.

In the illustrated embodiment, the plurality of logic gates are incorporated in a single integrated circuit which includes a gate array. The logic design for the logic gates of the array may be programmed by the contents of an onboard static random access memory. Consequently, a servo pattern writer, in accordance with the present invention, has significant flexiblity and capability and a significant reduction in complexity and cost.

BRIEF DESCRIPTION OF THE DRAWINGS

FIG. 2 illustrates a representative servo pattern and corresponding read back signals;

FIG. 3 is a schematic diagram of a servo pattern writer in accordance with a preferred embodiment of the present invention;

FIG. 4A and 4B are a schematic diagram of a controller circuit for the servowriter of the FIG. 3;

FIG. 5 is a schematic diagram of a gate array circuit for the controller of FIG. 4;

FIG. 6 depicts the command word format for the gate array or FIG. 5;

FIG. 7 is a schematic diagram illustrating the servo data pattern generator logic of the gate array of FIG. 5;

FIGS. 8A and 8B are timing diagrams for various signals produced by the servo data pattern generator logic of FIG. 7;

FIG. 9 is a schematic diagram of the servo pattern verifier logic of the gate array of FIG. 5;

FIG. 14 is a schematic diagram of a configurable logic block of the gate array of FIG. 12;

DETAILED DESCRIPTION OF THE DRAWINGS

Figure 1:
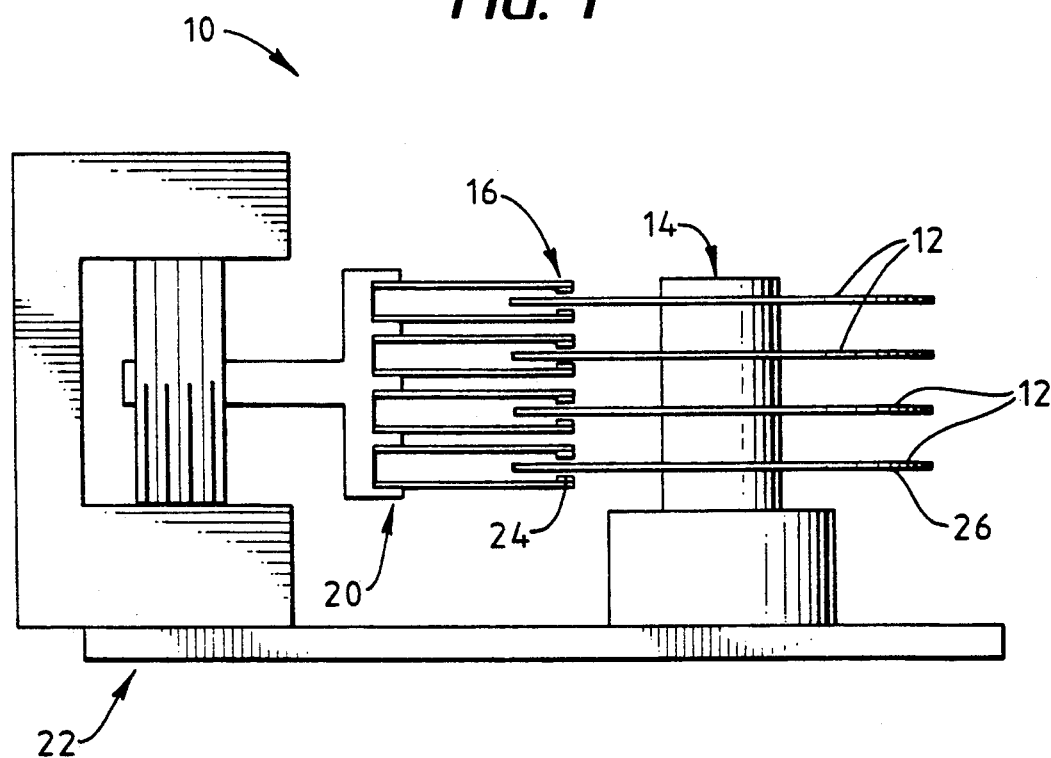
FIG. 1 is a schematic diagram of a typical disk drive.

A configurable servo pattern writer in accordance with a preferred embodiment of the present invention is indicated generally at 200. The servo pattern writer (hereinafter "servowriter") 200 includes a chassis base 202 on which a disk drive 204 may be securely mounted by appropriate removable clamps (not shown). The clamps and chassis base 202 are preferably readily adaptable to receive a variety of different disk drives. Also mounted on the chassis base 202 is a carriage arm 206 which radially moves a servo head 208 over the servo surface 210 of the disk drive 204. A clock head 212 is mounted at a fixed radius over the servo surface 210. An actuator (not shown) may be provided to lower the head 212 over the media surface once the disk drive 204 is secured on the chassis base 202 to initiate the servowriting process, and to raise the clock head once the process is complete.

The servo pattern writing process is controlled by a controller station 214 which, in the illustrated enbodiment, includes a microcomputer 216 which may be, for example, an IBM compatible personal computer. The microcomputer 216 has an associated monitor 218, keyboard 220, and floppy disk drive 222. The servo pattern to be written onto the disk drive 204 is generated by a servowriter controller 224 which also controls the spindle motor of the disk drive 204.

In one aspect of the present invention, the servowriter controller 224 comprises gate array logic which may be programmed by the microcomputer 216 to be interconnected in a particular configuration to generate the desired servo pattern. In the illustrated embodiment, the programmable gate array logic and associated peripheral circuits may be mounted on a single printed circuit board which may be received by an expansion slot in the microcomputer 216. As a consequence, the controller station 214 need be no larger than a standard personal computer.

The servowriter controller 224 is coupled to the servowriter chassis base 202 and disk drive 204 by a driver and sensor electronics interface 226 which includes drivers and sensors for the clock head actuator and sensors for the spindle and carriage arm 206. In addition, the spindle motor of the disk drive 204 is driven through a driver amplifier 228 coupled to the interface 226.

In the illustrated embodiment, the servo head 208 attached to the carriage arm 206 is positioned by an actuator 230 which includes a precision lead screw having a pitch of 40 turns per inch. The lead screw is driven by a D.C. permanent magnet motor which is controlled by a type DMC-400 motor control system manufactured by Galil Enterprises. The DMC-400 system includes a carriage motor controller board 234 which, like the servo controller board 224, readily plugs into an expansion slot in the microcomputer 216. The output of the controller 234 drives the carriage motor of the actuator 230 through a carriage motor amplifier 236.

The DMC-400 controller 234 includes a high-speed microprocessor to simulate the action of linear servo system components. Hence, the gain, band width, movement profile and other servo parameters are programmable and may be optimized for various mechanism attachments. The method of programming the DMC-400 is well-known to those skilled in the art and is described in the User's Manual supplied by the manufacturer. An example of a suitable program for the DMC-400 is set forth in Appendix A.

In the illustrated embodiment, a 4,000 count per turn optical encoder supplies position feedback signals to the carriage motor controller 234. As a consequence, the position of the servo head 208 may be controlled to a resolution of 6 micro-inches. Other modules, such as a laser interferometer, may be substituted as appropriate for the optical encoder, simply by reprogramming the carriage controller 234.

The servowriter chassis base 202 includes the power supplies 238 for the motors and electronic circuitry mounted on the chassis base 202. A front panel 240 has power switches for the power supplies 238 and "ready" status indicators.

Figure 4B:
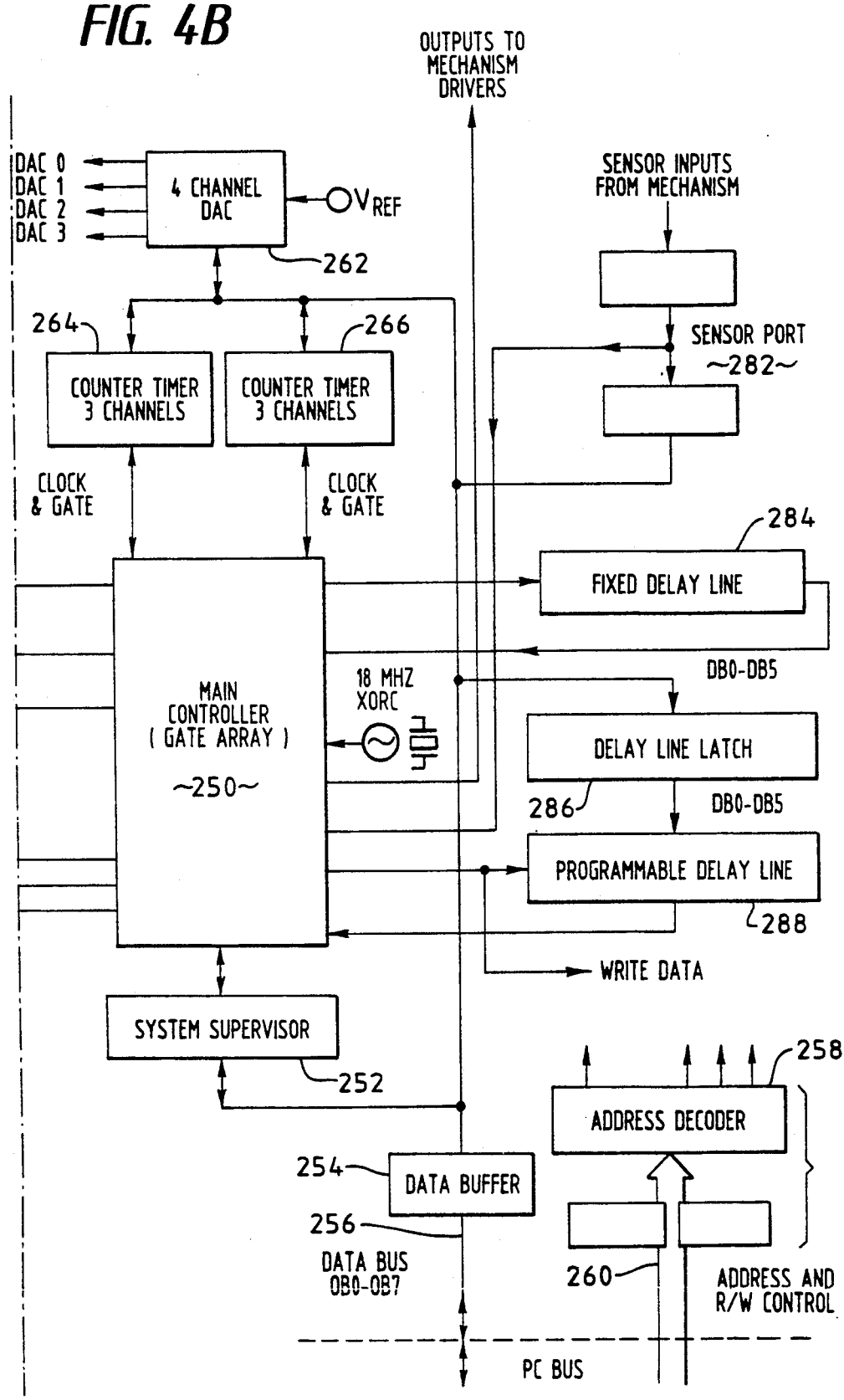

The servowriter controller board 224 is shown in greater detail in FIG. 4. The central control element of the servowriter controller board 224 is a RAM-based, programmable gate array 250 which has a plurality of internal logic elements. The gate array 250 of the illustrated embodiment is implemented with a type XC 2018 Logic Cell TM array integrated circuit, manufactured by Xylinx, Inc. The type and interconnection of the logic elements of the gate array 250 may be configured by a program stored in an onboard read-write memory. This program which defines the logic design appropriate to the particular disk drive being servo written is first created and stored as a disk file in the microcomputer floppy disk drive 222 (FIG. 3). The disk file containing the logic gate interconnection program is transferred ("down loaded") to the gate array 250 prior to initiation of the servo writing operation. Once loaded, the gate array 250 becomes a servowriter controller integrated circuit specialized for the particular disk drive servo type to be written. The gate array 250 will then accept a series of operation commands written to it by the microcomputer 216 to perform the servo writing operation, and can also return status information when read.

To assist in loading the logic design program, the controller board 224 further includes a system supervisor 252 (type 16RS4 PAL integrated circuit, manufactured by Monolithic Memories, Inc.) which accepts commands for program loading, read back, reset and fault monitoring and also returns status information when read. The system supervisor 252 is coupled by a data buffer 254 to the microcomputer data bus 256. The gate array 250, system supervisor 252 and other integrated circuit devices of the servowriter controller board 224 may be accessed by the microcomputer 216 (FIG. 3) at input-output port addresses supplied by the microcomputer 216. An address decoder 258 (which includes a type 20L10 PAL integrated circuit, a buffer and plurality of NOR gates) decodes the addresses provided at the microcomputer address bus 260 and selects devices for read or write operations. The programming for the PAL devices of FIG. 4 is provided in Appendix B.

Included within the devices addressable by the microcomputer 216, is a 4-channel digital to analog converter circuit 262 (type AD7226 integrated circuit, manufactured by Analog Devices, Inc.). The digital to analog converters 262 allow the microcomputer 216 to configure certain analog voltage levels within the controller board 224 for operations described below. In addition, two 3-channel 16-bit counter-timer circuits 264 and 266 (type 82C54 integrated circuits manufactured by Intel Corporation) are written to by the microcomputer 216 to set various operation mode and count moduli. When read, the counter-timer circuits 264 and 266 also return count and status information to the microcomputer. The counter-timer circuits 264 and 266 are also used by the gate array 250 for various purposes described below.

To write servo pattern data onto the disk drive or read servo pattern data from the disk drive, the servowriter controller board 224 has a read-write amplifier 270 which has an input coupled to the gate array 250 and an output coupled to the servo read-write head 208 of the servowriter chassis base 202. Similarly, an amplifier 272 couples the gate array 250 to the clock read-write head 212. The amplifiers 270 and 272 are discussed in greater detail in copending U.S. patent application Ser. No. 07/265,788 filed Nov. 1, 1988, entitled "Disk Drive Clock Writer", assigned to the assignee of the present application and incorporated herein by reference. A write current generator 274 provides controlled current to whichever head is selected by the gate array 250 for a write operation.

The gate array 250 is also coupled to external components 280 for a phase-locked loop which is also described in greater detail in co-pending U.S. application entitled "Disk Drive Clock Writer". The gate array 250 can latch sensor information from the servowriter chassis base 202 (FIG. 3) at a sensor port 282 which includes 2 74LS244 latch integrated circuit chips. A fixed delay line 284, a delay line latch 286, and a programmable delay line 288 are used to verify the patterns written as described in greater detail in connection with FIG. 9 hereinbelow.

FIG. 5 illustrates the major functional logic sections of the gate array 250 which has been configured to write the required clock and servo patterns for a type .6650 disk drive, manufactured by Priam Corporation. The gate array 250 includes a processor status and command port interface 300 which latches commands from the microcomputer 216 and returns status information over the microcomputer bus. An operation decoder circuit 302 decodes the commands from the microcomputer and activates control lines to the other functional sections of the gate array 250.

The format of the command words from the microcomputer is depicted in FIG. 6. In the illustrated embodiment, there are four possible classes of operations as defined by bits 5 and 6 of the command byte. The two operation classes of primary interest here are mechanical operations (e.g., loading or unloading the heads) and servo track operations. The remaining two operation classes (i.e., clock operations and index operations) are described in the copending application entitled "Disk Drive Clock Writer".

In response to a gate array command to read or write a servo track, an operation sequencer 304 of the gate array 250 controls the cycle of the read or write operation. A frequency and time base generator 306 receives an 18 megahertz clock signal as a reference from a crystal oscillator 308 and also receives a variable frequency clock signal from a voltage controlled oscillator external to the gate array 250. The frequency and time base generator uses these signals to generate a variety of lower frequency clock signals for use by other sections of the gate array. The generator 306 further includes a phase-locked loop phase detector.

The clock signal to be written onto the servo surface of the disk drive 204 is generated by a clock signal generator and verifier circuit 310. The operation sequencer 304, frequency and time base generator and phase detector 306 and clock signal generator and verifier 310 are discussed in greater detail in the co-pending application entitled "Disk Drive Clock Writer". A mechanical status and control block 312 controls the motors and actuators of the servowriter chassis base 202 in response to gate array commands from the microcomputer. The mechanical status and control block 312 is described in greater detail in connection with FIG. 11 hereinbelow.

The gate array 250 also includes a servo pattern generator 314 which generates the servo pattern to be written to the disk drive. A servo pattern verifier 316 may be used to verify each servo track after it is written and thereby check for errors.

The logic for the servo data pattern generator 250 is shown in greater detail in FIG. 7. As previously mentioned, the logic circuitry of the gate array 250 has been programmed in the illustrated embodiment to generate the servo pattern required by the Priam Model 6650 disk drive, which pattern is illustrated in FIG. 2. As shown therein, the servo pattern for this disk drive comprises a series of cells. At the boundary of each cell, a negative transition of the signal provides a timing reference. A positive transition occurs either one-third or two-thirds of a cell later. Thus, in servo track n, for example, a positive transition 350 occurs two-thirds of a cell after the timing reference at the boundary whereas, in servo track n+1, a positive transition 352 occurs one-third of a cell after the negative transition timing reference at the boundary. These two different types of cell, the "late" cell of track n and the "early" cell of track n+1, provide odd and even position information and are used in combinations as illustrated to provide four types of servo tracks. In the Priam Model 6650 disk drive servo pattern, the four track types are written on the drive in a modulo 4 repetition order.

Figure 8A:
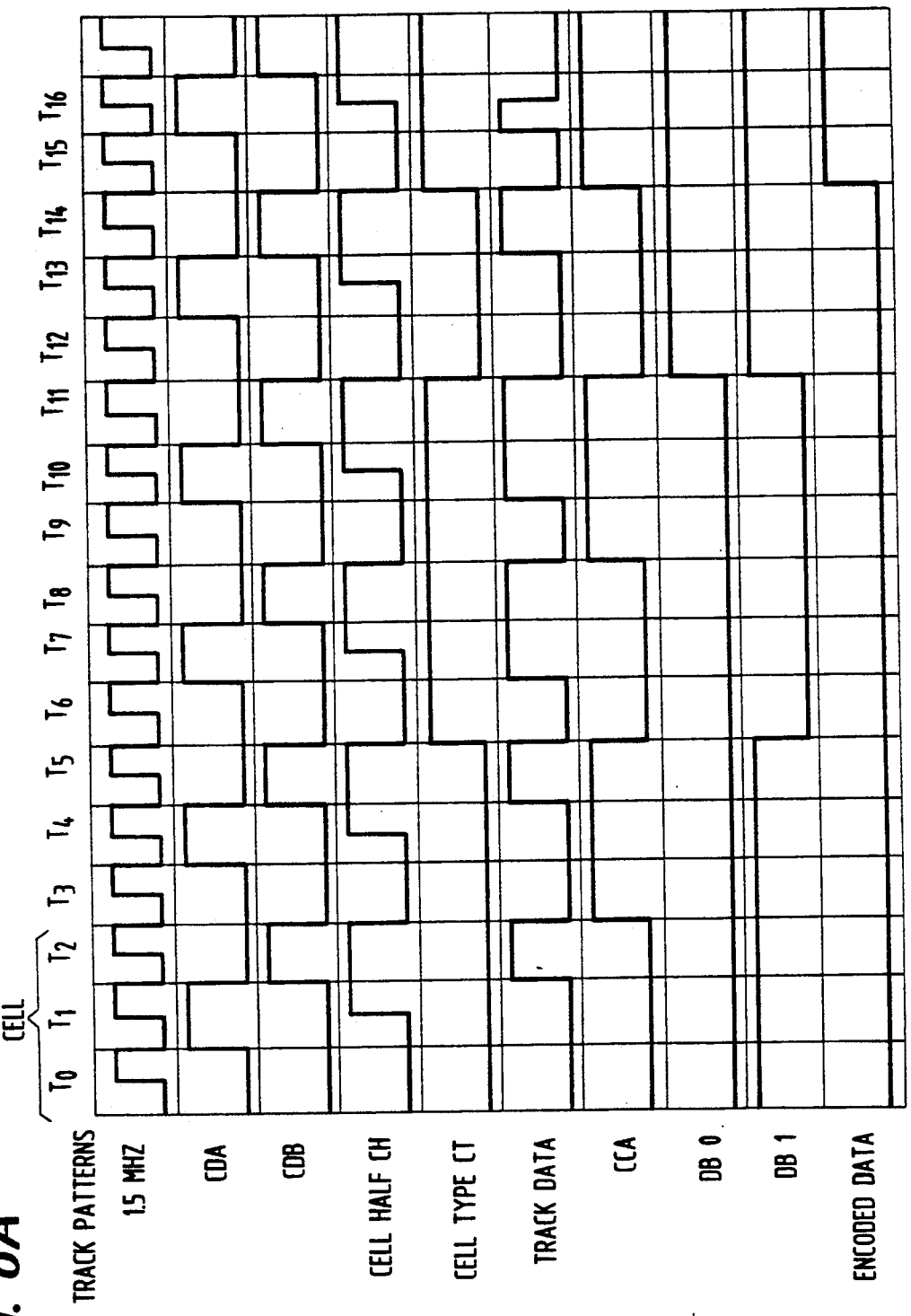

The servo data pattern generator of FIG. 7 has been configured to generate the modulo 4 servo data pattern illustrated in FIG. 2. A 6 megahertz clock signal from the frequency and time base generator 306 (FIG. 5) is divided by 2 by a frequency divider 360 to generate a 3 megahertz clock signal. The divider circuit 360 also divides the 6 megahertz clock signal by 4 to yield a 1.5 megahertz signal as indicated at 364. One cycle of the 1.5 megahertz clock signal occurs every third of the servo cell illustrated in FIG. 2. Thus, as shown in FIG. 8A, a cell spans 3 cycles (e.g., $T_0$–$T_2$) of the 1.5 megahertz cell division signal.

A divide by three cell division counter 366 is enabled by the 1.5 megahertz cell division signal to count the cell divisions modulo 3. The counter 366 has 2 outputs designated cell division "A" (CDA) and cell division "B" (CDB). The CDA output has a positive transition 368 at the first third division of each cell as depicted in FIG. 8A. The CDB signal has a positive transition 370 at the second third division of each cell.

An additional counter 372 and 384 divides the output of the counter 366 by 6 to count the cells of the pattern modulo 6. The output of the counter 372 is designated cell count "A" (CCA). The outputs of the counter 384 are designated cell count A (CCH) and cell count B (CCH). As shown in FIG. 8A, the CCA signal has a positive transition every other cell.

A cell type generator 378 selects the type of cell appropriate for the servo track being generated. As previously mentioned in the illustrated embodiment, there are 4 types of servo tracks comprised of 2 types of cells, early cells and late cells, as shown in FIG. 2. As indicated in FIG. 6, the servo track type to be written is defined by bits DB0 and DB1 of the gate array command word from the microcomputer. The cell type generator 378 accepts as inputs command word data bits DB0 and DB1 together with cell count signal (CCA) to generate cell type output CT which is a logic zero for late type cells and a logic 1 for early cells. Thus, as shown in FIG. 8A, the cell type generator output CT is a logic zero for command word data bits DB0=0 and DB1=1. Consequently, the servo write data output designated "track data" outputs a series of late type cells. However, once the command word bit DB1 changes to logic zero, the cell type output CT changes to logic 1 and the track data output changes to early type cells. A pattern generator 379 generates the actual late and early cell patterns from the selected cell type signal CT and the cell division signals CDA and CDB as shown in FIG. 7.

Referring back to FIG. 2, a data bit may be encoded in the Priam servo pattern by inserting a negative transition at the midpoint of the cell. An example of such a negative transition to encode a logic one data bit is indicated at 380 for servo track n. In the Priam servo pattern, a 6-bit serial data word is used to indicate index, or 1 of 2 guard band track types. Specifically, a binary 101010 encodes index, and a binary 100100 or 100010 encodes a guard band word.

FIG. 8B illustrates the generation of data words for index and guard bands. The cell count signals CCA, CCB and CCC are decoded for purposes of index and guard band generation. A trigger circuit 386 provides a "begin burst" timing trigger signal BB at the end of every sixth cell.

As previously mentioned, an index is provided at one angular location on each servo track. An index counter channel 388 counts the clock head read back (by counting 1.5 megahertz phase-locked loop clocks) pulses to mark the position of the servo track index. The index counter channel 388 activates an index burst trigger circuit 390 which outputs an index burst signal IDB which is at a logic one state for a duration of 6 cells as shown in FIG. 8B. The beginning and end of the logic one condition of the IDB signal are triggered by the begin burst timing trigger signal BB. While the index burst signal IDB is active, a data multiplexer 392 serially generates the index word 101010 from the index burst signal IDB and cell count A signal CCA as shown in FIGS. 7 and 8B.

As previously mentioned, the servo pattern of the illustrated embodiment has guard bands at the inside and outside borders of the servo pattern to mark the boundaries of the data areas. While a guard band is being written, a guard band counter channel 394 counts the cells of the pattern (by counting phase-locked loop clocks) and activates a guard band burst trigger circuit 396 so that a guard band burst enable signal GBB is output every 255 servo cells of the guard band track at fixed angular offsets from the index.

As shown in FIG. 6, the gate array 250 is caused to write a guard band track when the gate array command word bit (DB30) from the microcomputer is a logic one. The guard band burst trigger circuit 396, like the index burst trigger circuit 390, is triggered by the begin burst trigger signal (BB). Thus, at each 255 cell cycle as indicated by the guard band counter channel 394, the guard band burst enable signal GBB goes active (see cells 6–11) at one begin burst signal and terminates at the next begin burst signal if the command word bit DB3 is active as shown in FIG. 8B.

A guard band data generator 398 serially generates either the guard band data word 100100 or 100010 depending on the state of gate array command word bit DB2 from the microcomputer. The data multiplexer 392 serially outputs at DTM the generated guard band data word GBD if the guard band burst enable signal GBB is active and if the index data burst enable signal IDB is inactive. The data multiplexer 392 give priority to the index word should both the index word and the guard band word occur simultaneously.

The output DTM of the data multiplexer 392 is provided to a pattern mix circuit 400 which encodes the data into the cell pattern PG being generated by the pattern generator 379. Each data pulse is encoded into a cell by forcing a one to zero logic transition at the exact midpoint of a cell when the data multiplexer 392 indicates that an encoded data bit should occur during the present cell. A cell half detector 402 using the 3 megahertz clock signal output by the divider circuit 360 and the cell division signals CDA and CDB from the divider circuit 366 generates the cell half signal CH which has a negative to positive transition at the midpoint of each cell as depicted in FIG. 8A. At cell third $T_{16}$, a cell is shown encoded with a logic 1 data bit. Thus, a transition to a logic zero level is inserted at the midpoint of the output pattern cell during cell third $T_{16}$. Since an early type cell is normally at logic state one at the midpoint, the pattern mix logic 400 forces the second half of the cell to a logic zero state so that the cell may have logic one to logic zero transition at the midpoint to indicate the encoded data bit.

The output PM of the pattern mix circuit 400 is provided to an output latch 402 which resynchronizes the generated servo pattern using the 6 megahertz and 18 megahertz clock signals. The servowriter data output of the latch 402 is in turn provided to the servo read-write amplifier 270 and head 208 as shown in FIG. 4.

Once the servo pattern has been written onto a servo track, the servo head 208 is used to read the pattern back to verify that the servo pattern has been correctly written. As previously mentioned, the servo pattern verification function is performed by logic block 316 (FIG. 5) of the gate array 250. As shown in greater detail in FIG. 9, the servo pattern verifier logic 316 includes an over-amplitude detector circuit 450 and an under-amplitude detector circuit 452. The over-amplifier detector circuit 450 includes a first comparator 454 which compares the plus read signal from the servo read-write head 208 to a voltage reference $V_{REF}$. A second comparator 456 compares the negative read signal to the same voltage reference $V_{REF}$. In the illustrated embodiment, the reference voltage $V_{REF}$ is fixed; however, the comparison level may be controlled by varying the automatic gain (AGC) level of the servo read amplifier 270 as described in greater detail in co-pending application entitled "Disk Drive Clock Writer". If either comparator 454 or 456 indicates that the associated read signal has exceeded the comparison level indicating an over-amplitude condition, the output of an OR gate 458 having inverting inputs coupled to the outputs of the comparators 454 and 456 becomes active, incrementing a counter channel 460 which logs each over-amplitude error condition.

Figure 10:
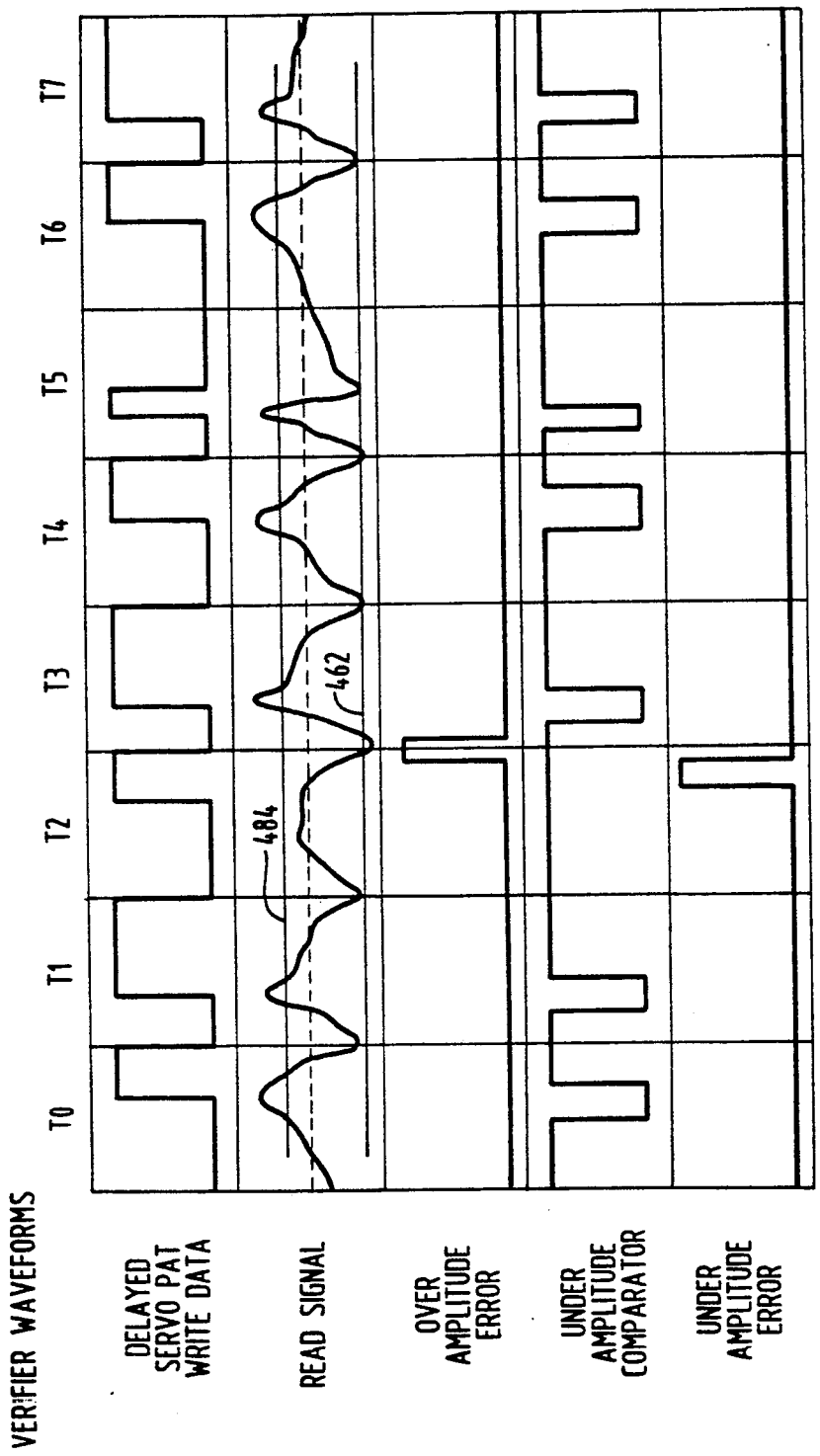
FIG. 10 illustrates timing diagrams for signals produced by the servo pattern verifier logic of FIG. 9.

An example of the operation of one of the comparators of the over-amplitude detector circuit 450 is illustrated in FIG. 10. As shown therein, a read signal (either the plus read or minus read signal) is compared to a comparison level 462. During time intervals T0 and T1, the amplitude of the read signal does not exceed the comparison level 462. Consequently, the over-amplitude error signal output of the OR gate 458 remains at a low or logic zero state. However, at the end of time period T2, the amplitude of the read signal exceeds (in the negative direction) the comparison level 462, causing the over-amplitude error signal to rise to a logic one, clocking (that is, incrementing) the error logging counter channel 460.

The existence of an over-amplitude condition in the servo pattern just written to the disk drive is considered to be an error condition. If the number of over-amplitude conditions logged in the counter channel 460 exceeds a predetermined maximum, all servo tracks are discarded and rewritten.

The under-amplitude detector circuit 452 also includes a pair of comparators 470 and 472 which compare a comparison level defined by the analog output DAC 0 of a digital to analog converter channel 262 (FIG. 4) to the plus read and minus read signals, respectively, from the disk drive. The occurrence of an under-amplitude condition, unlike an over-amplitude condition, is not always indicative of an error since in each cell the servo pattern read signal will cross the origin at least two times. Thus, the under-amplitude detector circuit 452 is designed to detect the occurance of under-amplitude conditions at locations where such conditions are not expected and to log them as errors.

The output of the first comparator 470 of the under-amplitude detector circuit 452 is coupled to the "D" input of a "D" type flip-flop 474. Similarly, the output of the second comparator 472 is coupled to a "D" type flip-flop 476. The outputs of the flip-flops 474 and 476 are coupled to the inputs an OR gate 478, the output of which is connected a "D" type flip-flop 480. The output of the flip-flop 480 is coupled to the input of a counter channel 482 which logs the under-amplitude errors.

The under-amplitude detector circuit 452 effectively compares the detected under-amplitude conditions to the generated servo pattern to determine if the under-amplitude conditions occur where expected. If not, the error logging counter channel 482 is incremented to indicate an error condition.

The operation of the under-amplitude detector circuit is illustrated in FIG. 10 in connection with one of the comparators 470 or 472. As shown therein, each comparator of the under-amplitude detector circuit 452 compares a read signal (either plus or minus) to a comparison level 484 set by channel DAC 0 of the digital analog converter 262. The output of the comparator stays high so long as the read signal does not exceed the comparison level 484. As is well known, the read electronics of a disk drive act as a differentiator of the pattern written on the disk such that the read signal pulses at each transition of the pattern. Thus, as shown at a time interval T0, the read signal exceeds the comparison level 484 just before the expected 0 to 1 transition of the servo pattern data. Consequently, the output of the comparator drops to a logic zero when the read signal crosses the comparison level 484 and then returns to a logic 1 when the read signal recrosses the comparison level 484.

To compare the detected under-amplitude condition to the servo pattern, the servo pattern write data output of the servo pattern generator 314 is used to clock the "D" type flip-flops 474 and 476 of the under-amplitude detector circuit 452. The servo pattern write data is delayed by a programmable delay line 486 to match the inherent delay caused in the read signal by the circuitry between the read head and the under-amplitude detector circuit.

As shown in FIG. 10, the rising edge of the servo write data during time interval T$\phi$ occurs in the midpoint of the logic zero state of the output of the under-amplitude comparator. Consequently, when the associated flip-flop 474 or 476 is clocked by the delayed servo pattern write data, no error signal is stored in the flip-flop, indicating that the under-amplitude condition occured in the proper location. Similarly, the associated flip-flop 474 or 476 is clocked during time interval T1 at the under-amplitude output logic zero state, again indicating that no error has occurred.

However, during time interval T2, the read signal does not exceed the comparison level 484. Consequently, when the servo pattern write data signal clocks the associated flip-flop, that flip-flop is set causing the flip-flop 480 to be set, indicating an error condition. The setting of the flip-flop 480 causes the error logging counter channel 482 to be incremented. The output of the flip-flop 480 is also connected to the reset inputs of the flip-flops 474 and 476, resetting these flip-flops after each detected error condition, which in turns resets the flip-flop 480 on the next cycle of the 18 megahertz signal clocking the flip-flop 480.

It is seen from the above that the servo pattern verifer logic 316 detects both over-amplitude pulses as well as missing pulses of the servo pattern written. In addition, the width or phase of the pulses may be readily measured by varying the delay of the programmable delay line 486 (type TTL DL-14-4, manufactured by Engineered Components, Corp.). The amount of delay of the delay line 486 is set by the microcomputer 216. After each track verify operation, the error logging counter channel counts may be retrieved by the microcomputer.

Figure 11:
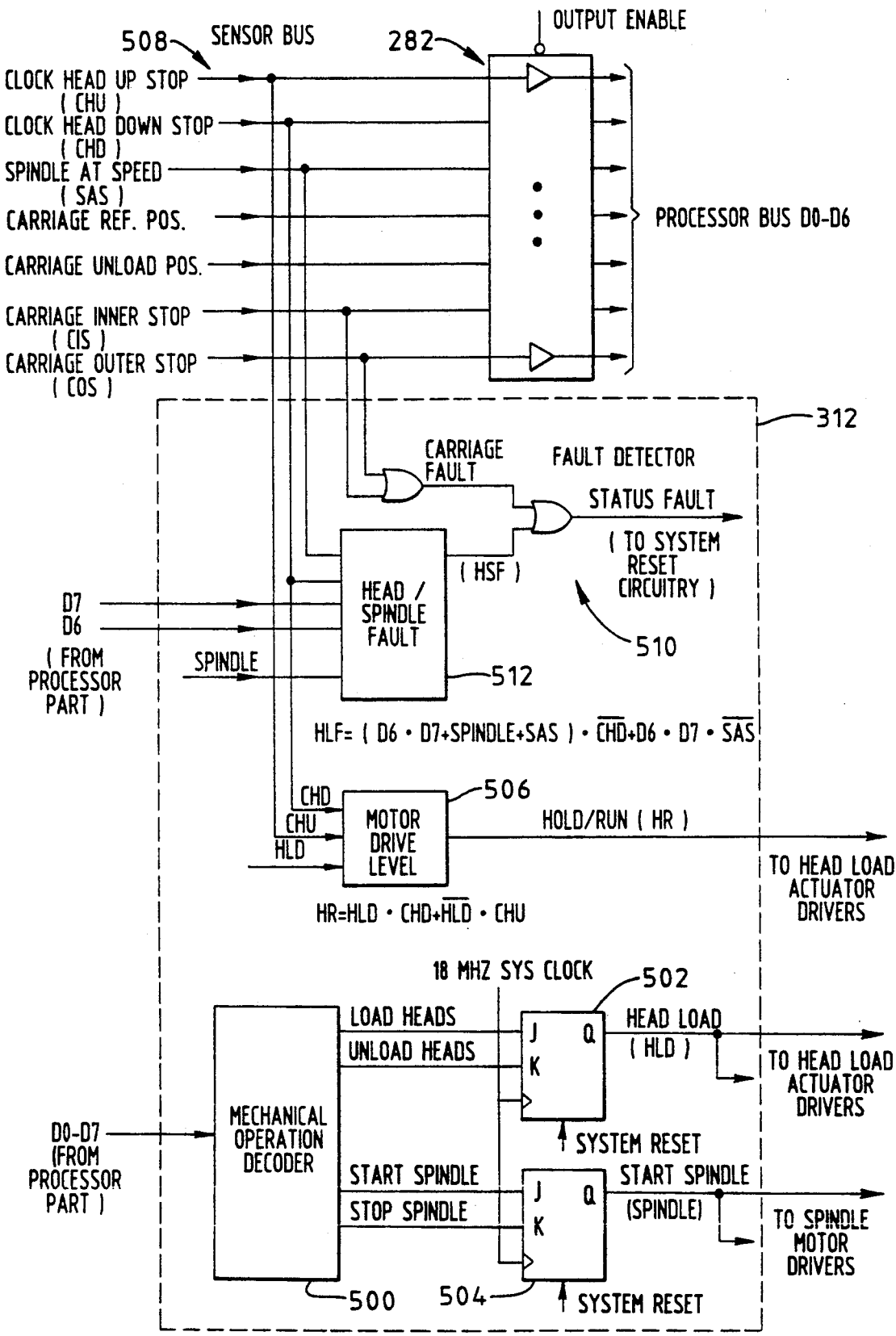
FIG. 11 is a schematic diagram of the mechanical status and control logic of the gate array of FIG. 5.

FIG. 11 shows in greater detail the mechanical status and control block 312 of the gate array 250 of FIG. 6. A decoder circuit 500 decodes the bits of the gate array command word from the microprocessor to initiate various mechanical operations including loading and unloading the read-write heads and starting and stopping the spindle of the disk drive. As shown in FIG. 6, a mechanical operation is initiated by command word bits DB6, DB5=01. The particular type of mechanical operation is defined by a command word bits DB1 and DB0. For command word bits DB1, DB0=11, indicating a load head operation, a JK flip-flop 502 is set, the output of which is coupled to the head load actuator drivers of the driver and sensor electronics interface 226 of the chassis base 202 of FIG. 3. Command word bits DB1, DB0=10, indicating a head unload operation, reset the flip-flop 502. A second JK flip-flop 504 operates in a similar manner to start and stop the spindle of the disk drive in response to the appropriate command word data bits. The gate array contains "D" flip-flops which are connected with other logic elements to form the J-K flip-flops shown.

In the illustrated embodiment, the actuator for loading and unloading the servo head is a simple solenoid. However, the clock head load actuator is a DC motor. A motor drive controller 506 for the clock head DC motor signals a reduced level of motor drive (HOLD) whenever the clock head motor has reached either end of the range of motion of the clock head. The sensor electronics interface 226 of the chassis base 202 of FIG. 3 provides a "CLOCK HEAD UP STOP" signal when the clock head has reached its upper most (retracted) position and a "CLOCK HEAD DOWN STOP" signal when the clock head has reached its lowest (deployed) position. These sensor signals are provided on a sensor bus 508 to the sensor port latches 282 (FIG. 4) for the microcomputer and the gate array 250.

In addition to the clock head fully loaded and fully unloaded position signals, sensors of the interface electronics 226 also provide outer and inner crash stop signals for the carriage arm 206. Two more sensors detect the carriage rezero and unload positions. Finally an additional sensor indicates when the spindle motor has reached operating speed.

The mechanical status and control logic 312 of the gate array 250 further includes a fault detector 510 which detects the occurrance of a status fault and initiates a system reset when the carriage arm activates one of the crash stop sensors. The fault detector circuit 510 further includes a head/spindle fault detector circuit 512 which signals a status fault condition when an illegal clock head load or unload operation is attempted or when a data operation is attempted without the heads being loaded and the spindle being at operating speed.

As previously mentioned, the gate array 250 of the illustrated embodiment is a type XC2018 integrated circuit manufactured by Xylinx, Inc. This integrated circuit allows the logic circuitry of the servowriter controller 224 to be readily configured as appropriate to write the desired servo pattern. Thus, for example, the servo pattern generator logic illustrated in FIG. 7 is, with the exception of the index counter channels 388 and 394, implemented in the illustrated embodiment by configuring the gate array 250 to perform these logic functions. Similarly, a portion 514 of the servo pattern verifier logic of FIG. 9 and the mechanical status and control circuitry 312 of FIG. 11 are also implemented by appropriate configuration of the gate array 250.

Figure 12:
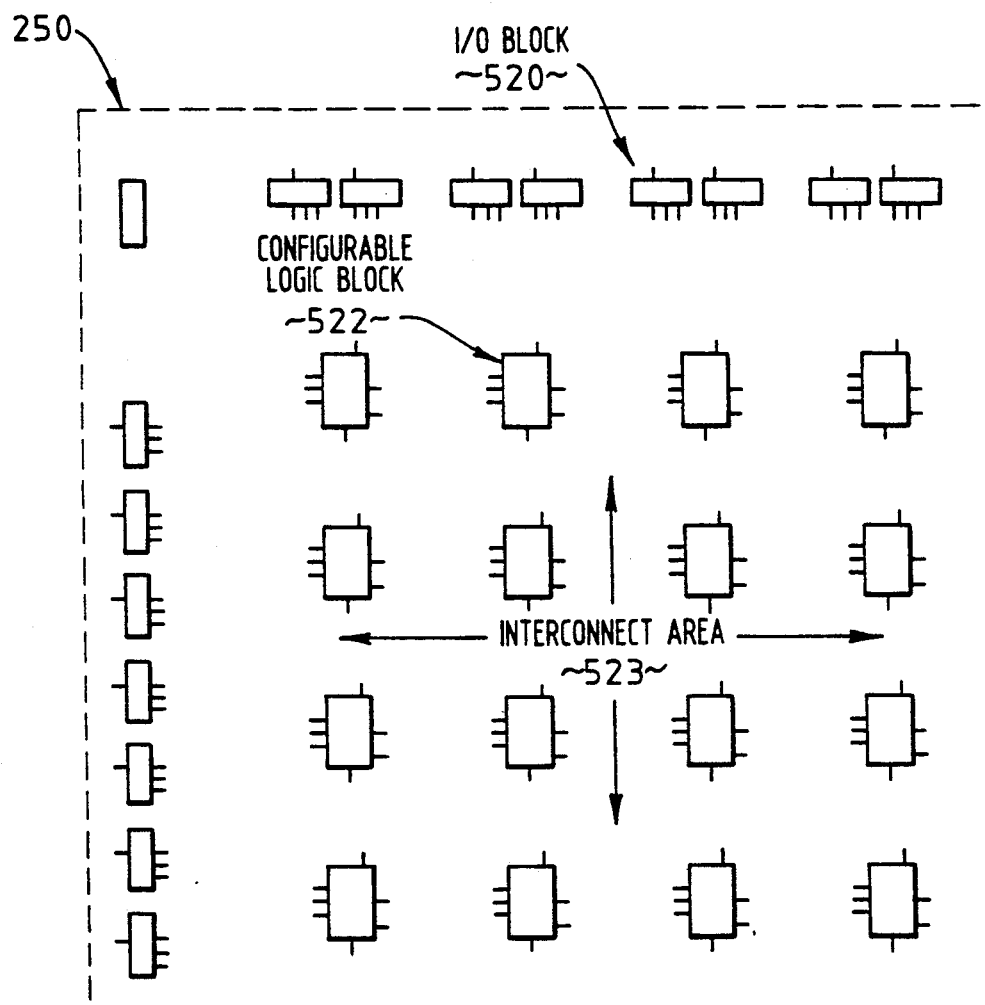
FIG. 12 is a schematic diagram of the structure of the gate array of FIG. 5.

The general structure of the gate array 250 is shown in FIG. 12. The elements of the array include three categories of user programmable elements: I/O blocks 520, configurable logic blocks 522 and programmable interconnections 523. The I/O blocks 520 provide an interface between the logic array and the package pins of the device. The configurable logic blocks 522 perform user specified logic functions and the interconnect resources 523 are programmed to form networks that carry logic signals among the blocks.

Configuration of the gate array 250 is established by programming a distributed array of memory cells. A development system provided by the manufacturer assists in the generation of the program used to configure the gate array 250. An example of a program to implement the logic of the illustrated embodiment is provided in the attached Appendix C. Detailed schematic diagrams of the servowriter controller 224 are set forth in Appendix D.

Figure 13:
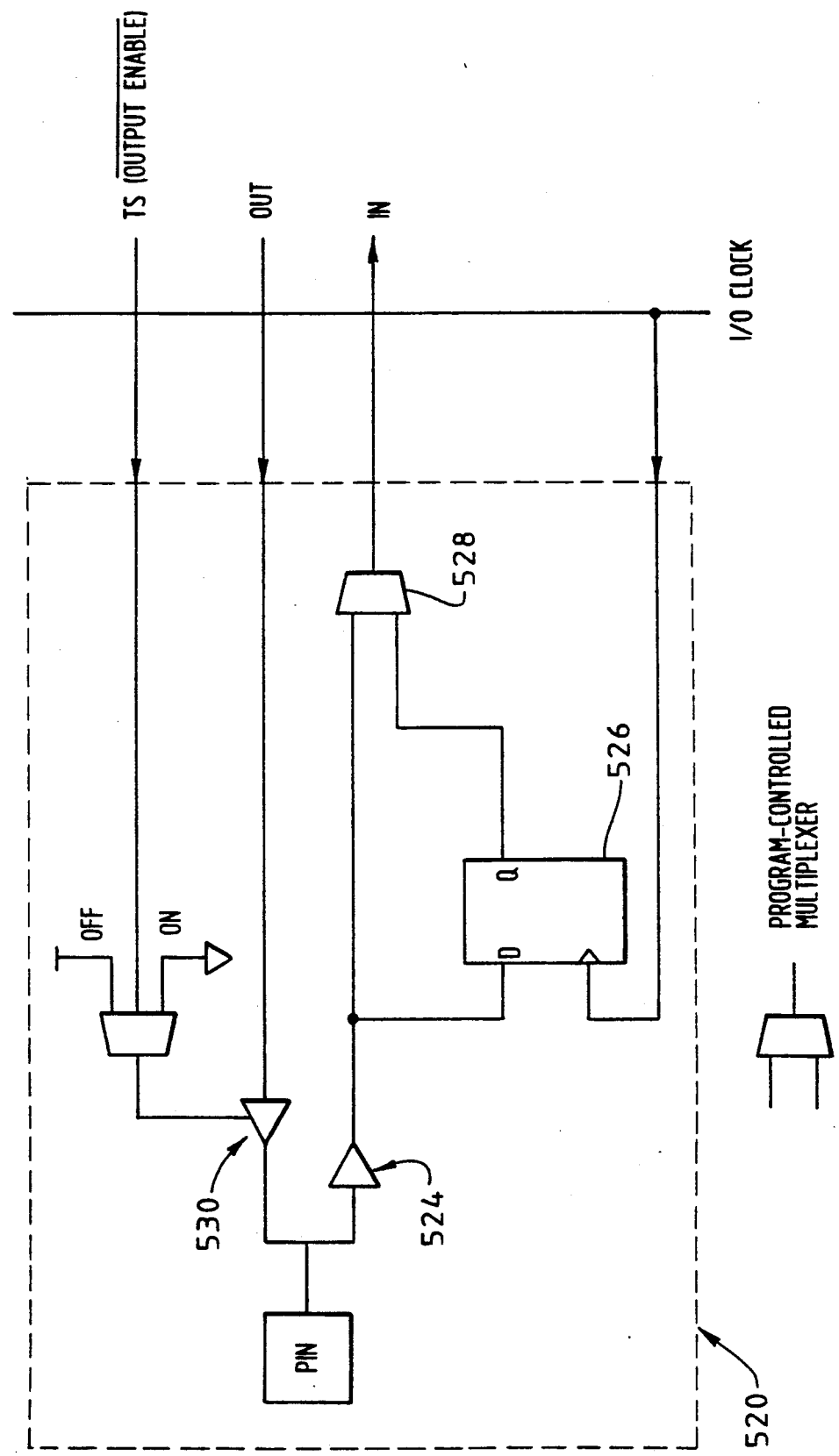
FIG. 13 is a schematic diagram of an input/output block of the gate array of FIG. 12.

The construction and operation of the gate array 250 is described in greater detail in "The Programmable Gate Array Data Book" by Xylinx. FIG. 13 shows the input/output blocks 520 in greater detail. Each user configurable I/O block 520 provides an interface between the external package pin of the device and the internal logic. Each I/O block 520 includes a programmable input path and a programmable output buffer. An input buffer portion 524 provides threshold detection to translate external signals applied to the package pin to internal logic levels. The input buffer threshold of the I/O blocks 520 can be programmed to be compatable with either TTL of CMOS. The buffered input signal drives both the data input of an edge triggered "D" type flip-flop 526 and one input of a two input multiplexer 528. The output of the flip-flop 526 provides the other input to the multiplexer 528. The user can select either the direct input path or the registered input, based upon the content of the memory cell controlling the multiplexer.

Output buffers in the I/O blocks 520 provide drive for high fan-out CMOS or TTL compatible signal levels. Each I/O block output buffer 530 is controlled by the contents of two configuration memory cells which turn the buffer on or off or select logical three-state buffer control. The user may also select the output buffer three-state control TS.

Figure 15C:
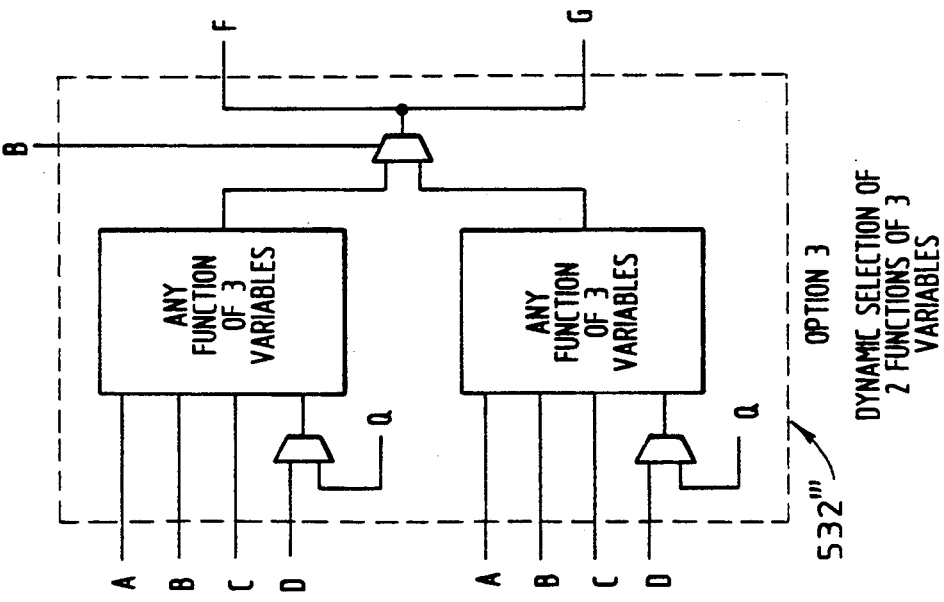
FIG. 15A-15C and schematic diagrams of various configurations of the combinational logic of the configurable logic block of FIG. 14.
Figure 15B:
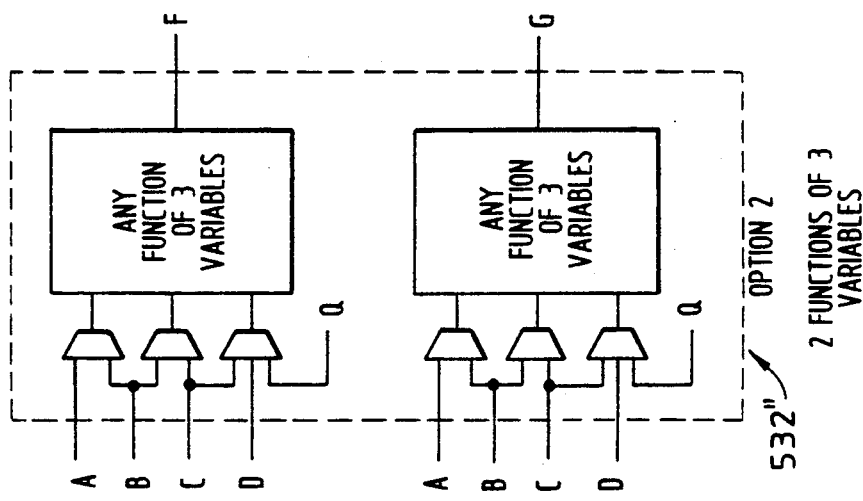
Figure 15A:
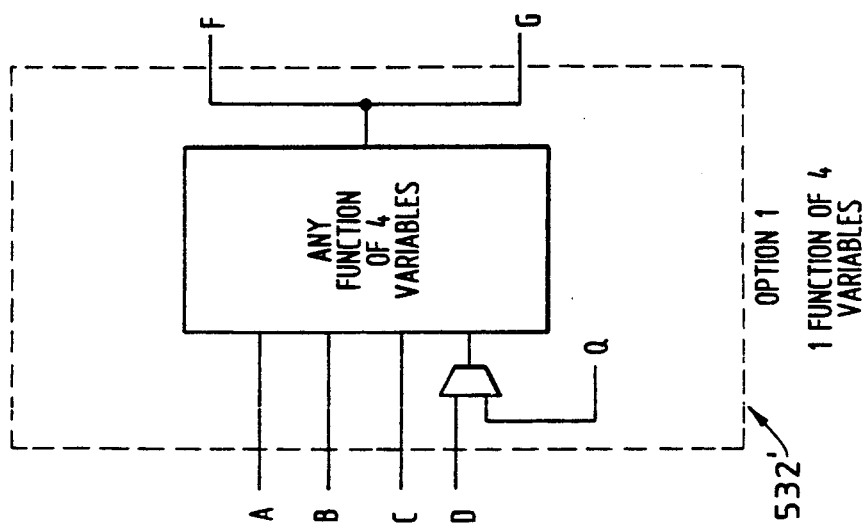

As shown in FIG. 12, the configurable logic blocks 522 are arranged in a matrix in the center of the device 250. Referring now to FIG. 14, each configurable logic block 522 is shown to include a combinatorial logic section 532, a storage element 534, and an internal routing and control section 536. Each configurable logic block 522 has four general purpose inputs; A, B, C, and D; two outputs, X and Y, and a clock input k. The combinatorial logic section 532 uses a table look-up memory to implement Boolean functions. This technique can generate any logic function of up to four variables with a high-speed 16-bit memory. As shown in FIG. 15(A), each combinatorial logic section 532 can perform any function of four variables or, as shown in FIG. 15(B), any two functions of three variables each. FIG. 15(C) shows still another op ion for configuring the combinatorial logic 532.

Programmable interconnection resources in the gate array 250 provide routing paths to connect inputs and outputs of the input/output blocks 520 and the configurable logic blocks 522 into desired networks. The interconnections of the illustrated embodiment are composed of metal segments, with programmable switching points provided to implement the necessary routing.

Figure 16:
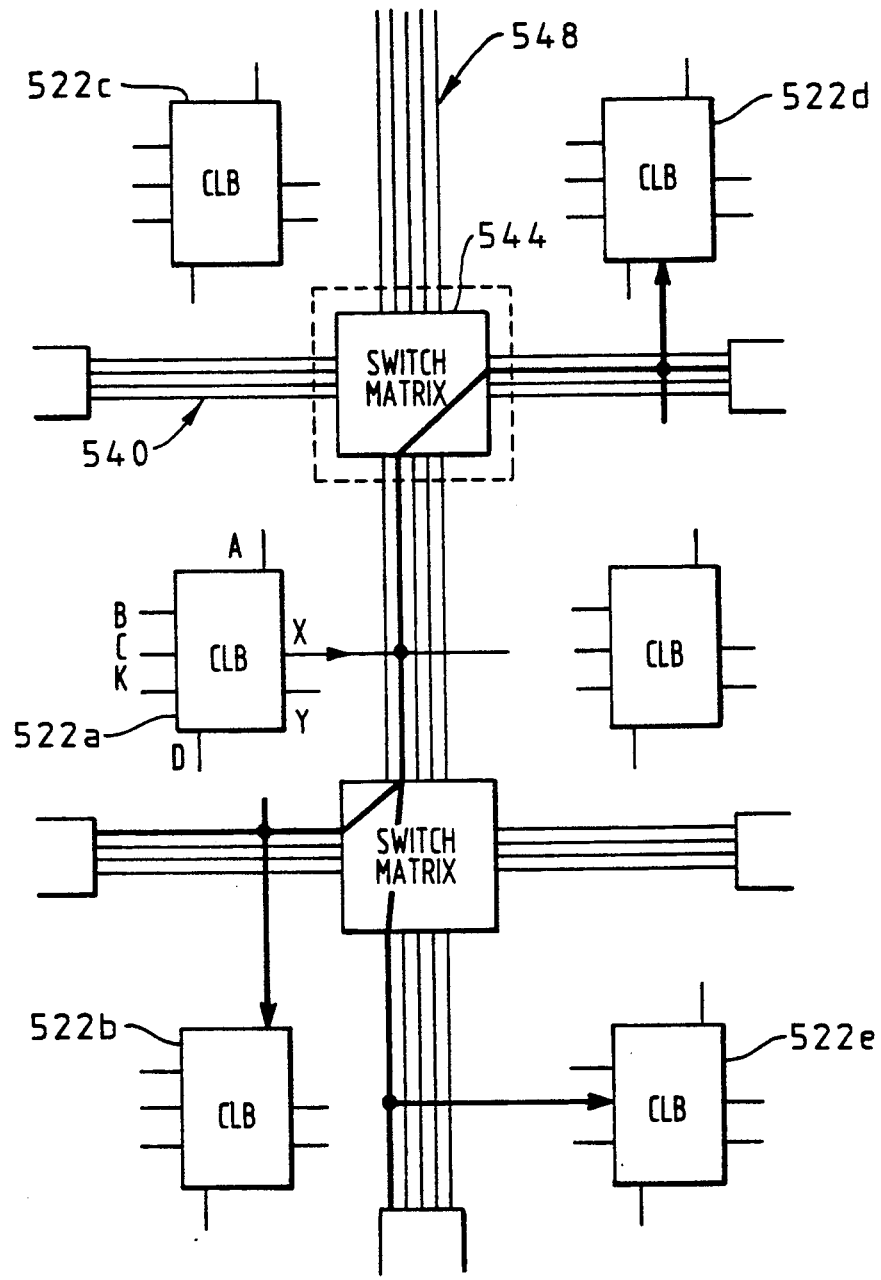
FIG. 16 is a schematic diagram illustrating the general purpose interconnect of the gate array of FIG. 12.
Figure 17:
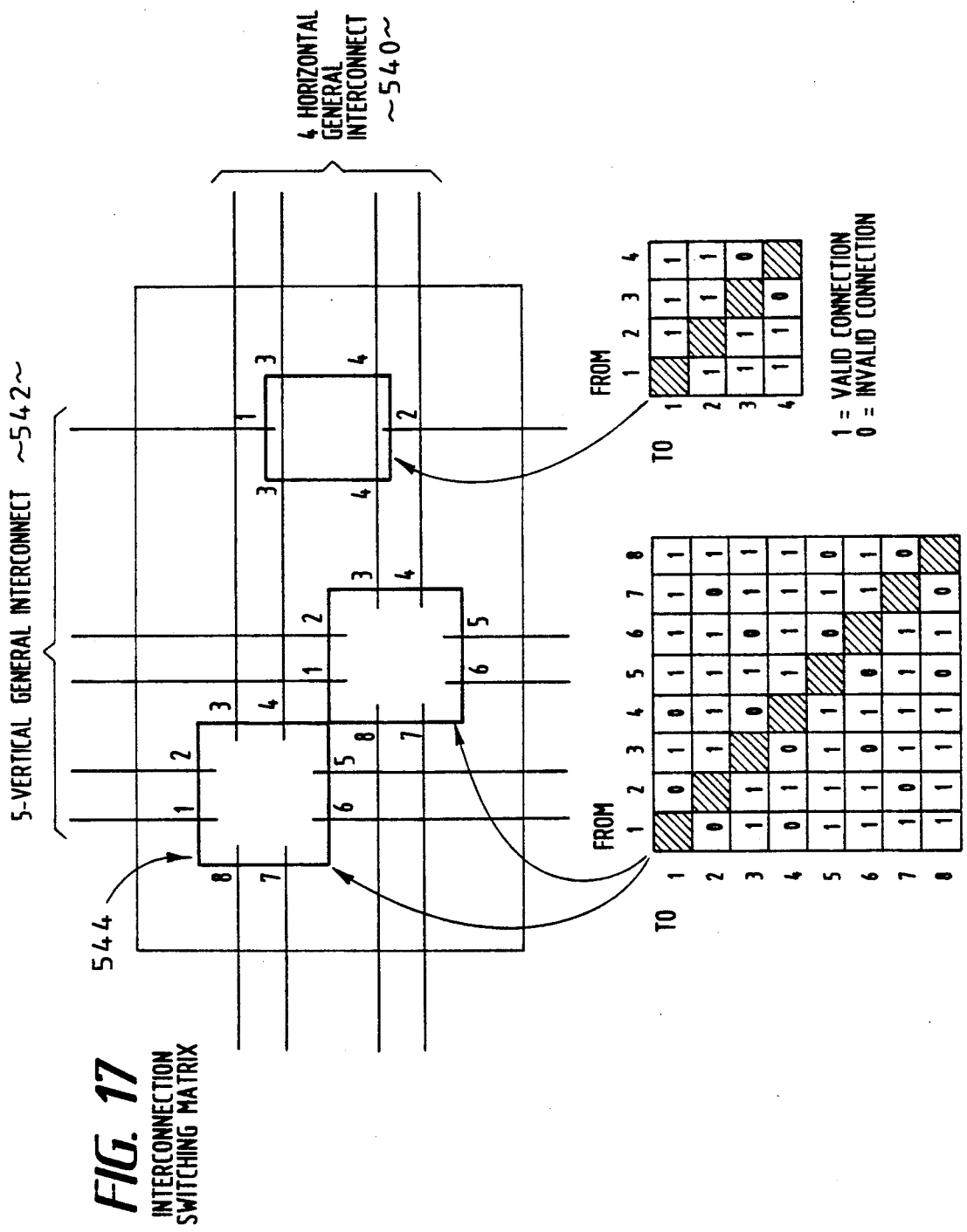
FIG. 17 is a schematic diagram illustrating an interrconnection switching matrix of the interconnect of FIG. 16.

Three types of resources accommodate different types of networks: general purpose interconnect, long lines interconnect and direct interconnect. As shown in FIG. 16, the general purpose interconnect in the illustrated embodiment is composed of four horizontal metal segments 540 between the rows of the logic blocks 522, and five vertical segments 542 between the columns of logic blocks 522 and I/O blocks 520. Where these segments would cross at the intersections of rows and columns, switching matrices 544 are provided to allow interconnections of metal segments from the adjoining rows and columns. Switches in the switch matrices and on block outputs are transistors, each controlled by a configuration memory bit. FIG. 16 shows the general interconnect used to route a signal from one logic block 522(a) to three other logic blocks 522(b)-522(d). The possible switching matrix combinations of the illustrated embodiment are illustrated in FIG. 17.

Figure 18:
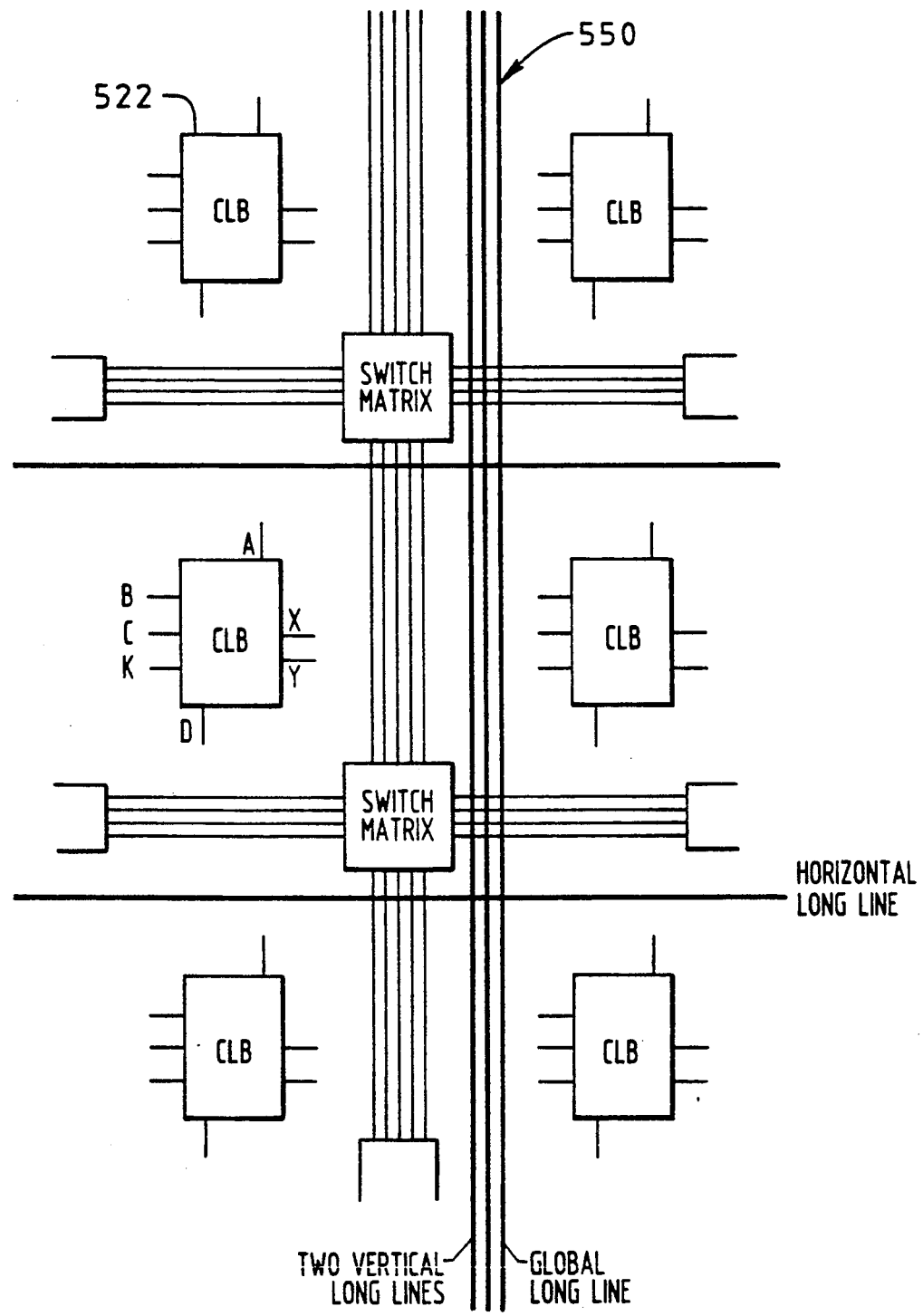
FIG. 18 is a schematic diagram illustrating the long line interconnect of the gate array of FIG. 12.

The long line interconnects run both vertically and horizontally the height or width of the interconnect areas as indicated at 550 and 552, respectively, in FIG. 18. Each vertical interconnection column has three long lines; each horizontal row has one, with an additional long line adjacent to each set of input/output blocks 520. The long lines 550 and 552 bypass the switch matrices 544 and are intended primarily for signals that travel a long distance or must have minimum skew among multiple destinations.

Figure 19:
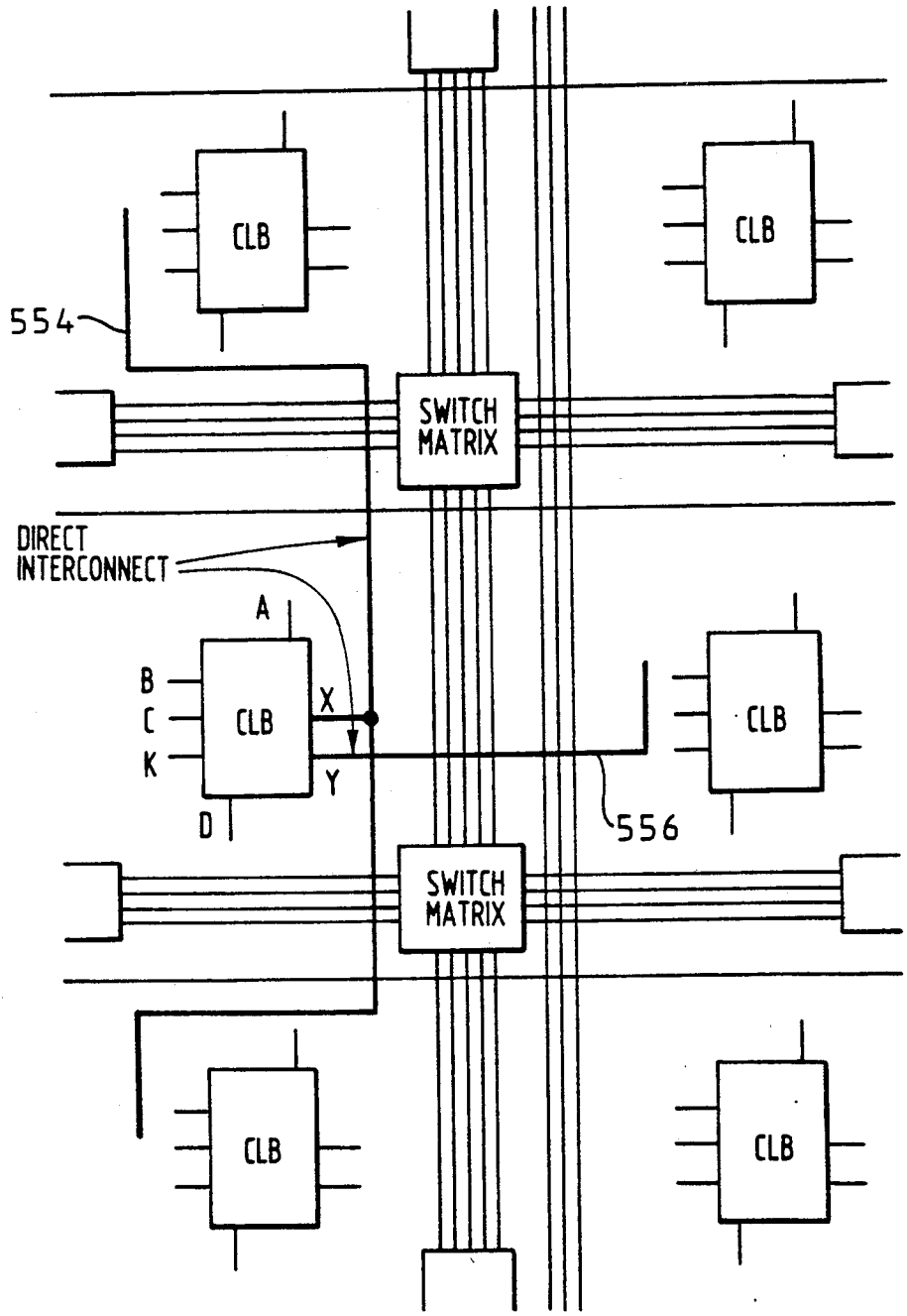
FIG. 19 is a schematic diagram illustrating the direct interconnect for the gate array structure of FIG. 12.

As shown in FIG. 19, direct interconnects provide an efficient implementation of networks between adjacent logic or I/O blocks. For each configurable logic block, the X output may be connected directly to the C or D inputs of the configurable logic block above and to the A or B inputs of the configurable logic block below, as indicated at 554. In addition, the Y output can use a direct interconnect 556 to drive the B input of the block immediately to its right. Where configurable logic blocks are adjacent to I/O blocks, direct interconnects are provided to the I/O block inputs I on the left edge of the device, the output 0 on the right edge or both on I/O blocks at the top and bottom of the device.

Figure 20:
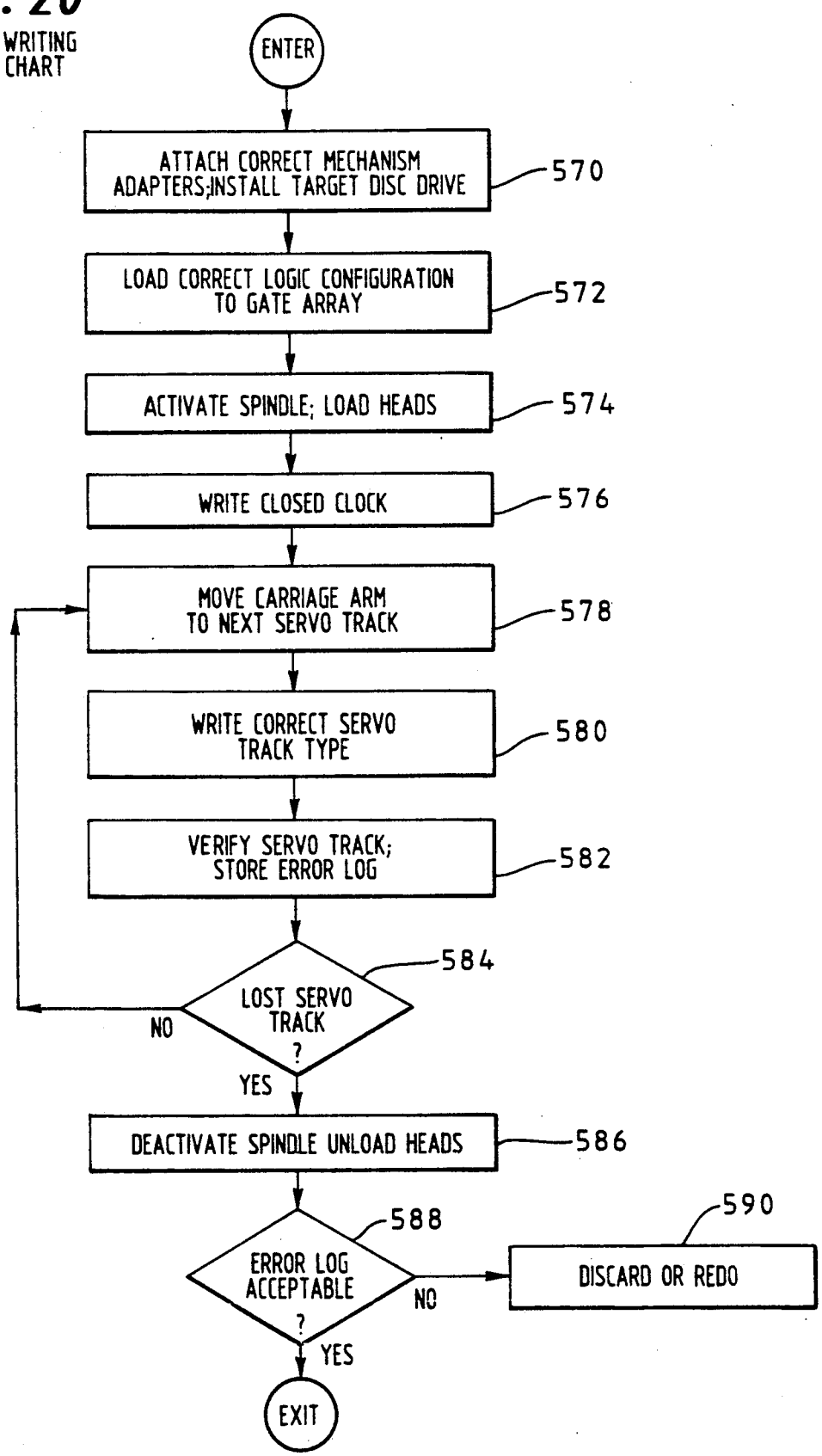
FIG. 20 is a flow chart illustrating the operation of the servo pattern writer of FIG. 3.

The overall operation of the servowriter 200 in writing clock and servo patterns for a disk drive is illustrated in FIG. 20. First, the user installs (block 570) the disk drive on which a clock pattern and servo pattern are to be written, onto the servowriter chassis base 202 using the appropriate adapters and clamps for that particular disk drive. The microcomputer 216 then loads (block 572) the appropriate configuration program into the gate array 250 to configure the logic functions and interconnections of the gate array 250 which will allow the gate array 250 to write the desired clock and servo patterns.

A gate array 250 command word is then sent to the gate array 250 by the microcomputer 216 to activate the disk drive spindle and load the clock and servo heads. Once the clock head is in position, the microcomputer 216 sends a command word to cause the servowriter controller 224 to write a clock pattern (block 576) as described more fully in copending application entitled "Disk Drive Clock Writer".

The servowriter is now ready to write the first servo pattern. The carriage arm is activated (block 578) to move the servo head to the first servo track of the servo surface of the disk drive. A servo pattern appropriate for the first track is written (block 580) and is then verified (block 582). Any errors are logged by the microcomputer 216. The blocks 578–582 are then repeated until (decision block 584) the last servo track has been written. Once the last servo track has been written (decision block 584) the spindle is deactivated (block 586) and the heads are unloaded. If the errors logged by the microcomputer 216 are acceptable (decision block 588) the servo writing operation is complete. Otherwise, the servo track is discarded (block 590) and the servo pattern is redone.

Thus, as seen from the above, the present invention provides a configurable servowriter which is readily configured to provide the appropriate servo pattern and hardware control signals for many different types of disk drives. In the illustrated embodiment, the configurable logic elements for generating the servo pattern and control signals are preferably integrated on a single monolithic semiconductor chip.

It will, of course, be understood that modifications of the present invention, in its various aspects, will be apparent to those skilled in the art, some being apparent only after study, and others being merely matters of routine electronic design. For example, the particular logic arrangement will depend upon the target disk drive. In addition, other logic cell array integrated circuit chips may be used.

Other embodiments are also possible, with their specific designs dependent upon the particular application. As such, the scope on the invention should not be limited by the particular embodiments herein described, but should be defined only by the appended claims and equivalents thereof.

Appendix A

SWDEFS.H

```
/*

COMPANY: *****  DATA EXCHANGE CORPORATION  *****
      FILE: SWDEFS.H
   PURPOSE: COMMON DEFINITIONS FOR THE DATA EXCHANGE UNIVERSAL SERVOWRITER.
 REFERENCE: FILE SW.C

COPYRIGHT (C) 1987, 1986 BY DATA EXCHANGE CORPORATION.
           ALL RIGHTS RESERVED.
        PORTIONS OF THIS SOFTWARE COPYRIGHTED BY MICROSOFT INC. 1986

SOFTWARE PROJECT ENGINEER: PAUL ESPINOSA.

*/ include "stdio.h"      /* STANDARD I/O FUNCTIONS INCLUSION FILE.  */
include "stdlib.h"     /* STANDARD LIBRARY INCLUSION FILE.        */
#include "string.h"     /* STRING FUNCTIONS INCLUSION FILE.        */
#include "stddef.h"     /* STANDARD DEFINITONS INCLUSION FILE.     */
#include "conio.h"      /* CONSOLE I/O FUNCTIONS INCLUSION FILE.   */
#include "time.h"       /* TIME FUNCTIONS INCLUSION FILE.          */
#include "setjmp.h"     /* SETJMP AND LONGJMP STRUCTURES FILE.     */
include "pcio.h"       /* FUNCTION DECLARATIONS FOR SCREEN LIB.   */ ifndef EXTERN
define EXTERN  extern  /* PROVIDES MULTIPLE FILE GLOBAL VARIABLE USE  */
#endif

/* GLOBAL VARIABLE DECLARATIONS:  */

EXTERN  unsigned int Vidmde;       /* CURRENT VIDEO MODE STORAGE.              */
EXTERN  unsigned int Clk_cnt;      /* CURRENT CLOCK COUNT STORAGE.             */
EXTERN  unsigned int Corrector;    /* GLOBAL CORRECTOR STORAGE.                */
EXTERN           float Comp_fact;  /* GLOBAL COMPENSATION FACTOR STORAGE.      */
EXTERN  unsigned int Dac0_val;     /* DAC0 VALUE STORAGE.                      */
EXTERN  unsigned int Dac1_val;     /* DAC1 VALUE STORAGE.                      */
EXTERN  unsigned int Dac2_val;     /* NOMINAL WINDOW DAC2 VALUE STORAGE.       */
EXTERN  unsigned int Dac3_val;     /* DAC3 VALUE STORAGE.                      */
EXTERN  unsigned int Dly_med;      /* NOM. WIN. DELAY LINE MEDIAN STORAGE.     */
EXTERN  unsigned int Nom_win;      /* NOMINAL WINDOW VALUE STORAGE.            */
EXTERN  unsigned int Ctr_val[6];   /* WINDOW COUNTER VALUE STORAGE.            */
EXTERN  unsigned int Curcyl;       /* CURRENT CYLINDER STORAGE.                */
EXTERN           int Ofst;         /* CURRENT CYLINDER OFFSET STORAGE.         */
```

```
EXTERN   unsigned int Pntr;          /* WINDOW POINTER STORAGE.              */
EXTERN   unsigned int Wdth;          /* WIDTH OF WINDOW STORAGE.             */
EXTERN   unsigned int Drv_typ;       /* DRIVE TYPE REGISTER.                 */
EXTERN   unsigned int Tpd;           /* TRACKS PER DRIVE.                    */
EXTERN   unsigned int Typ_chg;       /* DRIVE TYPE CHANGED FLAG.             */
EXTERN   unsigned int Lca_typ;       /* LCA PROGRAM TYPE LOADED STORAGE.     */
EXTERN   unsigned int Hrd_err;       /* SERVO HARD ERROR FLAG.               */
EXTERN   unsigned int Err_flg;       /* ERROR FLAG.                          */
EXTERN   unsigned int For_mrg;       /* FORWARD MARGIN STORAGE.              */
EXTERN   unsigned int Aft_mrg;       /* AFTER MARGIN STORAGE.                */
EXTERN   unsigned int Ldg_edg[4];    /* DELAY LEADING EDGE VALUE STORAGE.    */
EXTERN   unsigned int Tlg_edg[4];    /* DELAY TRAILING EDGE VALUE STORAGE.   */
EXTERN   unsigned int Win_val[4];    /* WINDOW VALUE STORAGE.                */
EXTERN   unsigned int Win_ctr[4];    /* WINDOW CENTER VALUE STORAGE.         */
EXTERN   unsigned int Win_wth[4];    /* WINDOW WIDTH VALUE STORAGE.          */
EXTERN   unsigned int Dac_ldg[4];    /* DAC LEADING EDGE VALUE STORAGE.      */
EXTERN   unsigned int Dac_tlg[4];    /* DAC TRAILING EDGE VALUE STORAGE.     */
EXTERN   unsigned int Cpd;           /* TOTAL CYLINDERS PER DRIVE.           */
EXTERN   unsigned int Old;           /* USED MEDIA FLAG.                     */
EXTERN   unsigned int scrap;         /* GLOBAL SCRAP REGISTER.               */
EXTERN   unsigned int Scbd;          /* SYSTEM CONTROL BOARD FLAG.           */
EXTERN            int Err_cnt;       /* CURRENT ERROR COUNT STORAGE.         */
EXTERN   char         Sc_sta;        /* SYSTEM CONTROL BOARD STATUS REG.     */
EXTERN   char         Sc_sup;        /* SYSTEM CONTROL SUPERVISOR STATE REG. */
EXTERN   unsigned int Mcbd;          /* MOTOR CONTROLLER BOARD FLAG.         */
EXTERN   char         Mc_reg;        /* MOTOR CONTROLLER BOARD STATUS REG.   */
EXTERN   char         Mc_sta;        /* MOTOR CONTROLLER FUNCTION RESPONSE.  */
EXTERN   char         Mc_cmd[16];    /* MOTOR CONTROLLER COMMAND STORAGE.    */
EXTERN   char         Mc_rsp[16];    /* MOTOR CONTROLLER RESPONSE STRING.    */
EXTERN   char         Filnme[12];    /* LCA CONFIGURATION FILE NAME STORAGE. */
EXTERN   unsigned long int Tpt[2005][8]; /* GLOBAL TRACK POSITION TABLE.     */
EXTERN   unsigned int Map[40];       /* GLOBAL DRIVE TRACK MAP TABLE STORAGE.*/
EXTERN   jmp_buf Save_area[1];       /* struct for setjmp                    */
EXTERN   jmp_buf Menu_area[1];       /* struct for setjmp to menu            */
EXTERN   FILE    *Sysfil;            /* system variable disk file descriptor.*/
EXTERN   FILE    *Ptrfd;             /* printer log file descriptor.         */
EXTERN   FILE    *Lfd;               /* LCA Configuration file descriptor.   */
EXTERN   FILE    *Tfd;               /* Temporary disk file descriptor.      */
void mstep(unsigned long int,unsigned int);

/* GENERAL SYSTEM CONTROL DEFINITIONS:  */ define NORM    7       /* VALUE OF NORMAL CHARACTER ATTRIBUTE.         */
define BOLD    8       /* VALUE OF BOLD CHARACTER ATTRIBUTE.           */
#define RVSE    112     /* VALUE OF REVERSE VIDEO CHARACTER ATTRIBUTE.  */
#define BLNK    128     /* VALUE OF BLINKING CHARACTER ATTRIBUTE.       */
#define BS      8       /* VALUE OF ASCII BACKSPACE CHARACTER.          */
#define LF      10      /* VALUE OF ASCII LINE FEED CHARACTER.          */
#define FF      12      /* VALUE OF ASCII FORM FEED CHARACTER.          */
#define CR      13      /* VALUE OF ASCII CARRIAGE RETURN.              */
#define SPACE   32      /* VALUE OF ASCII SPACE CHARACTER.              */

/* UNIVERSAL SERVO WRITER MOTOR CONTROL BOARD DEFINITIONS:  */ define MCBSE   1006     /* MOTOR CONTROLLER BOARD DEFAULT BASE ADDRESS. */
define MCSTA   MCBSE+1  /* MOTOR CONTROLLER BOARD STATUS REG. ADDRESS.  */
#define MCRST   "RS;"    /* MOTOR CONTROLLER BOARD RESET COMMAND.        */
#define MCMOF   "MO;"    /* MOTOR CONTROLLER BOARD MOTOR OFF COMMAND.    */
#define FWD     0xAA55   /* MOTOR CONTROLLER FORWARD DIRECTION.          */
#define REV     0x55AA   /* MOTOR CONTROLLER REVERSE DIRECTION.          */
#define MXSK    912274   /* STEP DISTANCE FOR MAXIMUM SEEK DURING INIT.  */
#define SHSK    200      /* 200 STEP DISTANCE FOR SEEK DURING INIT.      */
#define SIST    1        /* SINGLE STEP DISTANCE FOR SEEK DURING INIT.   */
```

```
/* UNIVERSAL SERVO WRITER SYSTEM CONTROL BOARD DEFINITIONS:              */

/*                                                                        */
/*      SYSTEM CONTROL BOARD SUPERVISOR PAL REGISTER MODEL.               */
/*                                                                        */
/*      READ:                                                             */
/*              BIT 7 - BIT 3 OF SYSTEM SUPERVISOR STATE.                 */
/*              BIT 6 - BIT 2 OF SYSTEM SUPERVISOR STATE.                 */
/*              BIT 5 - BIT 1 OF SYSTEM SUPERVISOR STATE.                 */
/*              BIT 4 - BIT 0 OF SYSTEM SUPERVISOR STATE.                 */
/*              BIT 3 - LCA PROGRAM READ DATA DURING READ MODE ONLY.      */
/*              BIT 2 - NOT USED SHOULD BE MASKED OFF.                    */
/*              BIT 1 - NOT USED SHOULD BE MASKED OFF.                    */
/*              BIT 0 - NOT USED SHOULD BE MASKED OFF.                    */
/*                                                                        */
/*      WRITE:                                                            */
/*              BIT 7 - BIT 3 OF SYSTEM SUPERVISOR STATE.                 */
/*              BIT 6 - BIT 2 OF SYSTEM SUPERVISOR STATE.                 */
/*              BIT 5 - BIT 1 OF SYSTEM SUPERVISOR STATE.                 */
/*              BIT 4 - BIT 0 OF SYSTEM SUPERVISOR STATE.                 */
/*              BIT 3 - NOT USED SHOULD BE MASKED OFF.                    */
/*              BIT 2 - NOT USED SHOULD BE MASKED OFF.                    */
/*              BIT 1 - NOT USED SHOULD BE MASKED OFF.                    */
/*              BIT 0 - NOT USED SHOULD BE MASKED OFF.                    */
/*                                                                        */
/*      SYSTEM CONTROL BOARD SUPERVISOR PAL STATES:                       */
/*                                                                        */
/*              0 - LOAD TRIGGER TO LCA FOR PROGRAM LOAD MODE.            */
/*              1 - LOAD PROGRAM TO LCA.                                  */
/*              3 - LCA WAIT STATE (AFTER PROGRAM LOAD COMPLETE).         */
/*              4 - READ TRIGGER TO LCA FOR PROGRAM READ BACK MODE.       */
/*              5 - LCA PROGRAM READ.  USED TO VERIFY THE LCA PROGRAM.    */
/*              6 - RUN/E.  RUN WITH STATUS FAULTS ENABLED.               */
/*              7 - RUN/D.  RUN WITH STATUS FAULTS DISABLED.              */
/*              8 - PRESENT POWER FAULT.                                  */
/*              9 - LATCHED POWER FAULT.                                  */
/*             11 - STATUS FAULT.                                         */
/*             15 - RESET.                                                */
/*                                                                        */

/*                                                                        */
/*      SYSTEM CONTROL TIME DELAY REGISTER MODEL.                         */
/*                                                                        */
/*      WRITE:                                                            */
/*              SIX SIGNIFICANT BITS.  BITS 0 - 5.                        */
/*              BITS 6,7, AND 8 ARE NOT USED AND SHOULD MASKED OFF.       */
/*                                                                        */

/*                                                                        */
/*      SYSTEM CONTROL BOARD STATUS REGISTER MODEL.                       */
/*                                                                        */
/*      READ:                                                             */
/*              BIT 7 - SPINDLE AT 80 PER CENT SPEED.  TRUE = 1.          */
/*              BIT 6 - CLOCK HEAD UNLOADED.  TRUE = 1.                   */
/*              BIT 5 - CLOCK HEAD LOADED.  TRUE = 1.                     */
/*              BIT 4 - HDA MOUNTED.  TRUE = 1. NOT YET IMPLEMENTED.      */
/*              BIT 3 - HEAD LOAD RADIUS STOP.  TRUE = 1.                 */
/*              BIT 2 - HDA SAFE REMOVAL STOP.  TRUE = 1.                 */
/*              BIT 1 - INNER CRASH AND BURN STOP.  TRUE = 1.             */
/*              BIT 0 - OUTER CRASH AND BURN STOP.  TRUE = 1.             */
/*                                                                        */

/*                                                                        */
/*      SYSTEM CONTROL BOARD LCA REGISTER MODEL.                          */
/*                                                                        */
/*      WRITE (PROGRAM LOAD MODE ONLY):                                   */
/*              BIT 7 - NOT USED SHOULD BE MASKED OFF.                    */
/*              BIT 6 - NOT USED SHOULD BE MASKED OFF.                    */
/*              BIT 5 - NOT USED SHOULD BE MASKED OFF.                    */
/*              BIT 4 - NOT USED SHOULD BE MASKED OFF.                    */
/*              BIT 3 - NOT USED SHOULD BE MASKED OFF.                    */
```

```
/*          BIT 2 - NOT USED SHOULD BE MASKED OFF.              */
/*          BIT 1 - NOT USED SHOULD BE MASKED OFF.              */
/*          BIT 0 - SERIAL WRITE PROGRAM DATA.                  */
/*                                                              */
/*     WRITE (RUN MODE):                                        */
/*          BIT 7 - OPCODE.   SEE OPCODE DEFINITIONS.           */
/*          BIT 6 - OPCODE.   SEE OPCODE DEFINITIONS.           */
/*          BIT 5 - OPCODE.   SEE OPCODE DEFINITIONS.           */
/*          BIT 4 - OPCODE.   SEE OPCODE DEFINITIONS.           */
/*          BIT 3 - OPCODE.   SEE OPCODE DEFINITIONS.           */
/*          BIT 2 - OPCODE.   SEE OPCODE DEFINITIONS.           */
/*          BIT 1 - OPCODE.   SEE OPCODE DEFINITIONS.           */
/*          BIT 0 - OPCODE.   SEE OPCODE DEFINITIONS.           */
/*                                                              */
/*     READ (RUN MODE VALID ONLY AFTER PROGRAM LOADED):         */
/*          BIT 7 - OPERATIONAL STATUS.  OPERATION IN PROGRESS = 1. */
/*          BIT 6 - HARDWARE ERROR.  TRUE = 1. NOT YET IMPLEMENTED. */
/*          BIT 5 - LOSS OF LOCK OR CLOCK ERROR.  TRUE = 1. N.Y.I. */
/*          BIT 4 - VERFIY HAZARD.  TRUE = 1. NOT YET IMPLEMENTED. */
/*          BIT 3 - NOT USED SHOULD BE MASKED OFF.              */
/*          BIT 2 - NOT USED SHOULD BE MASKED OFF.              */
/*          BIT 1 - NOT USED SHOULD BE MASKED OFF.              */
/*          BIT 0 - WRITE FAULT.   TRUE = 1. NOT YET IMPLEMENTED. */
/*                                                              */
/*          SYSTEM CONTROL BOARD ADDRESS DEFINITIONS.           */ define SCBSE   0x0300   /* SYSTEM CONTROL BOARD DEFAULT BASE ADDRESS. */
define SCSUP   SCBSE    /* SYSTEM CONTROL BOARD SUPERVISOR PAL ADDRESS. */
#define SCLCA   SCBSE+1  /* SYSTEM CONTROL BOARD LCA ADDRESS.     */
#define SCDLY   SCBSE+2  /* SYSTEM CONTROL BOARD DELAY LINE ADDRESS. */
#define SCSTA   SCBSE+2  /* SYSTEM CONTROL BOARD STATUS REGISTER ADDRESS. */
#define SCDC0   SCBSE+4  /* SYSTEM CONTROL BOARD DAC 0 ADDRESS.   */
#define SCDC1   SCBSE+5  /* SYSTEM CONTROL BOARD DAC 1 ADDRESS.   */
#define SCDC2   SCBSE+6  /* SYSTEM CONTROL BOARD DAC 2 ADDRESS.   */
#define SCDC3   SCBSE+7  /* SYSTEM CONTROL BOARD DAC 3 ADDRESS.   */
#define CT1C1   SCBSE+8  /* SYSTEM CONTROL BOARD CTC1 CHANNEL 1 ADDRESS. */
#define CT1C2   SCBSE+9  /* SYSTEM CONTROL BOARD CTC1 CHANNEL 2 ADDRESS. */
#define CT1C3   SCBSE+10 /* SYSTEM CONTROL BOARD CTC1 CHANNEL 3 ADDRESS. */
#define CT1CT   SCBSE+11 /* SYSTEM CONTROL BOARD CTC1 CONTROL PORT ADD. */
#define CT2C1   SCBSE+12 /* SYSTEM CONTROL BOARD CTC2 CHANNEL 1 ADDRESS. */
#define CT2C2   SCBSE+13 /* SYSTEM CONTROL BOARD CTC2 CHANNEL 2 ADDRESS. */
#define CT2C3   SCBSE+14 /* SYSTEM CONTROL BOARD CTC2 CHANNEL 3 ADDRESS. */
#define CT2CT   SCBSE+15 /* SYSTEM CONTROL BOARD CTC2 CONTROL PORT ADD. */

/*          PROGRAMMABLE COUNTER TIMER COMMAND DEFINITIONS.     */ define C0MD0   0x0030   /* PROGRAMABLE COUNTER 0 MODE 0 COMMAND. */
define C1MD0   0x0070   /* PROGRAMABLE COUNTER 1 MODE 0 COMMAND. */
#define C2MD0   0x00B0   /* PROGRAMABLE COUNTER 2 MODE 0 COMMAND. */
#define C0MD1   0x0032   /* PROGRAMABLE COUNTER 0 MODE 1 COMMAND. */
#define C1MD1   0x0072   /* PROGRAMABLE COUNTER 1 MODE 1 COMMAND. */
#define C2MD1   0x00B2   /* PROGRAMABLE COUNTER 2 MODE 1 COMMAND. */
#define C0MD2   0x0034   /* PROGRAMABLE COUNTER 0 MODE 2 COMMAND. */
#define C1MD2   0x0074   /* PROGRAMABLE COUNTER 1 MODE 2 COMMAND. */
#define C2MD2   0x00B4   /* PROGRAMABLE COUNTER 2 MODE 2 COMMAND. */
#define C0MD3   0x0036   /* PROGRAMABLE COUNTER 0 MODE 3 COMMAND. */
#define C1MD3   0x0076   /* PROGRAMABLE COUNTER 1 MODE 3 COMMAND. */
#define C2MD3   0x00B6   /* PROGRAMABLE COUNTER 2 MODE 3 COMMAND. */
#define C0MD4   0x0038   /* PROGRAMABLE COUNTER 0 MODE 4 COMMAND. */
#define C1MD4   0x0078   /* PROGRAMABLE COUNTER 1 MODE 4 COMMAND. */
#define C2MD4   0x00B8   /* PROGRAMABLE COUNTER 2 MODE 4 COMMAND. */
#define C0MD5   0x003A   /* PROGRAMABLE COUNTER 0 MODE 5 COMMAND. */
#define C1MD5   0x007A   /* PROGRAMABLE COUNTER 1 MODE 5 COMMAND. */
#define C2MD5   0x00BA   /* PROGRAMABLE COUNTER 2 MODE 5 COMMAND. */
#define C0CLC   0x0000   /* PROGRAMABLE COUNTER 0 COUNTER LATCH COMMAND. */
#define C1CLC   0x0040   /* PROGRAMABLE COUNTER 1 COUNTER LATCH COMMAND. */
#define C2CLC   0x0080   /* PROGRAMABLE COUNTER 2 COUNTER LATCH COMMAND. */

/*          * * *   LOGIC CELL ARRAY OPCODE DEFINITIONS  * * *   */ define NOOP    0x0000   /* NON OPERATION OPCODE.                */
define WICK    0x0090   /* WRITE INDEX ON CLOCK HEAD OPCODE.    */
```

```
#define WIDA    0x0074  /* WRITE INDEX ON DATA HEAD OPCODE.            */
#define DECK    0x0098  /* START DC ERASE ON CLOCK HEAD OPCODE.        */
#define DEDA    0x009C  /* START DC ERASE ON DATA HEAD OPCODE.         */
#define SPSP    0x00A0  /* STOP SPINDLE OPCODE.                        */
#define STSP    0x00A1  /* START SPINDLE OPCODE.                       */
#define UALH    0x00A2  /* UNLOAD ALL HEADS OPCODE.                    */
#define LALH    0x00A3  /* LOAD ALL HEADS OPCODE.                      */
#define VCDA    0x00C4  /* VERIFY CLOCK ON DATA HEAD OPCODE.           */
#define VCCK    0x00CC  /* VERIFY CLOCK ON CLOCK HEAD OPCODE.          */
#define WHCK    0x00D0  /* WRITE HARD CLOCK ON CLOCK HEAD OPCODE.      */
#define WHCD    0x00D2  /* WRITE HARD CLK ON CLK HD CORR. DOWN OPCODE. */
#define WHCU    0x00D3  /* WRITE HARD CLK ON CLK HD CORR. UP OPCODE.   */
#define WHDA    0x00D4  /* WRITE HARD CLOCK ON DATA HEAD OPCODE.       */
#define WHDD    0x00D6  /* WRITE HARD CLK ON DATA HD CORR. DOWN OPCODE.*/
#define WHDU    0x00D7  /* WRITE HARD CLK ON DATA HD CORR. UP OPCODE.  */
#define WSCK    0x00D8  /* WRITE SOFT CLOCK TO CLOCK HEAD OPCODE.      */
#define WSCD    0x00DA  /* WRITE SOFT CLK TO CLK HD CORR. DWN. OPCODE. */
#define WSCU    0x00DB  /* WRITE SOFT CLK TO CLK HD CORR. UP  OPCODE.  */
#define WSDA    0x00DC  /* WRITE SOFT CLOCK TO DATA HEAD OPCODE.       */
#define WSDD    0x00DE  /* WRITE SFT CLK TO DATA HD COR. DWN. OPCODE.  */
#define WSDU    0x00DF  /* WRITE SOFT CLK TO DATA HD COR. UP OPCODE.   */

/*              * * *   LOGIC CELL ARRAY OPCODE DEFINITIONS   * * *

* * *   OPCODE DEFINITIONS SPECIFIC TO 6650 AND 7050 MAN.  * * *    */ define VNDR    0x00E0  /* VERIFY NORMAL DIRECT SERVO TRACK OPCODE.    */
define VNST    0x00E1  /* VERIFY NORMAL STAGGERED SERVO TRACK OPCODE. */
#define VQDR    0x00E2  /* VERIFY QUAD DIRECT SERVO TRACK OPCODE.      */
#define VQST    0x00E3  /* VERIFY QUAD STAGGERED SERVO TRACK OPCODE.   */
#define VND1    0x00E8  /* VERIFY NORM. DRCT. GB1 SERVO TRACK OPCODE.  */
#define VNS1    0x00E9  /* VERIFY NORM. STAG. GB1 SERVO TRACK OPCODE.  */
#define VQD1    0x00EA  /* VERIFY QUAD DIRECT GB1 SERVO TRACK OPCODE.  */
#define VQS1    0x00EB  /* VERIFY QUAD STAG. GB1 SERVO TRACK OPCODE.   */
#define VND2    0x00EC  /* VERIFY NORM. DRCT. GB2 SERVO TRACK OPCODE.  */
#define VNS2    0x00ED  /* VERIFY NORM. STAG. GB2 SERVO TRACK OPCODE.  */
#define VQD2    0x00EE  /* VERIFY QUAD DIRECT GB2 SERVO TRACK OPCODE.  */
#define VQS2    0x00EF  /* VERIFY QUAD STAG. GB2 SERVO TRACK OPCODE.   */
#define WNDR    0x00F0  /* WRITE NORMAL DIRECT SERVO TRACK OPCODE.     */
#define WNST    0x00F1  /* WRITE NORMAL STAGGERED SERVO TRACK OPCODE.  */
#define WQDR    0x00F2  /* WRITE QUAD DIRECT SERVO TRACK OPCODE.       */
#define WQST    0x00F3  /* WRITE QUAD STAGGERED SERVO TRACK OPCODE.    */
#define WND1    0x00F8  /* WRITE NORM. DRCT. GB1 SERVO TRACK OPCODE.   */
#define WNS1    0x00F9  /* WRITE NORM. STAG. GB1 SERVO TRACK OPCODE.   */
#define WQD1    0x00FA  /* WRITE QUAD DIRECT GB1 SERVO TRACK OPCODE.   */
#define WQS1    0x00FB  /* WRITE QUAD STAG. GB1 SERVO TRACK OPCODE.    */
#define WND2    0x00FC  /* WRITE NORM. DRCT. GB2 SERVO TRACK OPCODE.   */
#define WNS2    0x00FD  /* WRITE NORM. STAG. GB2 SERVO TRACK OPCODE.   */
#define WQD2    0x00FE  /* WRITE QUAD DIRECT GB2 SERVO TRACK OPCODE.   */
#define WQS2    0x00FF  /* WRITE QUAD STAG. GB2 SERVO TRACK OPCODE.    */

/*              * * *   LOGIC CELL ARRAY OPCODE DEFINITIONS   * * *

* * *   OPCODE DEFINITIONS SPECIFIC TO 803, 806, 807 AND 15450  * * *    */ define VPH0    0x00E0  /* VERIFY PHASE 0 SERVO TRACK OPCODE.          */
define VPH1    0x00E1  /* VERIFY PHASE 1 SERVO TRACK OPCODE.          */
#define VPH2    0x00E2  /* VERIFY PHASE 2 SERVO TRACK OPCODE.          */
#define VPH3    0x00E3  /* VERIFY PHASE 3 SERVO TRACK OPCODE.          */
#define V0G1    0x00E8  /* VERIFY PHASE 0 GB1 SERVO TRACK OPCODE.      */
#define V1G1    0x00E9  /* VERIFY PHASE 1 GB1 SERVO TRACK OPCODE.      */
#define V2G1    0x00EA  /* VERIFY PHASE 2 GB1 SERVO TRACK OPCODE.      */
#define V3G1    0x00EB  /* VERIFY PHASE 3 GB1 SERVO TRACK OPCODE.      */
#define V0G2    0x00EC  /* VERIFY PHASE 0 GB2 SERVO TRACK OPCODE.      */
#define V1G2    0x00ED  /* VERIFY PHASE 1 GB2 SERVO TRACK OPCODE.      */
#define V2G2    0x00EE  /* VERIFY PHASE 2 GB2 SERVO TRACK OPCODE.      */
#define V3G2    0x00EF  /* VERIFY PHASE 3 GB2 SERVO TRACK OPCODE.      */
#define WPH0    0x00F0  /* WRITE PHASE 0 SERVO TRACK OPCODE.           */
#define WPH1    0x00F1  /* WRITE PHASE 1 SERVO TRACK OPCODE.           */
#define WPH2    0x00F2  /* WRITE PHASE 2 SERVO TRACK OPCODE.           */
#define WPH3    0x00F3  /* WRITE PHASE 3 SERVO TRACK OPCODE.           */
#define W0G1    0x00F8  /* WRITE PHASE 0 GB1 SERVO TRACK OPCODE.       */
```

```c
#define W1G1    0x00F9  /* WRITE PHASE 1 GB1 SERVO TRACK OPCODE.    */
#define W2G1    0x00FA  /* WRITE PHASE 2 GB1 SERVO TRACK OPCODE.    */
#define W3G1    0x00FB  /* WRITE PHASE 3 GB1 SERVO TRACK OPCODE.    */
#define W0G2    0x00FC  /* WRITE PHASE 0 GB2 SERVO TRACK OPCODE.    */
#define W1G2    0x00FD  /* WRITE PHASE 1 GB2 SERVO TRACK OPCODE.    */
#define W2G2    0x00FE  /* WRITE PHASE 2 GB2 SERVO TRACK OPCODE.    */
#define W3G2    0x00FF  /* WRITE PHASE 3 GB2 SERVO TRACK OPCODE.    */

/*              * * * LOGIC CELL ARRAY OPCODE DEFINITIONS * * *

* * * OPCODE DEFINITIONS SPECIFIC TO 3350 * * *         */ define VNDA    0x00E0  /* VERIFY NORMAL DATA SERVO TRACK OPCODE.   */
define VQDA    0x00E1  /* VERIFY QUAD DATA SERVO TRACK OPCODE.     */
#define VNG1    0x00E6  /* VERIFY NORMAL GB1 SERVO TRACK OPCODE.    */
#define VQG1    0x00E7  /* VERIFY QUAD GB1 SERVO TRACK OPCODE.      */
#define VNG2    0x00EA  /* VERIFY NORMAL GB2 SERVO TRACK OPCODE.    */
#define VQG2    0x00EB  /* VERIFY QUAD GB2 SERVO TRACK OPCODE.      */
#define VNG3    0x00EE  /* VERIFY NORMAL GB3 SERVO TRACK OPCODE.    */
#define VQG3    0x00EF  /* VERIFY QUAD GB3 SERVO TRACK OPCODE.      */
#define WNDA    0x00F0  /* WRITE NORMAL DATA SERVO TRACK OPCODE.    */
#define WQDA    0x00F1  /* WRITE QUAD DATA SERVO TRACK OPCODE.      */
#define WNG1    0x00F8  /* WRITE NORMAL GB1 SERVO TRACK OPCODE.     */
#define WQG1    0x00F9  /* WRITE QUAD GB1 SERVO TRACK OPCODE.       */
#define WNG2    0x00FA  /* WRITE NORMAL GB2 SERVO TRACK OPCODE.     */
#define WQG2    0x00FB  /* WRITE QUAD GB2 SERVO TRACK OPCODE.       */
#define WNG3    0x00FE  /* WRITE NORMAL GB3 SERVO TRACK OPCODE.     */
#define WQG3    0x00FF  /* WRITE QUAD GB3 SERVO TRACK OPCODE.       */

/*              * * * SUPERVISOR PAL STATE DEFINITIONS * * *             */ define SPLTG   0x0000  /* PROGRAM LOAD TRIGGER STATE FOR SUPERVISOR PAL.*/
define SPPLD   0x0010  /* PROGRAM LOAD STATE FOR SUPERVISOR PAL.        */
#define SPWAT   0x0030  /* WAIT STATE FOR SUPERVISOR PAL.                */
#define SPRTG   0x0040  /* PROGRAM READ TRIGGER STATE FOR SUPERVISOR PAL.*/
#define SPPRD   0x0050  /* PROGRAM READ STATE FOR SUPERVISOR PAL.        */
#define SPRNE   0x0060  /* RUN WITH FAULTS ENABLED SUPERVISOR STATE.     */
#define SPRND   0x0070  /* RUN WITH FAULTS DISABLED SUPERVISOR STATE.    */
#define SPRST   0x00F0  /* RESET STATE FOR SUPERVISOR PAL.               */

SW.C

/*

COMPANY: *****  DATA EXCHANGE CORPORATION  *****
       FILE: SW.C
    PURPOSE: CONTROL PROGRAM FOR THE DATA EXCHANGE CORP. UNIVERSAL SERVO WRITER .
  REFERENCE: DATA EXCHANGE CORP. UNIVERSAL SERVO WRITER PRODUCT SPECIFICATION.

COPYRIGHT (C) 1987, 1988 BY DATA EXCHANGE CORPORATION.
           ALL RIGHTS RESERVED.
        PORTIONS OF THIS SOFTWARE COPYRIGHTED BY MICROSOFT INC. 1986

SOFTWARE PROJECT ENGINEER: PAUL ESPINOSA.

*/ include "swdefs.h"

main()

{
        Vidmde = scr_setup();
        scr_clr();
        init_sys();
/*
        lgopen();
```

```
*/
        main_menu();
        rst_mc();
        rst_sc();
        outp(SCSUP,SPRST);
/*
        lgclose();
*/
        scr_rowcol(0,0);
        scr_clr();
        exit(0);
} init_sys()

{
        unsigned int j,l;

scrap=SPACE;
        Win_val[0] = 10000;
        Win_val[1] = 20000;
        Win_val[2] = 30000;
        Ctr_val[0] = 0x0010;
        Ctr_val[1] = 0x0027;
        Ctr_val[2] = 0x0020;
        Ctr_val[3] = 0x004E;
        Ctr_val[4] = 0x0030;
        Ctr_val[5] = 0x0075;
        For_mrg = 27;
        Aft_mrg = 37;
        Comp_fact = 0;
        Dac0_val = 60;
        Dac1_val = 130;
        Dac2_val = 125;
        Dac3_val = 185;
        Dly_med = 32;
        Curcyl = 0;
        Ofst = 0;
        Clk_cnt = 0;
        Err_cnt = 0;
        Drv_typ=6;
        Typ_chg=1;
        Lca_typ=0;
        Mc_reg=0;
        Mc_sta=0;
        for (l = 0; l != 16; ++l)
                Mc_cmd[l] = 0;
        for (l = 0; l != 16; ++l)
                Mc_rsp[l] = 0;
        for (l = 0; l != 1450; ++l)
                for (j = 0; j != 3; ++j)
                        Tpt[l][j] = 0x0000FFFF;
        for (j = 0; j != 30; ++j)
                Map[j] = 0xFFFF;
        for (j = 0; j != 1450; ++j)
                for(l = 3; l != 8; ++l)
                        Tpt[j][l] = 0;
        tst_sc();
        tst_mc();
} clk_cl()

{
        unsigned int loop;

seek_cl();
        switch (Drv_typ) {
                case 1: Corrector = 7;            /* 3350 */
                        break;
```

```
            case 2: Corrector = 33;           /* 3450 MANUAL LOCK */
                    break;
            case 3: Corrector = 33;           /* 3450 */
                    break;
            case 4: Corrector = 33;           /* 7050 MANUAL LOCK */
                    break;
            case 5: Corrector = 33;           /* 7050 */
                    break;
            case 6: Corrector = 7;            /* 6650 */
                    break;
            case 7: Corrector = 7;            /* 15450 */
                    break;
            case 8: Corrector = 33;           /* 803 */
                    break;
            case 9: Corrector = 33;           /* 806-X3 */
                    break;
            case 10:Corrector = 33;           /* 806-X1 */
                    break;
            case 11:Corrector = 33;           /* 807 */
                    break;
        }
        for(loop = 0; loop != 10; ++loop) {
            if(Corrector < 2)
                    break;
            if(!(cnt_cls()))
                    continue;
            if(clk_vfy1())
                    return(1);
        }
        scr_rowcol(15,0);
        scr_cls();
        scr_rowcol(15,23);
        scr_aputs("* * *  CLOCK CLOSURE FAILED  * * *", NORM|BOLD|BLNK);
        scr_rowcol(18,20);
        scr_aputs("THIS DRIVE WILL NOT BE SERVO WRITTEN !!!", NORM|BOLD);
        msg();
        return(0);
} cls_init()

{
        outp(SCLCA,STSP);
        sleep_tk(1);
        outp(SCDLY,128);
        sleep_tk(3);
        outp(SCDLY,0);
        sleep_tk(3);
        outp(SCLCA,NOOP);
        sleep_tk(1);
        outp(SCDC1,Dac1_val);
        outp(SCDC2,Dac2_val);
        outp(SCDC3,Dac3_val);
        set_ioxi();
        outp(CT2CT,C2MD2);
        outp(CT2C3,Corrector);
        outp(CT2C3,0);
        sleep_tk(1);
        outp(SCLCA,NOOP);
} cnt_cls()

{
        float tmpcnt,errtmp,ftmp,fcon;
        unsigned int corcnt,pascnt,pass;
        unsigned int a,b,c,flg;

disp_logo();
        scr_rowcol(7,33);
        scr_aputs(" CLOCK CLOSURE ", RVSE);
```

```
scr_rowcol(14,26);
scr_aputs("ATTEMPTING CLOCK CLOSURE !!!", NORM|BOLD|BLNK);

for(pascnt = 0; pascnt != 4; ++pascnt) { cls_init();
        flg = 1;

de_ch();
        de_ch();
        outp(SCDC2,152);
        sleep_tk(1);

outp(SCLCA,WHCU);
        sleep_tk(1);
        if (inp(SCLCA) & 0x0080) {
                outp(SCLCA,NOOP);
                scr_rowcol(20,24);
                scr_aputs(" WRITE HARD CLOCK TIMEOUT ERROR ",RVSE);
                msg();
                scr_rowcol(20,0);
                scr_cls();
        }
        sleep_tk(1);

for(pass = 0; pass != 4; ++pass) { de_dh();
                de_dh();
                sleep_tk(1);

outp(SCLCA,WIDA);
                sleep_tk(1);
                if (inp(SCLCA) & 0x0080) {
                        outp(SCLCA,NOOP);
                        scr_rowcol(20,23);
                        scr_aputs(
                        " WRITE INDEX (SERVO) TIMEOUT ERROR ",RVSE);
                        msg();
                        scr_rowcol(20,0);
                        scr_cls();
                }
                sleep_tk(1);

outp(SCDC1,19);
                outp(CT1C3,255);
                outp(CT1C3,255);
                sleep_tk(1);

outp(SCLCA,VCCK);
                sleep_tk(1);
                if (inp(SCLCA) & 0x0080) {
                        outp(SCLCA,NOOP);
                        scr_rowcol(20,23);
                        scr_aputs(
                        " VERIFY CLOCK TIMEOUT ERROR ", RVSE);
                        msg();
                        scr_rowcol(20,0);
                        scr_cls();
                } a = inp(CT1C3) & 0x00FF;
                b = inp(CT1C3) & 0x00FF;
                Clk_cnt = (256*(255 - b)) + (255 - a);
                switch (Drv_typ) {
                        case 1: Err_cnt = 30239 - Clk_cnt;
                                break;
                        case 2: Err_cnt = 20159 - Clk_cnt;
                                break;
                        case 3: Err_cnt = 20159 - Clk_cnt;
                                break;
                        case 4: Err_cnt = 20159 - Clk_cnt;
                                break;
```

```
                case 5: Err_cnt = 20159 - Clk_cnt;
                        break;
                case 6: Err_cnt = 30239 - Clk_cnt;
                        break;
                case 7: Err_cnt = 30239 - Clk_cnt;
                        break;
                case 8: Err_cnt = 20159 - Clk_cnt;
                        break;
                case 9: Err_cnt = 20159 - Clk_cnt;
                        break;
                case 10:Err_cnt = 20159 - Clk_cnt;
                        break;
                case 11:Err_cnt = 20159 - Clk_cnt;
                        break;
        } if(Err_cnt == 0) {
                if(flg) {
                        cls_out(1);
                } else {
                        cls_out(0);
                }
                return(1);
        } if(Err_cnt < 0) {
                c = Err_cnt * -1;
        } else {
                c = Err_cnt;
        }
        if(c > 59) {
                if(Err_cnt < 0) {
                        ++Corrector;
                } else {
                        --Corrector;
                }
                return(0);
        } if(pass > 0)
                break;

flg = 0;

errtmp = Err_cnt;
        if(Err_cnt < 0) {
                switch (Drv_typ) {
                        case 1: tmpcnt = 7500 / (errtmp * -1);
                                break;
                        case 2: tmpcnt = 5000 / (errtmp * -1);
                                break;
                        case 3: tmpcnt = 5000 / (errtmp * -1);
                                break;
                        case 4: tmpcnt = 5000 / (errtmp * -1);
                                break;
                        case 5: tmpcnt = 5000 / (errtmp * -1);
                                break;
                        case 6: tmpcnt = 7500 / (errtmp * -1);
                                break;
                        case 7: tmpcnt = 7500 / (errtmp * -1);
                                break;
                        case 8: tmpcnt = 5000 / (errtmp * -1);
                                break;
                        case 9: tmpcnt = 5000 / (errtmp * -1);
                                break;
                        case 10:tmpcnt = 5000 / (errtmp * -1);
                                break;
                        case 11:tmpcnt = 5000 / (errtmp * -1);
                                break;
                }
        } else {
                switch (Drv_typ) {
                        case 1: tmpcnt = 7500 / errtmp;
```

```
                              break;
                    case 2: tmpcnt = 5000 / errtmp;
                              break;
                    case 3: tmpcnt = 5000 / errtmp;
                              break;
                    case 4: tmpcnt = 5000 / errtmp;
                              break;
                    case 5: tmpcnt = 5000 / errtmp;
                              break;
                    case 6: tmpcnt = 7500 / errtmp;
                              break;
                    case 7: tmpcnt = 7500 / errtmp;
                              break;
                    case 8: tmpcnt = 5000 / errtmp;
                              break;
                    case 9: tmpcnt = 5000 / errtmp;
                              break;
                    case 10:tmpcnt = 5000 / errtmp;
                              break;
                    case 11:tmpcnt = 5000 / errtmp;
                              break;
          }
} outp(SCDC1,130);
outp(CT1C3,265-a);
outp(CT1C3,255-b);
sleep_tk(1);

c = tmpcnt;
ftmp = c;
fcon = .5;
corcnt = ((tmpcnt - ftmp) > fcon) ? (ftmp + 1) : ftmp;
b = corcnt & 0xFF00;
b >>= 8;
a = corcnt & 0x00FF;

outp(CT2C3,a);
outp(CT2C3,b);
sleep_tk(1);

de_dh();
de_dh();
sleep_tk(1);

if(Err_cnt < 0) {
          outp(SCLCA,WSDD);
} else {
          outp(SCLCA,WSDU);
}
sleep_tk(1);
if (inp(SCLCA) & 0x0080) {
          outp(SCLCA,NOOP);
          scr_rowcol(20,23);
          scr_aputs(
     " WRITE SOFT CLOCK WITH CORRECTION TIMEOUT ERROR "
          , RVSE);
          msg();
          scr_rowcol(20,0);
          scr_cls();
}
sleep_tk(1);

set_idx();
sleep_tk(1);

de_ch();
de_ch();
outp(SCDC2,126);
sleep_tk(1);

outp(SCLCA,WSCK);
sleep_tk(1);
```

```c
                       if (inp(SCLCA) & 0x0080) {
                               outp(SCLCA,NOOP);
                               scr_rowcol(20,23);
                               scr_aputs(
                               " WRITE SOFT CLOCK (CLOCK) TIMEOUT ERROR "
                               , RVSE);
                               msg();
                               scr_rowcol(20,0);
                               scr_cls();
                       }
                       sleep_tk(1);
               }
       }
       cls_out(0);
       scr_rowcol(20,23);
       scr_aputs(" CLOSURE FAILED AFTER 10 PASSES !!! ", RVSE);
       msg();
       scr_rowcol(20,0);
       scr_cls();
} cls_out(flg)

unsigned int flg;

{
       set_idx();
       outp(SCDC2,130);
       if(flg) {
               de_dh();
               de_dh();
               sleep_tk(1);

outp(SCLCA,WSDA);
               sleep_tk(1);
               if (inp(SCLCA) & 0x0080) {
                       outp(SCLCA,NOOP);
                       scr_rowcol(20,23);
                       scr_aputs(" WRITE SOFT CLOCK TIMEOUT ERROR ", RVSE);
                       msg();
                       scr_rowcol(20,0);
                       scr_cls();
               }
               sleep_tk(1);

de_ch();
               de_ch();
               sleep_tk(1);

outp(SCLCA,WSCK);
               sleep_tk(1);
               if (inp(SCLCA) & 0x0080) {
                       outp(SCLCA,NOOP);
                       scr_rowcol(20,23);
                       scr_aputs(
                           " WRITE SOFT CLOCK (CLOCK) TIMEOUT ERROR ", RVSE);
                       msg();
                       scr_rowcol(20,0);
                       scr_cls();
               }
               sleep_tk(1);
       }
       de_dh();
       de_dh();
       de_dh();
       outp(SCLCA,NOOP);
}
```

SWCOM.C

```c
/*

COMPANY: *****  DATA EXCHANGE CORPORATION  *****
      FILE: SWCOM.C
   PURPOSE: COMMON SUBROUTINES FOR THE UNIVERSAL SERVO WRITER PROGRAM.
 REFERENCE: FILE SW.C

COPYRIGHT (C) 1987, 1988 BY DATA EXCHANGE CORPORATION.
              ALL RIGHTS RESERVED.
           PORTIONS OF THIS SOFTWARE COPYRIGHTED BY MICROSOFT INC. 1985

SOFTWARE PROJECT ENGINEER: PAUL ESPINOSA.

*/ define EXTERN   /* */ include "swdefs.h"

ident()

{
        switch (Drv_typ) {
                case 1: Tpd = 1246;             /* 3350 */
                        break;
                case 2: Tpd = 1248;             /* 3450 MANUAL LOCK */
                        break;
                case 3: Tpd = 1248;             /* 3450 */
                        break;
                case 4: Tpd = 1248;             /* 7050 MANUAL LOCK */
                        break;
                case 5: Tpd = 1248;             /* 7050 */
                        break;
                case 6: Tpd = 1273;             /* 6650 */
                        break;
                case 7: Tpd = 1275;             /* 15450 */
                        break;
                case 8: Tpd = 1248;             /* 803 */
                        break;
                case 9: Tpd = 1896;             /* 806-X3 */
                        break;
                case 10:Tpd = 1729;             /* 806-X1 */
                        break;
                case 11:Tpd = 1896;             /* 807 */
                        break;
        }
} typ_dis()
{
        scr_rowcol(8,3);
        scr_aputs(" DRIVE MODEL ", RVSE);
        scr_rowcol(11,1);
        scr_aputs(" TOTAL CYLINDERS ", RVSE);
        scr_rowcol(9,7);
        switch (Drv_typ) {
                case 1: puts("3350");
                        break;
                case 2: puts("3450M");
                        break;
                case 3: puts("3450");
                        break;
                case 4: puts("7050M");
                        break;
                case 5: puts("7050");
                        break;
```

```
                case 6: puts("6650");
                        break;
                case 7: puts("15450");
                        break;
                case 8: puts("803");
                        break;
                case 9: puts("806-X3");
                        break;
                case 10:puts("806-X1");
                        break;
                case 11:puts("807");
                        break;
        }
        scr_rowcol(12,7);
        printf("%u",Tpd);
} bld_tpt()

{
        float lp,spr,tpi,cte,cor;
        float dts,ass,spt,ept,mae;
        unsigned long int sptint,l;
        unsigned int j;
        unsigned int k;

ident();
        set_vfr();
        if(!(Typ_chg))
                return;
        scr_rowcol(14,18);
        scr_aputs(
              "BUILDING TRACK POSITION TABLE AND DRIVE MAP !", NORM!BOLD!BLNK);
        for (j = 0; j != 1450; ++j)
                for (k = 0; k != 4; ++k)
                        Tpt[j][k] = 0x0000FFFF;
        switch (Drv_typ) {
                case 1: Cpd=1246;                       /* 3350 */
                        tpi=960;
                        lp=.025;
                        spr=4000;
                        cor=(1-.9997)/160000;
                        break;
                case 2: Cpd=1248;                       /* 3450 MANUAL LOCK */
                        tpi=960;
                        lp=.025;
                        spr=4000;
                        cor=(1-.9997)/160000;
                        break;
                case 3: Cpd=1248;                       /* 3450 */
                        tpi=960;
                        lp=.025;
                        spr=4000;
                        cor=(1-.9997)/160000;
                        break;
                case 4: Cpd=1248;                       /* 7050 MANUAL LOCK */
                        tpi=960;
                        lp=.025;
                        spr=4000;
                        cor=(1-.9997)/160000;
                        break;
                case 5: Cpd=1248;                       /* 7050 */
                        tpi=960;
                        lp=.025;
                        spr=4000;
                        cor=(1-.9997)/160000;
                        break;
                case 6: Cpd=1273;                       /* 6650 */
                        tpi=960;
                        lp=.025;
                        spr=4000;
```

```
                cor=(1-.9997)/160000;
                break;
        case 7: Cpd=1275;                       /* 15450. */
                tpi=960;
                lp=.025;
                spr=4000;
                cor=(1-.9997)/160000;
                break;
        case 8: Cpd=1248;                       /* 803 */
                tpi=960;
                lp=.025;
                spr=4000;
                cor=(1-.9997)/160000;
                break;
        case 9: Cpd=1896;                       /* 806-X3 */
                tpi=1040;
                lp=.025;
                spr=4000;
                cor=(1-.9997)/160000;
                break;
        case 10:Cpd=1729;                       /* 806-X1 */
                tpi=960;
                lp=.025;
                spr=4000;
                cor=(1-.9997)/160000;
                break;
        case 11:Cpd=1896;                       /* 807 */
                tpi=1040;
                lp=.025;
                spr=4000;
                cor=(1-.9997)/160000;
                break;
        } dts = 1/tpi;
        ass = (lp/spr) - cor;
        sptint = dts/ass;
        spt = sptint;
        ept = (spt * ass) - dts;
        mae = (ass * 1.1)/2;

Tpt[0][0] = 0;
        cte = 0;
        l = 0;
        for(j=1; j != Cpd+105; ++j) {
                l += sptint;
                cte += ept;
                if(cte > mae) {
                        --l;
                        cte -= ass;
                }
                if(cte < (-1 * mae)) {
                        ++l;
                        cte += ass;
                }
                Tpt[j][0] = l;
        }
        bld_map();
        Typ_chg = 0;
        scr_rowcol(14,15);
        scr_clrl();
} bld_map()

{
        switch (Drv_typ) {
                case 1: Map[0] = 90;            /* 3350 */
                        Map[1] = WQG1;
                        Map[2] = WQG1;
                        Map[3] = WNG1;
```

```
                    Map[4] = WNG1;
                    Map[5] = 14;
                    Map[6] = WNG2;
                    Map[7] = WNG2;
                    Map[8] = WQG2;
                    Map[9] = WQG2;
                    Map[10] = 4;
                    Map[11] = WQDA;
                    Map[12] = WQDA;
                    Map[13] = WQDA;
                    Map[14] = WQDA;
                    Map[15] = 1124;
                    Map[16] = WQDA;
                    Map[17] = WQDA;
                    Map[18] = WNDA;
                    Map[19] = WNDA;
                    Map[20] = 14;
                    Map[21] = WQG3;
                    Map[22] = WQG3;
                    Map[23] = WNG3;
                    Map[24] = WNG3;
                    break;
          case 2:   Map[0] = 44;              /* 3450 MANUAL LOCK */
                    Map[1] = WQS1;
                    Map[2] = WQD1;
                    Map[3] = WNS1;
                    Map[4] = WND1;
                    Map[5] = 1049;
                    Map[6] = WQST;
                    Map[7] = WQDR;
                    Map[8] = WNST;
                    Map[9] = WNDR;
                    Map[10] = 5;
                    Map[11] = WQDR;
                    Map[12] = WNST;
                    Map[13] = WQDR;
                    Map[14] = WNST;
                    Map[15] = 14;
                    Map[16] = WNS1;
                    Map[17] = WND1;
                    Map[18] = WQS1;
                    Map[19] = WQD1;
                    Map[20] = 136;
                    Map[21] = WQS2;
                    Map[22] = WQD2;
                    Map[23] = WNS2;
                    Map[24] = WND2;
                    break;
          case 3:   Map[0] = 44;              /* 3450 */
                    Map[1] = W3G1;
                    Map[2] = W0G1;
                    Map[3] = W1G1;
                    Map[4] = W2G1;
                    Map[5] = 1049;
                    Map[6] = WPH3;
                    Map[7] = WPH0;
                    Map[8] = WPH1;
                    Map[9] = WPH2;
                    Map[10] = 5;
                    Map[11] = WPH0;
                    Map[12] = WPH1;
                    Map[13] = WPH0;
                    Map[14] = WPH1;
                    Map[15] = 14;
                    Map[16] = W1G1;
                    Map[17] = W2G1;
                    Map[18] = W3G1;
                    Map[19] = W0G1;
                    Map[20] = 136;
                    Map[21] = W3G2;
                    Map[22] = W0G2;
                    Map[23] = W1G2;
                    Map[24] = W2G2;
                    break;
```

```
case 4: Map[0] = 44;             /* 7050 MANUAL LOCK */
        Map[1] = WQS1;
        Map[2] = WQD1;
        Map[3] = WNS1;
        Map[4] = WND1;
        Map[5] = 1049;
        Map[6] = WQST;
        Map[7] = WQDR;
        Map[8] = WNST;
        Map[9] = WNDR;
        Map[10] = 5;
        Map[11] = WQDR;
        Map[12] = WNST;
        Map[13] = WQDR;
        Map[14] = WNST;
        Map[15] = 14;
        Map[16] = WNS1;
        Map[17] = WND1;
        Map[18] = WQS1;
        Map[19] = WQD1;
        Map[20] = 136;
        Map[21] = WQS2;
        Map[22] = WQD2;
        Map[23] = WNS2;
        Map[24] = WND2;
        break;
case 5: Map[0] = 44;             /* 7050 */
        Map[1] = W3G1;
        Map[2] = W0G1;
        Map[3] = W1G1;
        Map[4] = W2G1;
        Map[5] = 1049;
        Map[6] = WPH3;
        Map[7] = WPH0;
        Map[8] = WPH1;
        Map[9] = WPH2;
        Map[10] = 5;
        Map[11] = WPH0;
        Map[12] = WPH1;
        Map[13] = WPH0;
        Map[14] = WPH1;
        Map[15] = 14;
        Map[16] = W1G1;
        Map[17] = W2G1;
        Map[18] = W3G1;
        Map[19] = W0G1;
        Map[20] = 136;
        Map[21] = W3G2;
        Map[22] = W0G2;
        Map[23] = W1G2;
        Map[24] = W2G2;
        break;
case 6: Map[0] = 89;             /* 6650 */
        Map[1] = WND2;
        Map[2] = WNS2;
        Map[3] = WQD2;
        Map[4] = WQS2;
        Map[5] = 15;
        Map[6] = WNS1;
        Map[7] = WQD1;
        Map[8] = WQS1;
        Map[9] = WND1;
        Map[10] = 5;
        Map[11] = WNDR;
        Map[12] = WNDR;
        Map[13] = WNDR;
        Map[14] = WNDR;
        Map[15] = 1121;
        Map[16] = WNST;
        Map[17] = WQDR;
        Map[18] = WQST;
        Map[19] = WNDR;
        Map[20] = 43;
```

```
                Map[21] = W0D1;
                Map[22] = W0S1;
                Map[23] = WND1;
                Map[24] = WNS1;
                break;
      case 7:   Map[0] = 89;                    /* 15450 */
                Map[1] = W2G2;
                Map[2] = W3G2;
                Map[3] = W0G2;
                Map[4] = W1G2;
                Map[5] = 15;
                Map[6] = W3G1;
                Map[7] = W0G1;
                Map[8] = W1G1;
                Map[9] = W2G1;
                Map[10] = 5;
                Map[11] = WPH2;
                Map[12] = WPH2;
                Map[13] = WPH2;
                Map[14] = WPH2;
                Map[15] = 1121;
                Map[16] = WPH3;
                Map[17] = WPH0;
                Map[18] = WPH1;
                Map[19] = WPH2;
                Map[20] = 45;
                Map[21] = W0G1;
                Map[22] = W1G1;
                Map[23] = W2G1;
                Map[24] = W3G1;
                break;
      case 8:   Map[0] = 44;                    /* 603 */
                Map[1] = W3G1;
                Map[2] = W0G1;
                Map[3] = W1G1;
                Map[4] = W2G1;
                Map[5] = 1049;
                Map[6] = WPH3;
                Map[7] = WPH0;
                Map[8] = WPH1;
                Map[9] = WPH2;
                Map[10] = 5;
                Map[11] = WPH0;
                Map[12] = WPH1;
                Map[13] = WPH0;
                Map[14] = WPH1;
                Map[15] = 14;
                Map[16] = W1G1;
                Map[17] = W2G1;
                Map[18] = W3G1;
                Map[19] = W0G1;
                Map[20] = 136;
                Map[21] = W3G2;
                Map[22] = W0G2;
                Map[23] = W1G2;
                Map[24] = W2G2;
                break;
      case 9:   Map[0] = 134;                   /* 806-X3 */
                Map[1] = W2G1;
                Map[2] = W3G1;
                Map[3] = W0G1;
                Map[4] = W1G1;
                Map[5] = 1027;
                Map[6] = WPH0;
                Map[7] = WPH1;
                Map[8] = WPH2;
                Map[9] = WPH3;
                Map[10] = 528;
                Map[11] = W3G1;
                Map[12] = W0G1;
                Map[13] = W1G1;
                Map[14] = W2G1;
                Map[15] = 6;
```

```
            Map[16] = WPH2;
            Map[17] = WPH2;
            Map[18] = WPH2;
            Map[19] = WPH2;
            Map[20] = 13;
            Map[21] = W3G1;
            Map[22] = W0G1;
            Map[23] = W1G1;
            Map[24] = W2G1;
            Map[25] = 106;
            Map[26] = W0G2;
            Map[27] = W1G2;
            Map[28] = W2G2;
            Map[29] = W3G2;
            Map[30] = 82;
            Map[31] = W2G2;
            Map[32] = W2G2;
            Map[33] = W2G2;
            Map[34] = W2G2;
            break;
case 10:Map[0] = 134;               /* 806-X1 */
            Map[1] = W3G2;
            Map[2] = W0G2;
            Map[3] = W1G2;
            Map[4] = W2G2;
            Map[5] = 1442;
            Map[6] = WPH1;
            Map[7] = WPH2;
            Map[8] = WPH3;
            Map[9] = WPH0;
            Map[10] = 7;
            Map[11] = WPH3;
            Map[12] = WPH3;
            Map[13] = WPH3;
            Map[14] = WPH3;
            Map[15] = 13;
            Map[16] = W0G1;
            Map[17] = W1G1;
            Map[18] = W2G1;
            Map[19] = W3G1;
            Map[20] = 105;
            Map[21] = W1G2;
            Map[22] = W2G2;
            Map[23] = W3G2;
            Map[24] = W0G2;
            Map[25] = 28;
            Map[26] = W2G2;
            Map[27] = W2G2;
            Map[28] = W2G2;
            Map[29] = W2G2;
            break;
case 11:Map[0] = 134;               /* 807 */
            Map[1] = W2G1;
            Map[2] = W3G1;
            Map[3] = W0G1;
            Map[4] = W1G1;
            Map[5] = 1027;
            Map[6] = WPH0;
            Map[7] = WPH1;
            Map[8] = WPH2;
            Map[9] = WPH3;
            Map[10] = 528;
            Map[11] = WPH3;
            Map[12] = WPH0;
            Map[13] = WPH1;
            Map[14] = WPH2;
            Map[15] = 6;
            Map[16] = WPH2;
            Map[17] = WPH2;
            Map[18] = WPH2;
            Map[19] = WPH2;
            Map[20] = 13;
            Map[21] = W3G1;
```

```
                Map[22] = W0G1;
                Map[23] = W1G1;
                Map[24] = W2G1;
                Map[25] = 106;
                Map[26] = W0G2;
                Map[27] = W1G2;
                Map[28] = W2G2;
                Map[29] = W3G2;
                Map[30] = 82;
                Map[31] = W2G2;
                Map[32] = W2G2;
                Map[33] = W2G2;
                Map[34] = W2G2;
                break;

}
        stuffer();
} stuffer()

{
        stf_map(0,Map[0],Map[1],Map[2],Map[3],Map[4]);
        stf_map(Map[0],Map[0]+Map[5],Map[6],Map[7],Map[8],Map[9]);
        stf_map(Map[0]+Map[5],Map[0]+Map[5]+Map[10],
                Map[11],Map[12],Map[13],Map[14]);
        stf_map(Map[0]+Map[5]+Map[10],Map[0]+Map[5]+Map[10]+Map[15],
                Map[16],Map[17],Map[18],Map[19]);
        stf_map(Map[0]+Map[5]+Map[10]+Map[15],
                Map[0]+Map[5]+Map[10]+Map[15]+Map[20],
                Map[21],Map[22],Map[23],Map[24]);

if((Drv_typ == 9) || (Drv_typ == 10) || (Drv_typ == 11)) {
                stf_map(Map[0]+Map[5]+Map[10]+Map[15]+Map[20],
                    Map[0]+Map[5]+Map[10]+Map[15]+Map[20]+Map[25],
                    Map[26],Map[27],Map[28],Map[29]);
        } if((Drv_typ == 9) || (Drv_typ == 11)) {
                stf_map(Map[0]+Map[5]+Map[10]+Map[15]+Map[20]+Map[25],
                    Map[0]+Map[5]+Map[10]+Map[15]+Map[20]+Map[25]+Map[30],
                    Map[31],Map[32],Map[33],Map[34]);
        } stf_mapa(0,Map[0],
                Map[1]-0x0010,Map[2]-0x0010,Map[3]-0x0010,Map[4]-0x0010);
        stf_mapa(Map[0],Map[0]+Map[5],
                Map[6]-0x0010,Map[7]-0x0010,Map[8]-0x0010,Map[9]-0x0010);
        stf_mapa(Map[0]+Map[5],Map[0] + Map[5] + Map[10],
                Map[11]-0x0010,Map[12]-0x0010,Map[13]-0x0010,Map[14]-0x0010);
        stf_mapa(Map[0]+Map[5]+Map[10],Map[0]+Map[5]+Map[10]+Map[15],
                Map[16]-0x0010,Map[17]-0x0010,Map[18]-0x0010,Map[19]-0x0010);
        stf_mapa(Map[0]+Map[5]+Map[10]+Map[15],
                Map[0]+Map[5]+Map[10]+Map[15]+Map[20],
                Map[21]-0x0010,Map[22]-0x0010,Map[23]-0x0010,Map[24]-0x0010);

if((Drv_typ == 9) || (Drv_typ == 10) || (Drv_typ == 11)) {
                stf_mapa(Map[0]+Map[5]+Map[10]+Map[15]+Map[20],
                Map[0]+Map[5]+Map[10]+Map[15]+Map[20]+Map[25],
                Map[26]-0x0010,Map[27]-0x0010,Map[28]-0x0010,Map[29]-0x0010);
        } if((Drv_typ == 9) || (Drv_typ == 11)) {
                stf_mapa(Map[0]+Map[5]+Map[10]+Map[15]+Map[20]+Map[25],
                Map[0]+Map[5]+Map[10]+Map[15]+Map[20]+Map[25]+Map[30],
                Map[31]-0x0010,Map[32]-0x0010,Map[33]-0x0010,Map[34]-0x0010);
        }
} ld_lca()

{
        char filstr[80];
```

```c
char filnme[12];
unsigned int j,k,x;
scr_rowcol(14,0);
scr_cls();
if(!(Scbd)) {
        scr_rowcol(14,21);
        scr_aputs(" SYSTEM CONTROL BOARD DID NOT RESPOND !!! ", RVSE);
        msg();
        longjmp(Menu_area,1);
}
if(Lca_typ == Drv_typ)
        return;
switch (Drv_typ) {
        case 1: strcpy(filnme,"P3350.RBT");     /* 3350 */
                break;
        case 2: strcpy(filnme,"P7050M.RBT");    /* 3450 MANUAL LOCK */
                break;
        case 3: strcpy(filnme,"P803.RBT");      /* 3450 */
                break;
        case 4: strcpy(filnme,"P7050M.RBT");    /* 7050 MANUAL LOCK */
                break;
        case 5: strcpy(filnme,"P803.RBT");      /* 7050 */
                break;
        case 6: strcpy(filnme,"P6650.RBT");     /* 6650 */
                break;
        case 7: strcpy(filnme,"P15450.RBT");    /* 15450 */
                break;
        case 8: strcpy(filnme,"P803.RBT");      /* 803 */
                break;
        case 9: strcpy(filnme,"P803.RBT");      /* 806-X3 */
                break;
        case 10:strcpy(filnme,"P803.RBT");      /* 806-X1 */
                break;
        case 11:strcpy(filnme,"P803.RBT");      /* 807 */
                break;
}
if ((Lfd = fopen(filnme, "r")) == NULL) {
        scr_rowcol(16,21);
        scr_aputs(
"THE CONFIGURATION PROGRAM FOR THIS DRIVE", NORM | BOLD);
        scr_rowcol(18,33);
        scr_aputs("WAS NOT FOUND !!!", NORM | BOLD);
        putch(7);
        scr_rowcol(22,19);
        scr_aputs(" STRIKE ANY KEY TO RETURN TO MAIN MENU... ", RVSE);
        scrap=getch();
        longjmp(Menu_area, 1);
}
scr_rowcol(16,17);
scr_aputs(
"LOADING CONFIGURATION PROGRAM TO SYSTEM CONTROLLER !",NORM|BOLD|BLNK);
for (k = 1; k != 8; ++k)
        fgets(filstr, 80, Lfd);
j = 0;
outp(SCSUP,SPRST);
sleep_tk(1);
outp(SCSUP,SPLTG);
sleep_tk(1);
outp(SCSUP,SPPLD);

do {
        k = fgetc(Lfd) & 0x00FF;
        if (k == 48 || k == 49)
                outp(SCLCA, k - 48);
        if((inp(SCSUP) & 0x00F0) != SPPLD) {
                scr_rowcol(16,11);
                scr_cls();
                scr_rowcol(16,21);
                scr_aputs(
        " CONFIGURATION PROGRAM LOAD ERROR !!! ",NORM|BOLD|BLNK);
                scr_rowcol(18,11);
                scr_aputs(
```

```
                " SYSTEM SUPERVISOR CHANGED STATE BEFORE LOAD COMPLETE !!! ",RVSE);
                        putch(7);
                        scr_rowcol(22,19);
                        scr_aputs(
                        " STRIKE ANY KEY TO RETURN TO MAIN MENU... ", RVSE);
                        scrap=getch();
                        longjmp(Menu_area, 1);
                }
        } while (!feof(Lfd));
        if (fclose(Lfd) == EOF) {
                scr_rowcol(16,11);
                scr_cls();
                scr_rowcol(16,21);
                scr_aputs(" CONFIGURATION PROGRAM LOAD ERROR !!! ",RVSE);
                scr_rowcol(18,23);
                scr_aputs(" ERROR CLOSING CONFIGURATION FILE ", RVSE);
                putch(7);
                scr_rowcol(22,19);
                scr_aputs(" STRIKE ANY KEY TO RETURN TO MAIN MENU... ", RVSE);
                scrap=getch();
                longjmp(Menu_area, 1);
        } outp(SCLCA,1);
        outp(SCLCA,1);
        outp(SCLCA,1);
        outp(SCLCA,1);
        outp(SCLCA,1);

if((inp(SCSUP) & 0x00F0) != SPWAT) {
                scr_rowcol(16,11);
                scr_cls();
                scr_rowcol(16,21);
                scr_aputs(
                " CONFIGURATION PROGRAM LOAD ERROR !!! ",NORM|BOLD|BLNK);
                scr_rowcol(18,13);
                scr_aputs(
                " SYSTEM SUPERVISOR NOT READY AFTER LOAD COMPLETE !!! ",RVSE);
                putch(7);
                scr_rowcol(22,19);
                scr_aputs(" STRIKE ANY KEY TO RETURN TO MAIN MENU... ", RVSE);
                scrap=getch();
                longjmp(Menu_area, 1);
        }
        outp(SCSUP,SPRST);
        sleep_tk(1);
        Lca_typ = Drv_typ;
        scr_rowcol(16,10);
        scr_cls();
} rst_sc()

{
        if (Scbd) {
                outp(SCLCA,NOOP);
                sleep_tk(1);
                outp(SCDLY,0x0020);
                outp(SCDC0,Dac0_val);
                outp(SCDC1,Dac1_val);
                outp(SCDC2,Dac2_val);
                outp(SCDC3,Dac3_val);
                outp(CT1CT,C0MD4);
                outp(CT1C1,0);
                outp(CT1C1,0);
                outp(CT1CT,C1MD4);
                outp(CT1C2,0x0010);
                outp(CT1C2,0x0027);
                set_idx1();
                outp(CT2CT,C0MD4);
                outp(CT2C1,0);
                outp(CT2C1,0);
```

```
            outp(CT2CT,C1MD4);
            outp(CT2C2,0);
            outp(CT2C2,0);
            outp(CT2CT,C2MD2);
            switch (Drv_typ) {
                    case 1: outp(CT2C3,7);          /* 3350 */
                            outp(CT2C3,0);
                            break;
                    case 2: outp(CT2C3,33);         /* 3450 MANUAL LOCK */
                            outp(CT2C3,0);
                            break;
                    case 3: outp(CT2C3,33);         /* 3450 */
                            outp(CT2C3,0);
                            break;
                    case 4: outp(CT2C3,33);         /* 7050 MANUAL LOCK */
                            outp(CT2C3,0);
                            break;
                    case 5: outp(CT2C3,33);         /* 7050 */
                            outp(CT2C3,0);
                            break;
                    case 6: outp(CT2C3,7);          /* 6650 */
                            outp(CT2C3,0);
                            break;
                    case 7: outp(CT2C3,10);         /* 15450 */
                            outp(CT2C3,0);
                            break;
                    case 8: outp(CT2C3,33);         /* 803 */
                            outp(CT2C3,0);
                            break;
                    case 9: outp(CT2C3,33);         /* 806-X3 */
                            outp(CT2C3,0);
                            break;
                    case 10:outp(CT2C3,33);         /* 806-X1 */
                            outp(CT2C3,0);
                            break;
                    case 11:outp(CT2C3,33);         /* 807 */
                            outp(CT2C3,0);
                            break;
                    }
            }
} drv_up()

{
        scr_rowcol(14,0);
        scr_cls();
        scr_rowcol(14,24);
        scr_aputs("WAITING FOR DRIVE TO SPIN UP !!!", NORM|BOLD|BLNK);
        outp(SCLCA,STSP);
        switch (Drv_typ) {
                case 1: sleep(60);              /* 3350 */
                        break;
                case 2: sleep(30);              /* 3450 MANUAL LOCK */
                        break;
                case 3: sleep(30);              /* 3450 */
                        break;
                case 4: sleep(30);              /* 7050 MANUAL LOCK */
                        break;
                case 5: sleep(30);              /* 7050 */
                        break;
                case 6: sleep(45);              /* 6650 */
                        break;
                case 7: sleep(60);              /* 15450 */
                        break;
                case 8: sleep(30);              /* 803 */
                        break;
                case 9: sleep(60);              /* 806-X3 */
                        break;
                case 10:sleep(60);              /* 806-X1 */
                        break;
                case 11:sleep(60);              /* 807 */
                        break;
```

```c
        }
        if((Drv_typ == 1) || (Drv_typ == 6) || (Drv_typ == 7)) {
                if(!(inp(SCSTA) & 0x80)) {
                        sys_abort();
                        disp_logo();
                        scr_rowcol(13,17);
                        scr_aputs(
                            " SYSTEM WAS ABORTED DUE TO DRIVE NOT READY !!! "
                            , NORM|BOLD|BLNK);
                        msg();
                        longjmp(Menu_area,1);
                }
        } else {
                putch(7);
                scr_rowcol(18,20);
                scr_aputs(" STRIKE ANY KEY WHEN DRIVE IS READY !! ", RVSE);
                scrap=getch();
                scr_rowcol(14,0);
                scr_cls();
                if(scrap == 27) {
                        sys_abort();
                        longjmp(Menu_area,1);
                }
        }
} drv_dn()

{
        scr_rowcol(14,0);
        scr_cls();
        scr_rowcol(14,23);
        scr_aputs("WAITING FOR DRIVE TO SPIN DOWN !!!", NORM|BOLD|BLNK);
        outp(SCLCA,SPSP);
        switch (Drv_typ) {
                case 1: sleep(41);                      /* 3350 */
                        break;
                case 2: sleep(20);                      /* 3450 MANUAL LOCK */
                        break;
                case 3: sleep(20);                      /* 3450 */
                        break;
                case 4: sleep(20);                      /* 7050 MANUAL LOCK */
                        break;
                case 5: sleep(20);                      /* 7050 */
                        break;
                case 6: sleep(41);                      /* 6650 */
                        break;
                case 7: sleep(41);                      /* 15450 */
                        break;
                case 8: sleep(20);                      /* 803 */
                        break;
                case 9: sleep(41);                      /* 806-X3 */
                        break;
                case 10:sleep(41);                      /* 806-X1 */
                        break;
                case 11:sleep(41);                      /* 807 */
                        break;
        }
        scr_rowcol(14,0);
        scr_clrl();
} set_idx()

{
        outp(CT1CT,C2MD2);
        switch (Drv_typ) {
                case 1: outp(CT1C3,0x0020);             /* 3350 */
                        outp(CT1C3,0x0076);
                        break;
```

```
            case 2: outp(CT1C3,0x00C0);           /* 3450 MANUAL LOCK */
                    outp(CT1C3,0x004E);
                    break;
            case 3: outp(CT1C3,0x00C0);           /* 3450 */
                    outp(CT1C3,0x004E);
                    break;
            case 4: outp(CT1C3,0x00C0);           /* 7050 MANUAL LOCK */
                    outp(CT1C3,0x004E);
                    break;
            case 5: outp(CT1C3,0x00C0);           /* 7050 */
                    outp(CT1C3,0x004E);
                    break;
            case 6: outp(CT1C3,0x0020);           /* 6650 */
                    outp(CT1C3,0x0076);
                    break;
            case 7: outp(CT1C3,0x0020);           /* 15450 */
                    outp(CT1C3,0x0076);
                    break;
            case 8: outp(CT1C3,0x00C0);           /* 803 */
                    outp(CT1C3,0x004E);
                    break;
            case 9: outp(CT1C3,0x00C0);           /* 806-X3 */
                    outp(CT1C3,0x004E);
                    break;
            case 10:outp(CT1C3,0x00C0);           /* 806-X1 */
                    outp(CT1C3,0x004E);
                    break;
            case 11:outp(CT1C3,0x00C0);           /* 807 */
                    outp(CT1C3,0x004E);
                    break;
        }
} set_idx1()

{
        outp(CT1CT,C2MD2);
        switch (Drv_typ) {
            case 1: outp(CT1C3,0x00F0);           /* 3350 */
                    outp(CT1C3,0x0081);
                    break;
            case 2: outp(CT1C3,0x00A0);           /* 3450 MANUAL LOCK */
                    outp(CT1C3,0x0056);
                    break;
            case 3: outp(CT1C3,0x00A0);           /* 3450 */
                    outp(CT1C3,0x0056);
                    break;
            case 4: outp(CT1C3,0x00A0);           /* 7050 MANUAL LOCK */
                    outp(CT1C3,0x0056);
                    break;
            case 5: outp(CT1C3,0x00A0);           /* 7050 */
                    outp(CT1C3,0x0056);
                    break;
            case 6: outp(CT1C3,0x00F0);           /* 6650 */
                    outp(CT1C3,0x0081);
                    break;
            case 7: outp(CT1C3,0x00F0);           /* 15450 */
                    outp(CT1C3,0x0081);
                    break;
            case 8: outp(CT1C3,0x00A0);           /* 803 */
                    outp(CT1C3,0x0056);
                    break;
            case 9: outp(CT1C3,0x00A0);           /* 806-X3 */
                    outp(CT1C3,0x0056);
                    break;
            case 10:outp(CT1C3,0x00A0);           /* 806-X1 */
                    outp(CT1C3,0x0056);
                    break;
            case 11:outp(CT1C3,0x00A0);           /* 807 */
                    outp(CT1C3,0x0056);
                    break;
        }
}
```

```
scrn1()

{
        int ch;
        disp_logo();
        scr_rowcol(6,15);
    scr_aputs("WELCOME TO THE DATA EXCHANGE UNIVERSAL SERVOWRITER !", NORM);
        scr_rowcol(8,15);
     scr_aputs("COPYRIGHT (C) 1987,1988 BY DATA EXCHANGE CORPORATION.", NORM);
        scr_rowcol(10,28);
        scr_aputs(" THE SUPPORTED DRIVES ARE: ", RVSE);
        scr_rowcol(12,31);
        scr_aputs("1. PRIAM MODEL 6650.", NORM | BOLD);
        scr_rowcol(13,31);
        scr_aputs("2. PRIAM MODEL 803.", NORM | BOLD);
        scr_rowcol(14,31);
        scr_aputs("3. PRIAM MODEL 7050.", NORM | BOLD);
        scr_rowcol(15,31);
        scr_aputs("4. PRIAM MODEL 3450.", NORM | BOLD);
        scr_rowcol(16,31);
        scr_aputs("5. PRIAM MODEL 3350.", NORM | BOLD);
        scr_rowcol(17,31);
        scr_aputs("6. PRIAM MODEL 15450.", NORM | BOLD);
        scr_rowcol(18,31);
        scr_aputs("7. PRIAM MODEL 3450 MANUAL LOCK.", NORM | BOLD);
        scr_rowcol(19,31);
        scr_aputs("8. PRIAM MODEL 7050 MANUAL LOCK.", NORM | BOLD);
        scr_rowcol(20,31);
        scr_aputs("9. PRIAM MODEL 806-X3.", NORM | BOLD);
        scr_rowcol(21,31);
        scr_aputs("A. PRIAM MODEL 806-X1.", NORM | BOLD);
        scr_rowcol(22,31);
        scr_aputs("B. PRIAM MODEL 807.", NORM | BOLD);
        scr_rowcol(24,25);
        scr_aputs("PLEASE SELECT ONE: ", NORM);
        ch=SPACE;
        while (ch < '1' || ch > '9' && ch < 'A' || ch > 'B') {
                scr_rowcol(24,44);
                scr_clrl();
                ch=getch();
                ch=toupper(ch);
                if (ch != CR && ch != BS) {
                        putch(ch);
                        scrap=SPACE;
                        while (scrap != CR && scrap != BS) {
                                scrap=getch();
                        }
                        if (scrap==BS)
                                ch=SPACE;
                }
        }
        switch (ch) {
                case '1':if(Drv_typ != 6)              /* 6650 */
                                Typ_chg = 1;
                        Drv_typ = 6;
                        break;
                case '2':if(Drv_typ != 8)              /* 803 */
                                Typ_chg = 1;
                        Drv_typ = 8;
                        break;
                case '3':if(Drv_typ != 5)              /* 7050 */
                                Typ_chg = 1;
                        Drv_typ = 5;
                        break;
                case '4':if(Drv_typ != 3)              /* 3450 */
                                Typ_chg = 1;
                        Drv_typ = 3;
                        break;
                case '5':if(Drv_typ != 1)              /* 3350 */
                                Typ_chg = 1;
                        Drv_typ = 1;
                        break;
```

```
                case '6':if(Drv_typ != 7)                /* 15450 */
                                Typ_chg = 1;
                        Drv_typ = 7;
                        break;
                case '7':if(Drv_typ != 2)                /* 3450 MANUAL LOCK */
                                Typ_chg = 1;
                        Drv_typ = 2;
                        break;
                case '8':if(Drv_typ != 4)                /* 7050 MANUAL LOCK */
                                Typ_chg = 1;
                        Drv_typ = 4;
                        break;
                case '9':if(Drv_typ != 9)                /* 806-X3 */
                                Typ_chg = 1;
                        Drv_typ = 9;
                        break;
                case 'A':if(Drv_typ != 10)               /* 806-X1 */
                                Typ_chg = 1;
                        Drv_typ = 10;
                        break;
                case 'B':if(Drv_typ != 11)               /* 807 */
                                Typ_chg = 1;
                        Drv_typ = 11;
                        break;
        }
        scr_rowcol(6,0);
        scr_cls();
} scrn2()

{
        unsigned long int tmp,tmp1;

switch (Drv_typ) {
                case 1: tmp = 550003;                    /* 3350 */
                        tmp1 = 550001;
                        break;
                case 2: tmp = 550005;                    /* 3450 MANUAL LOCK */
                        tmp1 = 550004;
                        break;
                case 3: tmp = 550005;                    /* 3450 */
                        tmp1 = 550004;
                        break;
                case 4: tmp = 550005;                    /* 7050 MANUAL LOCK */
                        tmp1 = 550004;
                        break;
                case 5: tmp = 550005;                    /* 7050 */
                        tmp1 = 550004;
                        break;
                case 6: tmp = 550002;                    /* 6650 */
                        tmp1 = 550001;
                        break;
                case 7: tmp = 550002;                    /* 15450 */
                        tmp1 = 550001;
                        break;
                case 8: tmp = 550005;                    /* 803 */
                        tmp1 = 550004;
                        break;
                case 9: tmp = 550005;                    /* 806-13 */
                        tmp1 = 550004;
                        break;
                case 10:tmp = 550005;                    /* 806-11 */
                        tmp1 = 550004;
                        break;
                case 11:tmp = 550005;                    /* 807 */
                        tmp1 = 550004;
                        break;
        }
        disp_logo();
        ident();
```

```
            typ_dis();
            scr_rowcol(9,23);
            printf("Install HEAD Positioner Assy. %lu.", tmp);
            scr_rowcol(11,26);
            printf("Install HDA Mount Assy. %lu.", tmp1);
            scr_rowcol(14,0);
            scr_cls();
            putch(7);
            scr_rowcol(18,20);
            scr_aputs(" STRIKE ANY KEY WHEN READY TO CONTINUE... ", RVSE);
            scrap=getch();
            if(scrap == 27)
                    longjmp(Menu_area, 1);
/*
            tst_hpa();
            tst_hma();
*/
            if(!(Mcbd)) {
                    scr_rowcol(14,21);
                    scr_aputs(" MOTOR CONTROL BOARD DID NOT RESPOND !!! ", RVSE);
                    msg();
                    longjmp(Menu_area,1);
            }
            if(!(Scbd)) {
                    scr_rowcol(14,21);
                    scr_aputs(" SYSTEM CONTROL BOARD DID NOT RESPOND !!! ", RVSE);
                    msg();
                    longjmp(Menu_area,1);
            }
} scrn3()

{
            int ch;
            unsigned int tmp;

switch (Drv_typ) {
                    case 1: tmp = 3350;             /* 3350 */
                            break;
                    case 2: tmp = 3450;             /* 3450 MANUAL LOCK */
                            break;
                    case 3: tmp = 3450;             /* 3450 */
                            break;
                    case 4: tmp = 7050;             /* 7050 MANUAL LOCK */
                            break;
                    case 5: tmp = 7050;             /* 7050 */
                            break;
                    case 6: tmp = 6650;             /* 6650 */
                            break;
                    case 7: tmp = 15450;            /* 15450 */
                            break;
                    case 8: tmp = 803;              /* 803 */
                            break;
                    case 9: tmp = 806;              /* 806-13 */
                            break;
                    case 10:tmp = 806;              /* 806-11 */
                            break;
                    case 11:tmp = 807;              /* 807 */
                            break;
            }
            disp_logo();
            typ_dis();
            scr_rowcol(11,23);
            scr_aputs("Install HDA to be SERVO WRITTEN !!!", NORM | BOLD);
            scr_rowcol(13,32);
            scr_aputs("Enter H for HELP.", RVSE);
            scr_rowcol(18,17);
            scr_aputs(" STRIKE ANY OTHER KEY WHEN READY TO CONTINUE... ", RVSE);
            scrap=getch();
            if(scrap == 27)
                    longjmp(Menu_area, 1);
```

```
disp_logo();
typ_dis();
scr_rowcol(16,19);
scr_aputs("IS THERE NEW MEDIA IN THIS DRIVE ? ",NORM);
ch=SPACE;
while (ch != 'Y' && ch != 'N') {
        scr_rowcol(16,54);
        scr_clrl();
        ch=getch();
        ch=toupper(ch);
        if (ch != CR && ch != BS) {
                putch(ch);
                scrap=SPACE;
                while (scrap != CR && scrap != BS)
                        scrap=getch();
                if (scrap==BS)
                        ch=SPACE;
        }
}
if(ch == 'Y') {
        Old = 0;
} else {
        Old = 1;
}
scr_rowcol(16,0);
scr_clrl();
if((Drv_typ == 1) || (Drv_typ == 6) || (Drv_typ == 7)) {
        scr_rowcol(16,7);
        scr_aputs(
"MAKE SURE THE PHASE LOCK INDUCTOR IS PLUGGED IN FOR THIS DRIVE !!!"
        ,NORM|BOLD|BLNK);
} else {
        scr_rowcol(16,7);
        scr_aputs(
"MAKE SURE THE PHASE LOCK INDUCTOR IS UNPLUGGED FOR THIS DRIVE !!!"
        ,NORM|BOLD|BLNK);
}
msg();
disp_logo();
scr_rowcol(8,21);
scr_aputs("THE DATA EXCHANGE SERVO WRITER IS ABOUT", NORM | BOLD);
scr_rowcol(9,26);
scr_aputs("TO BEGIN WRITING A SERVO ON A", NORM | BOLD);
scr_rowcol(10,32);
printf("PRIAM MODEL %u.", tmp);
scr_rowcol(13,20);
scr_aputs(
"* * *  ALL DRIVE DATA WILL BE LOST  * * *", NORM | BOLD | BLNK);
scr_rowcol(17,23);
scr_aputs("Enter 'C' to Begin Servowriting !!!", RVSE);
scr_rowcol(19,28);
scr_aputs("Enter 'ESC' to ABORT !!!", RVSE);
scr_rowcol(22,25);
puts("PLEASE SELECT ONE: ");
ch=SPACE;
while (ch != 'C' && ch != 27) {
        scr_rowcol(22,44);
        scr_clrl();
        ch=getch();
        ch=toupper(ch);
        if (ch != CR && ch != BS) {
                putch(ch);
                scrap=SPACE;
                while (scrap != CR && scrap != BS) {
                        scrap=getch();
                }
                if (scrap==BS)
                        ch=SPACE;
        }
}
if(ch == 27)
        longjmp(Menu_area, 1);
}
```

SWCOM1.C

```c
/*

COMPANY: *****  DATA EXCHANGE CORPORATION  *****
      FILE: SWCOM1.C
   PURPOSE: COMMON SUBROUTINES FOR THE UNIVERSAL SERVO WRITER PROGRAM.
 REFERENCE: FILE SW.C

COPYRIGHT (C) 1987, 1988 BY DATA EXCHANGE CORPORATION.
             ALL RIGHTS RESERVED.
           PORTIONS OF THIS SOFTWARE COPYRIGHTED BY MICROSOFT INC. 1986

SOFTWARE PROJECT ENGINEER: PAUL ESPINOSA.

*/ define EXTERN   /* */ include "swdefs.h"

main_menu()

{
        int ch;

do {
                setjmp(Menu_area);
                disp_logo();
                scr_rowcol(7,30);
                scr_aputs(" OPERATORS MAIN MENU ", RVSE);
                scr_rowcol(11,28);
                puts("1 - BEGIN SERVO WRITER PROCEDURE.");
                scr_rowcol(13,28);
                puts("2 - DISPLAY TRACK ERROR LISTING.");
                scr_rowcol(15,28);
                puts("3 - MEDIA PLATTER BALANCING MODE.");
                scr_rowcol(17,28);
                puts("4 - ENGINEERING TESTS MENU.");
                scr_rowcol(19,28);
                puts("Q - RETURN TO DOS");
                scr_rowcol(22,30);
                puts("SELECT: ");
                ch=SPACE;
                while (ch < '1' || ch > '4' && ch != 'Q') {
                        scr_rowcol(22,38);
                        scr_clrl();
                        ch=getch();
                        ch=toupper(ch);
                        if (ch != CR && ch != BS) {
                                putch(ch);
                                scrap=SPACE;
                                while (scrap != CR && scrap != BS) {
                                        scrap=getch();
                                }
                                if (scrap==BS)
                                        ch=SPACE;
                        }
                }
                switch (ch) {
                        case '1':sw_op();
                                break;
                        case '2':err_sum();
                                break;
                        case '3':bal_menu();
                                break;
                        case '4':tst_menu();
                                break;
                        case 'Q':break;
```

```
                }
        } while (ch != 'Q');
} sw_op()

{
        scrn1();
        scrn2();
        ld_lca();
/*
        vy_lca();
*/
        stat_chk();
        scrn3();
        scrn4();
        bld_tpt();
        ini_ps();
        ld_hd();
        drv_up();
        if(clk_cl()) {
                if(Old)
                        era_sv();
                wrt_sv();
        }
        drv_dn();
        ul_hd();
        rst_ps();
        scrn5();
} clk_vfy()

{
        unsigned int a,b,j,l,cnt[25];

scr_clr();
        l = 0;
        outp(SCDC2,130);
        for(j = 20; j != 43; ++j) {
                outp(SCDLY,j);
                outp(CT2CT,C1MD1);
                outp(CT2C2,255);
                outp(CT2C2,255);
                outp(CT1C3,255);
                outp(CT1C3,255);
                outp(SCLCA,VCCK);
                sleep_tk(1);
                if (inp(SCLCA) & 0x0060) {
                        outp(SCLCA,NOOP);
                        scr_rowcol(20,23);
                        scr_aputs(" VERIFY CLOCK TIMEOUT ERROR ", RVSE);
                        msg();
                        scr_rowcol(20,0);
                        scr_cls();
                }
                outp(CT2CT,228);
                if((inp(CT2C2) & 64) != 0) {
                        cnt[j-20] = 0;
                } else {
                        a = inp(CT2C2) & 0x00FF;
                        b = inp(CT2C2) & 0x00FF;
                        cnt[j-20] = ((256*(255 - b)) + (255 - a) + 1);
                }
                scr_rowcol(l++,0);
                scr_aputs("DELAY LINE SETTING: ", NORM);
                printf("%u",j);
                scr_aputs("    ", NORM);
                scr_aputs("ERROR COUNT: ", NORM);
                printf("%u",cnt[j-20]);
```

```
                }
                set_idx();
                outp(SCLCA,NOOP);
        } set_vfr()

{
        switch (Drv_typ) {
                case 1: /*   3350    */
                        For_mrg = 31;
                        Aft_mrg = 40;
                        Comp_fact = -.0011;
                        Dac0_val = 58;
                        Dac3_val = 185;
                        break;
                case 2: /*   3450 MANUAL LOCK   */
                        For_mrg = 31;
                        Aft_mrg = 40;
                        Comp_fact = -.004;
                        Dac0_val = 58;
                        Dac3_val = 180;
                        break;
                case 3: /*   3450    */
                        For_mrg = 31;
                        Aft_mrg = 40;
                        Comp_fact = -.004;
                        Dac0_val = 58;
                        Dac3_val = 180;
                        break;
                case 4: /*   7050 MANAUL LOCK   */
                        For_mrg = 31;
                        Aft_mrg = 40;
                        Comp_fact = -.004;
                        Dac0_val = 58;
                        Dac3_val = 180;
                        break;
                case 5: /*   7050    */
                        For_mrg = 31;
                        Aft_mrg = 40;
                        Comp_fact = -.004;
                        Dac0_val = 58;
                        Dac3_val = 180;
                        break;
                case 6: /*   6650    */
                        For_mrg = 31;
                        Aft_mrg = 40;
                        Comp_fact = -.0011;
                        Dac0_val = 63;
                        Dac3_val = 185;
                        break;
                case 7: /*   15450    */
                        For_mrg = 31;
                        Aft_mrg = 40;
                        Comp_fact = -.0011;
                        Dac0_val = 63;
                        Dac3_val = 185;
                        break;
                case 8: /*   803    */
                        For_mrg = 31;
                        Aft_mrg = 40;
                        Comp_fact = -.004;
                        Dac0_val = 63;
                        Dac3_val = 180;
                        break;
                case 9: /*   806-13    */
                        For_mrg = 31;
                        Aft_mrg = 40;
                        Comp_fact = -.004;
                        Dac0_val = 63;
                        Dac3_val = 250;
                        break;
```

```
            case 10:/*   806-11   */
                    For_mrg = 31;
                    Aft_mrg = 40;
                    Comp_fact = -.004;
                    Dac0_val = 63;
                    Dac3_val = 180;
                    break;
            case 11:/*   807    */
                    For_mrg = 31;
                    Aft_mrg = 40;
                    Comp_fact = -.004;
                    Dac0_val = 63;
                    Dac3_val = 250;
                    break;
        }
} tst_menu()

{ int ch;

scrn1();
        do {
                setjmp(Menu_area);
                disp_logo();
                scr_rowcol(6,29);
                scr_aputs(" ENGINEERING TESTS MENU ", RVSE);
                scr_rowcol(8,7);
                puts("0 - SELECT DRIVE TYPE.");
                scr_rowcol(9,7);
                puts("1 - LOAD LCA CONFIG. PROGRAM.");
                scr_rowcol(10,7);
                puts("2 - PERFORM SYSTEM STATUS CHECK.");
                scr_rowcol(11,7);
                puts("3 - FIND HEAD LOAD POSITION.");
                scr_rowcol(12,7);
                puts("4 - LOAD HEADS.");
                scr_rowcol(13,7);
                puts("5 - SPIN DRIVE UP.");
                scr_rowcol(14,7);
                puts("6 - SPIN DRIVE DOWN.");
                scr_rowcol(15,7);
                puts("7 - UNLOAD HEADS.");
                scr_rowcol(16,7);
                puts("8 - RETRACT CARRIAGE POSITION.");
                scr_rowcol(17,7);
                puts("9 - DOUG'S TEST LOOP.");
                scr_rowcol(18,7);
                puts("A - RUN BASIC INTERPRETER.");
                scr_rowcol(19,7);
                puts("B - DOUG'S TOOL.");
                scr_rowcol(20,7);
                puts("C - RANDOM TRACK POSITIONING.");
                scr_rowcol(21,7);
                puts("D - RETURN TO HEAD LOAD POSITION.");
                scr_rowcol(8,41);
                puts("E - RUN CLOSURE SETUP MODULE.");
                scr_rowcol(9,41);
                puts("F - RUN AUTO. CLOCK CLOSING MODULE.");
                scr_rowcol(10,41);
                puts("G - RUN VISUAL CLOCK VERIFY MODULE.");
                scr_rowcol(11,41);
                puts("H - RUN ERASE SERVO SURFACE MODULE.");
                scr_rowcol(12,41);
                puts("I - RUN SERVO TRACK WRITING MODULE.");
                scr_rowcol(13,41);
                puts("J - DISPLAY AND MODIFY VARIABLES.");
                scr_rowcol(14,41);
                puts("K - DC ERASE CLOCK HEAD.");
                scr_rowcol(15,41);
```

```
puts("L - DC ERASE DATA HEAD.");
scr_rowcol(16,41);
puts("M - WRITE INDEX TO SERVO HEAD.");
scr_rowcol(17,41);
puts("N - DISPLAY TRACK ERROR LISTING.");
scr_rowcol(21,41);
puts("Q - RETURN TO MAIN MENU.");
scr_rowcol(23,30);
scr_aputs("SELECT: ",NORM);
ch=SPACE;
while (ch < '0' || ch > '9' && ch < 'A' || ch > 'N'
        && ch != 'Q') {
        scr_rowcol(23,38);
        scr_clrl();
        ch=getch();
        ch=toupper(ch);
        if (ch != CR && ch != BS) {
                putch(ch);
                scrap=SPACE;
                while (scrap != CR && scrap != BS)
                        scrap=getch();
                if (scrap==BS)
                        ch=SPACE;
        }
}
disp_logo();
switch (ch) {
        case '0':scrni();
                bld_tpt();
                break;
        case '1':ld_lca();
                msg();
                break;
        case '2':stat_chk();
                msg();
                break;
        case '3':ini_ps();
                msg();
                break;
        case '4':ld_hd();
                msg();
                break;
        case '5':drv_up();
                msg();
                break;
        case '6':seek_pk();
                drv_dn();
                msg();
                break;
        case '7':ul_hd();
                msg();
                break;
        case '8':rst_ps();
                msg();
                break;
        case '9':tst_fun();
                break;
        case 'A':system("BASIC SETUP");
                break;
        case 'B':tst2();
                break;
        case 'C':tst0();
                break;
        case 'D':seek_pk();
                msg();
                break;
        case 'E':seek_cl();
                cls_init();
                msg();
                break;
        case 'F':if(!(clk_cl()))
                        msg();
                break;
```

```c
                case 'G':clk_vfy();
                        msg();
                        break;
                case 'H':era_sv();
                        msg();
                        break;
                case 'I':wrt_sv();
                        dis_err();
                        msg();
                        break;
                case 'J':mod_var();
                        break;
                case 'K':de_ch();
                        msg();
                        break;
                case 'L':de_dh();
                        msg();
                        break;
                case 'M':wrt_idx();
                        msg();
                        break;
                case 'N':err_sum();
                        break;
                case 'Q':break;
                }
        } while (ch != 'Q');
} bal_menu()

{
        int ch;

disp_logo();
        if(!(Mcbd)) {
                scr_rowcol(14,21);
                scr_aputs(" MOTOR CONTROL BOARD DID NOT RESPOND !!! ", RVSE);
                msg();
                longjmp(Menu_area,1);
        }
        if(!(Scbd)) {
                scr_rowcol(14,21);
                scr_aputs(" SYSTEM CONTROL BOARD DID NOT RESPOND !!! ", RVSE);
                msg();
                longjmp(Menu_area,1);
        }
        rst_mc();
        outp(SCSUP,SPRST);
        rst_sc();
        sleep_tk(1);
        if (!(inp(SCSTA) & 0x04)) {
                scr_rowcol(12,26);
                scr_aputs("SYSTEM POSITIONING FAULT !!!", NORM|BOLD|BLNK);
                scr_rowcol(16,24);
                scr_aputs(" CALL ENGINEERING PERSONNEL !!! ", RVSE);
                msg();
                return;
        }
        outp(SCSUP,SPRST);
        Drv_typ = 7;
        Typ_chg = 1;
        ld_lca();
        outp(SCSUP,SPRND);
        sleep_tk(1);
        outp(SCLCA,NOOP);
        sleep_tk(1);
        do {
                setjmp(Menu_area);
                disp_logo();
                scr_rowcol(7,30);
                scr_aputs(" BALANCING MODE MENU ", RVSE);
                scr_rowcol(11,28);
```

```
                        puts("1 - SPIN DRIVE UP.");
                        scr_rowcol(13,28);
                        puts("2 - SPIN DRIVE DOWN.");
                        scr_rowcol(15,28);
                        puts("Q - RETURN TO MAIN MENU.");
                        scr_rowcol(22,30);
                        puts("SELECT: ");
                        ch=SPACE;
                        while (ch < '1' || ch > '2' && ch != 'Q') {
                                scr_rowcol(22,38);
                                scr_clrl();
                                ch=getch();
                                ch=toupper(ch);
                                if (ch != CR && ch != BS) {
                                        putch(ch);
                                        scrap=SPACE;
                                        while (scrap != CR && scrap != BS) {
                                                scrap=getch();
                                        }
                                        if (scrap==BS)
                                                ch=SPACE;
                                }
                        }
                        scr_rowcol(10,0);
                        scr_cls();
                        switch (ch) {
                                case '1':drv_up();
                                        break;
                                case '2':drv_dn();
                                        break;
                                case 'Q':break;
                        }
                } while (ch != 'Q');
                outp(SCSUP,SPRST);
                rst_mc();
                rst_sc();
} sys_abort()

{
        seek_pk();
        drv_dn();
        ul_hd();
        rst_ps();
        rst_mc();
        rst_sc();
} clk_vfy1()

{
        unsigned int a,b,j,k,l,m,n;

outp(SCDC2,130);
        for(j = 19; j != 26; ++j) {
                outp(SCDLY,j);
                outp(CT2CT,C1MD1);
                outp(CT2C2,255);
                outp(CT2C2,255);
                outp(CT1C3,255);
                outp(CT1C3,255);
                outp(SCLCA,VCCK);
                sleep_tk(1);
                if (inp(SCLCA) & 0x0080) {
                        outp(SCLCA,NOOP);
                        return(0);
                }
                outp(CT2CT,228);
                if((inp(CT2C2) & 64) != 0) {
                        k = 0;
```

```c
                        m = j;
                        break;
                } else {
                        a = inp(CT2C2) & 0x00FF;
                        b = inp(CT2C2) & 0x00FF;
                        k = ((256*(255 - b)) + (255 - a) + 1);
                        m = j;
                }
        }
        for(j = 44; j != 36; --j) {
                outp(SCDLY,j);
                outp(CT2CT,C1MD1);
                outp(CT2C2,255);
                outp(CT2C2,255);
                outp(CT1C3,255);
                outp(CT1C3,255);
                outp(SCLCA,VCCK);
                sleep_tk(1);
                if (inp(SCLCA) & 0x0080) {
                        outp(SCLCA,NOOP);
                        return(0);
                }
                outp(CT2CT,228);
                if((inp(CT2C2) & 64) != 0) {
                        l = 0;
                        m = j;
                        break;
                } else {
                        a = inp(CT2C2) & 0x00FF;
                        b = inp(CT2C2) & 0x00FF;
                        l = ((256*(255 - b)) + (255 - a) + 1);
                        m = j;
                }
        }
        set_idx();
        outp(SCLCA,NOOP);
        if((k != 0) || (l != 0))
                return(0);
        if((Drv_typ == 1) || (Drv_typ == 6) || (Drv_typ == 7)) {
                if((n - m) > 15)
                        return(1);
        } else {
                if((n - m) > 18)
                        return(1);
        }
        return(0);
} tst2()

{
        unsigned long int a;
        unsigned int j;
        int l;

scr_rowcol(7,0);
                scr_cls();
                scr_rowcol(7,34);
                scr_aputs(" DOUG'S TOOL ", RVSE);
                a = 16;
                ident();
                if(Tpt[0][0] == 0x0000FFFF)
                        bld_tpt();
                strcpy(Mc_cmd,"DB0;");
                snd_mc();

outp(CT1CT,C1MD2);
                outp(CT1C2,0);
                outp(CT1C2,3);
                set_idx();
                outp(SCDLY,0);
```

```
            outp(SCDC1,Dac1_val);
            outp(SCDC2,Dac2_val);
            outp(SCDC3,Dac3_val);
            j = 0;
            for(;;) {
                    if(j == 0)
                            j += Curcyl;
                    l = Ofst;
                    scr_rowcol(8,0);
                    scr_cls();
                    typ_dis();
                    scr_rowcol(11,27);
                    scr_aputs(" CYLINDER ", RVSE);
                    scr_rowcol(11,45);
                    scr_aputs(" LOCATION ", RVSE);
                    scr_rowcol(14,29);
                    scr_aputs(" CURRENT TRACK OFFSET ", RVSE);
                    scr_rowcol(12,30);
                    scr_clrl();
                    printf("%u",j);
                    scr_rowcol(12,47);
                    printf("%lu",Tpt[j][0]);
                    scr_rowcol(15,39);
                    scr_clrl();
                    printf("%f",l * .1);
                    scr_rowcol(19,8);
    puts("USE CURSOR KEYS TO MOVE TRACK POSITION, CONTROL W TO WRITE TRACK.");
                    scr_rowcol(20,19);
                    puts("USE ESCAPE KEY TO EXIT TO ENGINEERING MENU.");
                    mc_skabs(Tpt[j][0],FWD);
                    if(Ofst > 0) {
                            mstep(a * l,FWD);
                    } else {
                            mstep((a * l) * -1,REV);
                    }
                    Curcyl = j;
                    Ofst = l;
                    scrap = getch();
                    if(scrap == 0)
                            scrap = getch();
                    if(scrap == 27)
                            break;
                    while((scrap == 75) || (scrap == 77)) {
                            if(scrap == 77) {
                                    mstep(a,FWD);
                                    l += 1;
                            } else {
                                    mstep(a,REV);
                                    l -= 1;
                            }
                            Ofst = l;
                            scr_rowcol(15,39);
                            scr_clrl();
                            printf("%f",l * .1);
                            scrap = getch();
                            if(scrap == 0)
                                    scrap = getch();
                            if(scrap == 27)
                                    return;
                    }
                    if(scrap == 72)
                            if(j < (Cpd-1)+100)
                                    ++j;
                    if(scrap == 80)
                            if(j > 0)
                                    --j;
                    if(scrap == 23)
                            wrt_trk();
            }
    } wrt_idx()
```

```
{
        outp(CT1CT,C1MD2);
        outp(CT1C2,0);
        outp(CT1C2,3);
        set_idx();
        outp(SCDLY,Dly_med);
        outp(SCDC1,Dac1_val);
        outp(SCDC2,Dac2_val);
        outp(SCDC3,Dac3_val);
        de_dh();
        de_dh();
        outp(SCLCA,WIDA);
        sleep_tk(1);
        if (inp(SCLCA) & 0x0080) {
                outp(SCLCA,NOOP);
                scr_rowcol(20,23);
                scr_aputs(" WRITE INDEX (SERVO) TIMEOUT ERROR ",RVSE);
                msg();
                scr_rowcol(20,0);
                scr_cls();
        }
} sleep(delay)

unsigned int delay;

{
        unsigned long int k;
        unsigned long int l;

time(&l);
        k = l;
        l += delay;
        while(k != l)
                time(&k);

} mc_abt()

{
        if(Mcbd) {
                if(Mc_sta = send(Mc_rsp,&Mc_reg,Mc_cmd,MCBSE) > 0) {
                        err_dis();
                        msg();
                        longjmp(Menu_area, 0);
                }
        }
} snd_mc()

{
        if(Mcbd) {
                while(!(inp(MCSTA) & 0x04))
                        scrap = SPACE;
                if(Mc_sta = send(Mc_rsp,&Mc_reg,Mc_cmd,MCBSE) > 0) {
                        err_dis();
                        msg();
                        longjmp(Menu_area, 0);
                }
        }
} tst_sc()

{
        outp(SCSUP,SFRST);
        sleep_tk(1);
```

```
        if((inp(SCSUP) & 0x00F0) == SPRST) {
                outp(SCSUP,SPLTG);
                sleep_tk(1);
                if((inp(SCSUP) & 0x00F0) == SPLTG) {
                        outp(SCSUP,SPRST);
                        rst_sc();
                        Scbd = 1;
                } else {
                        outp(SCSUP,SPRST);
                        Scbd = 0;
                }
        } else {
                Scbd = 0;
        }
} tst_mc()

{
        strcpy(Mc_cmd,";");
        if(Mc_sta = send(Mc_rsp,&Mc_reg,Mc_cmd,MCBSE) > 0) {
                Mcbd = 0;
        } else {
                rst_mc();
                Mcbd = 1;
        }
} err_dis()

{
        if      (Mc_sta == 1)   /* check condition of called function. */
                printf("*** COMMAND NOT RECOGNIZED ***\n");
        else if(Mc_sta == 2)    /* check condition of called function. */
                printf("*** TIMEOUT ON CHARACTER SEND ***\n");
        else if(Mc_sta == 3)
                printf( "*** TIMEOUT ON CHARACTER RECEIVE ***\n" ) ;
        else if(Mc_sta == 4)
                printf( "*** OVERRUN ON RESPONSE STRING ***\n" ) ;
} flg()

{
        scr_rowcol(24,0);
        scr_cls();
        scr_rowcol(24,25);
        scr_aputs(" STRIKE ANY KEY TO CONTINUE... ", RVSE);
        scrap=getch();
        scrap=toupper(scrap);
        scr_rowcol(24,0);
        scr_cls();
} msg()

{
        scr_rowcol(24,0);
        scr_clrl();
        putch(7);
        scr_rowcol(24,25);
        scr_aputs(" STRIKE ANY KEY TO CONTINUE... ", RVSE);
        scrap=getch();
        scrap=toupper(scrap);
        scr_rowcol(24,0);
        scr_cls();
}
```

```c
disp_logo()

{
        int l;

scr_clr();
        scr_rowcol(0,25);
        scr_co(218);
        scr_rowcol(0,26);
        for (l=1; l !=30; ++l)
                scr_co(196);
        scr_rowcol(0,55);
        scr_co(191);
        scr_rowcol(1,25);
        scr_co(179);
        scr_rowcol(1,27);
        scr_aputs(" DATA EXCHANGE CORPORATION ", RVSE);
        scr_rowcol(1,55);
        scr_co(179);
        scr_rowcol(2,25);
        scr_co(192);
        scr_rowcol(2,26);
        for (l=1; l !=30; ++l)
                scr_co(196);
        scr_rowcol(2,55);
        scr_co(217);
        scr_rowcol(4,21);
        scr_aputs(" *** UNIVERSAL SERVO WRITER SYSTEM *** ", RVSE);
} tst0()

{
        unsigned long int a;
        unsigned int j;
        int l;

scr_rowcol(7,0);
                scr_cls();
                scr_rowcol(7,27);
                scr_aputs(" MANUAL TRACK POSITIONING ", RVSE);
                a = 16;
                l = 0;
                j = 0;
                ident();
                typ_dis();
                if(Tpt[0][0] == 0x0000FFFF)
                        bld_tpt();
                scr_rowcol(11,27);
                scr_aputs(" CYLINDER ", RVSE);
                scr_rowcol(11,45);
                scr_aputs(" LOCATION ", RVSE);
                scr_rowcol(14,29);
                scr_aputs(" CURRENT TRACK OFFSET ", RVSE);
                strcpy(Mc_cmd,"DB0;");
                snd_mc();
                scr_rowcol(12,30);
                scr_clrl();
                printf("%u",Curcyl);
                scr_rowcol(12,47);
                printf("%lu",Tpt[Curcyl][0]);
                scr_rowcol(15,39);
                scr_clrl();
                printf("%f",Ofst * .1);

j = 2000;
                while(j < 0 || j > (Cpd-1)+100) {
                        scr_rowcol(20,23);
                        scr_clrl();
                        scr_aputs("ENTER TRACK POSITION: ", NORM);
                        scr_rowcol(20,45);
```

```
                        scanf("%i",&j);
                } scr_rowcol(12,30);
                scr_clrl();
                printf("%u",j);
                scr_rowcol(12,47);
                printf("%lu",Tpt[j][0]);
                scr_rowcol(15,39);
                scr_clrl();
                printf("%f",l * .1);
                mc_skabs(Tpt[j][0],FWD);
                Curcyl = j;
                Ofst = l;
                msg();
                if(scrap == 0)
                        scrap=getch();
                while((scrap == 75) || (scrap == 77)) {
                        if(scrap == 77) {
                                mstep(a,FWD);
                                l += 1;
                        } else {
                                mstep(a,REV);
                                l -= 1;
                        }
                        Ofst = l;
                        scr_rowcol(15,39);
                        scr_clrl();
                        printf("%f",l * .1);
                        flg();
                        if(scrap == 0)
                                scrap=getch();
                }
        }
} wrt_trk()

{
        int ch;

scr_rowcol(8,0);
        scr_cls();
        typ_dis();

scr_rowcol(15,1);
        puts("DAC0 SETTING: ");
        scr_rowcol(15,15);
        printf("%u",Dac0_val);
        scr_rowcol(16,1);
        puts("DAC1 SETTING: ");
        scr_rowcol(16,15);
        printf("%u",Dac1_val);
        scr_rowcol(17,1);
        puts("DAC2 SETTING: ");
        scr_rowcol(17,15);
        printf("%u",Dac2_val);
        scr_rowcol(18,1);
        puts("DAC3 SETTING: ");
        scr_rowcol(18,15);
        printf("%u",Dac3_val);

scr_rowcol(9,28);
        puts("1 - NORMAL DIRECT SERVO TRACK.");
        scr_rowcol(10,28);
        puts("2 - NORMAL STAGGERED SERVO TRACK.");
        scr_rowcol(11,28);
        puts("3 - QUAD DIRECT SERVO TRACK.");
        scr_rowcol(12,28);
        puts("4 - QUAD STAGGERED SERVO TRACK.");
        scr_rowcol(13,28);
        puts("5 - NORMAL DIRECT GB1 SERVO TRACK.");
        scr_rowcol(14,28);
```

```
        puts("6 - NORMAL STAGGERED GB1 SERVO TRACK.");
        scr_rowcol(15,28);
        puts("7 - QUAD DIRECT GB1 SERVO TRACK.");
        scr_rowcol(16,28);
        puts("8 - QUAD STAGGERED GB1 SERVO TRACK.");
        scr_rowcol(17,28);
        puts("9 - NORMAL DIRECT GB2 SERVO TRACK.");
        scr_rowcol(18,28);
        puts("A - NORMAL STAGGERED GB2 SERVO TRACK.");
        scr_rowcol(19,28);
        puts("B - QUAD DIRECT GB2 SERVO TRACK.");
        scr_rowcol(20,28);
        puts("C - QUAD STAGGERED GB2 SERVO TRACK.");
        scr_rowcol(21,28);
        puts("Q - EXIT WITHOUT WRITING.");
        scr_rowcol(23,19);
        scr_aputs("SELECT TRACK TYPE TO WRITE: ",NORM);
        ch=SPACE;
        while (ch < '1' || ch > '9' && ch < 'A' || ch > 'C' && ch != 'Q') {
                scr_rowcol(23,47);
                scr_clrl();
                ch=getch();
                ch=toupper(ch);
                if (ch != CR && ch != ES) {
                        putch(ch);
                        scrap=SPACE;
                        while (scrap != CR && scrap != BS)
                                scrap=getch();
                        if (scrap==BS)
                                ch=SPACE;
                }
        }
        switch (ch) {
                case '1':trk_wrt(WNDR);
                        break;
                case '2':trk_wrt(WNST);
                        break;
                case '3':trk_wrt(WQDR);
                        break;
                case '4':trk_wrt(WQST);
                        break;
                case '5':trk_wrt(WND1);
                        break;
                case '6':trk_wrt(WNS1);
                        break;
                case '7':trk_wrt(WQD1);
                        break;
                case '8':trk_wrt(WQS1);
                        break;
                case '9':trk_wrt(WND2);
                        break;
                case 'A':trk_wrt(WNS2);
                        break;
                case 'B':trk_wrt(WQD2);
                        break;
                case 'C':trk_wrt(WQS2);
                        break;
        }
} trk_wrt(type)

unsigned int type;

{
        de_dh();
        outp(SCLCA,type);
        sleep_tk(1);
        if (inp(SCLCA) & 0x0080) {
                outp(SCLCA,NOOP);
                scr_rowcol(20,24);
                scr_aputs(" SERVO HEAD WRITE TIMEOUT ERROR ",RVSE);
```

```
                msg();
                scr_rowcol(20,0);
                scr_cls();
        }
} ini_ps()

{
        unsigned long int a;
        unsigned int flg;
        unsigned long int k;
        unsigned long int l;
        int y;

scr_rowcol(14,0);
        scr_cls();
        if(!(Mcbd)) {
                scr_rowcol(14,21);
                scr_aputs(" MOTOR CONTROL BOARD DID NOT RESPOND !!! ", RVSE);
                msg();
                longjmp(Menu_area,1);
        }
        if(!(Scbd)) {
                scr_rowcol(14,21);
                scr_aputs(" SYSTEM CONTROL BOARD DID NOT RESPOND !!! ", RVSE);
                msg();
                longjmp(Menu_area,1);
        }
        if(Tpt[0][0] == 0x0000FFFF)
                bld_tpt();
        scr_rowcol(16,23);
        scr_aputs("SEARCHING FOR REFERENCE POSITION !", NORM|BOLD|BLNK);
        Sc_sta = inp(SCSTA);
        if(!(Sc_sta & 0x20)) {
                outp(SCSUP,SPRST);
                sleep_tk(1);
                outp(SCSUP,SPRNE);
                sleep_tk(1);
        }
        Curcyl = 0;
        Ofst = 0;
        rst_mc();
        strcpy(Mc_cmd,"DB0;");
        snd_mc();
        strcpy(Mc_cmd,"DH;");
        snd_mc();
        a = MXSK;
        mstep(a,FWD);
        strcpy(Mc_cmd,"ST;");

time(&l);
        k = l;
        l += 30;
        flg = 1;
        while(k != l) {
                if(inp(SCSTA) & 0x08)
                        flg = 0;
                if(!(flg))
                        break;
                time(&k);
        } if(flg) {
                rst_mc();
                rst_sc();
                outp(SCSUP,SPRST);
                scr_rowcol(14,22);
                scr_aputs("MOTOR CONTROL DID NOT RESPOND !!!", NORM|BOLD|BLNK);
                scr_rowcol(17,20);
                scr_aputs(" CALL ENGINEERING PERSONEL TO REPAIR !!! ", RVSE);
                msg();
```

```
                longjmp(Menu_area,1);
        } mc_abt();
        a = SHSK;
        while (inp(SCSTA) & 0x08) {
                mstep(a,REV);
                while(!(inp(MCSTA) & 0x04))
                        scrap = SPACE;
        }
        a = SIST;
        while (!(inp(SCSTA) & 0x08)) {
                mstep(a,FWD);
                while(!(inp(MCSTA) & 0x04))
                        scrap = SPACE;
        }
        sleep_tk(4);
        a = SHSK;
        mstep(a,FWD);
        while(!(inp(MCSTA) & 0x04))
                scrap = SPACE;
        sleep_tk(4);
        strcpy(Mc_cmd,"DH;");
        snd_mc();

if(Drv_typ == 10) {
                mc_skabs(Tpt[1687][0],REV);
        }
        if((Drv_typ == 9) || (Drv_typ == 11)) {
                mc_skabs(Tpt[1740][0],REV);
        } else {
                mc_skabs(Tpt[1268][0],REV);
        } while(!(inp(MCSTA) & 0x04))
                scrap = SPACE;
        sleep_tk(4);
/*
        strcpy(Mc_cmd,"DH;");
        snd_mc();
        putch(7);
        y = 2000;
        while(y < -200 || y > 181) {
                scr_rowcol(20,23);
                scr_clrl();
                scr_aputs("ENTER TRACK OFFSET: ", NORM);
                scr_rowcol(20,43);
                scanf("%i",&y);
                scr_rowcol(20,0);
                scr_clrl();
        }
        if(y < 0) {
                mc_skabs(Tpt[y*(-1)][0],REV);
        } else {
                mc_skabs(Tpt[y][0],FWD);
        }
        while(!(inp(MCSTA) & 0x04))
                scrap = SPACE;
*/
        strcpy(Mc_cmd,"DH;");
        snd_mc();
        seek_pk();
        scr_rowcol(16,17);
        scr_clrl();
} dis_var()

{
        scr_rowcol(9,24);
        puts("A       B       C");
        scr_rowcol(10,2);
```

```
puts("    WINDOW VALUES:   ");
scr_rowcol(10,22);
printf("%u",Win_val[0]);
scr_rowcol(10,29);
printf("%u",Win_val[1]);
scr_rowcol(10,36);
printf("%u",Win_val[2]);

scr_rowcol(11,7);
puts("LEADING EDGE: ");
scr_rowcol(11,22);
printf("%u",Ldg_edg[0]);
scr_rowcol(11,29);
printf("%u",Ldg_edg[1]);
scr_rowcol(11,36);
printf("%u",Ldg_edg[2]);

scr_rowcol(12,6);
puts("TRAILING EDGE: ");
scr_rowcol(12,22);
printf("%u",Tlg_edg[0]);
scr_rowcol(12,29);
printf("%u",Tlg_edg[1]);
scr_rowcol(12,36);
printf("%u",Tlg_edg[2]);

scr_rowcol(13,13);
puts("CENTER: ");
scr_rowcol(13,22);
printf("%u",Win_ctr[0]);
scr_rowcol(13,29);
printf("%u",Win_ctr[1]);
scr_rowcol(13,36);
printf("%u",Win_ctr[2]);

scr_rowcol(14,14);
puts("WIDTH: ");
scr_rowcol(14,22);
printf("%u",Win_wth[0]);
scr_rowcol(14,29);
printf("%u",Win_wth[1]);
scr_rowcol(14,36);
printf("%u",Win_wth[2]);

scr_rowcol(15,8);
puts("DAC LEADING: ");
scr_rowcol(15,22);
printf("%u",Dac_ldg[0]);
scr_rowcol(15,29);
printf("%u",Dac_ldg[1]);
scr_rowcol(15,36);
printf("%u",Dac_ldg[2]);

scr_rowcol(16,7);
puts("DAC TRAILING: ");
scr_rowcol(16,22);
printf("%u",Dac_tlg[0]);
scr_rowcol(16,29);
printf("%u",Dac_tlg[1]);
scr_rowcol(16,36);
printf("%u",Dac_tlg[2]);

scr_rowcol(17,1);
scr_aputs("D -    'L' POINTER:   ", NORM);
printf("%u",Pntr);

scr_rowcol(18,1);
scr_aputs("E -    DELAY CENTER:   ", NORM);
printf("%u",Dly_med);

scr_rowcol(10,48);
scr_aputs("F -    DAC0 SETTING:   ", NORM);
printf("%u",Dac0_val);
```

```c
    scr_rowcol(11,48);
    scr_aputs("G -    DAC1 SETTING:   ", NORM);
    printf("%u",Dac1_val);

scr_rowcol(12,48);
    scr_aputs("H -    DAC2 SETTING:   ", NORM);
    printf("%u",Dac2_val);

scr_rowcol(13,48);
    scr_aputs("I -    DAC3 SETTING:   ", NORM);
    printf("%u",Dac3_val);

scr_rowcol(14,48);
    scr_aputs("J -  FORWARD MARGIN:   ", NORM);
    printf("%u",For_mrg);

scr_rowcol(15,48);
    scr_aputs("K -    AFTER MARGIN:   ", NORM);
    printf("%u",Aft_mrg);

scr_rowcol(16,48);
    scr_aputs("L -    COMP. FACTOR:   ", NORM);
    printf("%f",Comp_fact);

scr_rowcol(17,48);
    scr_aputs("M -    CLOCK COUNT:    ", NORM);
    printf("%u",Clk_cnt);

scr_rowcol(18,48);
    scr_aputs("N -    ERROR COUNT:    ", NORM);
    printf("%i",Err_cnt);
} mod_var()

{
    int ch;

do {
            disp_logo();
            scr_rowcol(6,29);
            scr_aputs(" GLOBAL VARIABLE ACCESS ", RVSE);
            dis_var();
            scr_rowcol(22,18);
            puts("ENTER LETTER TO CHANGE OR 'Q' TO EXIT !!!");
            ch=SPACE;
            while (ch < 'A' || ch > 'N' && ch != 'Q') {
                    scr_rowcol(23,40);
                    scr_clrl();
                    ch=getch();
                    ch=toupper(ch);
                    if (ch != CR && ch != BS) {
                            putch(ch);
                            scrap=SPACE;
                            while (scrap != CR && scrap != BS) {
                                    scrap=getch();
                            }
                            if (scrap==BS)
                                    ch=SPACE;
                    }
            }
            scr_rowcol(22,0);
            scr_cls();
            switch (ch) {
                    case 'A':Win_val[0] = get_var(Win_val[0]);
                            Ctr_val[0] = Win_val[0] & 0x00FF;
                            Ctr_val[1] = Win_val[0] & 0xFF00;
                            Ctr_val[1] >= 8;
                            break;
                    case 'B':Win_val[1] = get_var(Win_val[1]);
                            Ctr_val[2] = Win_val[0] & 0x00FF;
                            Ctr_val[3] = Win_val[0] & 0xFF00;
```

```c
                                Ctr_val[3] >= 8;
                                break;
                    case 'C':Win_val[2] = get_var(Win_val[2]);
                             Ctr_val[4] = Win_val[0] & 0x00FF;
                             Ctr_val[5] = Win_val[0] & 0xFF00;
                             Ctr_val[5] >= 8;
                             break;
                    case 'D':Fntr = get_var(Fntr);
                             break;
                    case 'E':Dly_med = get_var(Dly_med);
                             break;
                    case 'F':Dac0_val = get_var(Dac0_val);
                             outp(SCDC0,Dac0_val);
                             break;
                    case 'G':Dac1_val = get_var(Dac1_val);
                             outp(SCDC1,Dac1_val);
                             break;
                    case 'H':Dac2_val = get_var(Dac2_val);
                             outp(SCDC2,Dac2_val);
                             break;
                    case 'I':Dac3_val = get_var(Dac3_val);
                             outp(SCDC3,Dac3_val);
                             break;
                    case 'J':For_mrg = get_var(For_mrg);
                             break;
                    case 'K':Aft_mrg = get_var(Aft_mrg);
                             break;
                    case 'L':get_varf();
                             break;
                    case 'M':Clk_cnt = get_var(Clk_cnt);
                             break;
                    case 'N':Err_cnt = get_var(Err_cnt);
                             break;
                    case 'Q':break;
                }
        } while (ch != 'Q');
} get_var(var)

unsigned int var;
{
        scr_rowcol(22,25);
        scr_aputs("CURRENT VALUE: ", NORM | BOLD);
        scr_rowcol(22,40);
        printf("%u",var);
        scr_rowcol(23,23);
        scr_aputs("ENTER NEW VALUE: ", NORM);
        scr_rowcol(23,40);
        scanf("%i",&var);
        return(var);
} get_varf()

{
        scr_rowcol(22,25);
        scr_aputs("CURRENT VALUE: ", NORM | BOLD);
        scr_rowcol(22,40);
        printf("%f",Comp_fact);
        scr_rowcol(23,23);
        scr_aputs("ENTER NEW VALUE: ", NORM);
        scr_rowcol(23,40);
        scanf("%f",&Comp_fact);
} mc_skabs(loc,dir)

unsigned long int loc;
unsigned int dir;
```

```c
{
        char *tmp;
        char tmpbuf[40];

strcpy(Mc_cmd,"PA");
        if(dir != FWD)
                strcat(Mc_cmd,"-");
        tmp = ultoa(loc,tmpbuf,10);
        strcat(Mc_cmd,tmp);
        strcat(Mc_cmd,";");
        snd_mc();
        strcpy(Mc_cmd,"BG;");
        snd_mc();

} rstr()

{
        strcpy(Mc_cmd,"PA0;");
        snd_mc();
        strcpy(Mc_cmd,"BG;");
        snd_mc();
        if(Mcbd) {
                while(!(inp(MCSTA) & 0x04))
                        scrap = SPACE;
        }
        sleep_tk(4);
} rst_mc()

{
        strcpy(Mc_cmd,";");
        snd_mc();
        strcpy(Mc_cmd,"AB;");
        snd_mc();
        strcpy(Mc_cmd,MCRST);
        snd_mc();
        strcpy(Mc_cmd,MCMOF);
        snd_mc();

/*      * * *  VALUES FOR DOUG WIDNEY'S LINEAR AMP   * * *   */ strcpy(Mc_cmd,"GN26;");
        snd_mc();
        strcpy(Mc_cmd,"ZR219;");
        snd_mc();
        strcpy(Mc_cmd,"FL0;");
        snd_mc();

/*      * * *  VALUES FOR GALIL SWITCHING AMP  * * * strcpy(Mc_cmd,"GN10;");
        snd_mc();
        strcpy(Mc_cmd,"ZR232;");
        snd_mc();
        strcpy(Mc_cmd,"FL0;");
        snd_mc();

*/
} tst_hpa()

{
        scr_rowcol(14,0);
        scr_cls();
```

```
        scr_rowcol(16,24);
        scr_aputs("CHECKING HEAD POSITIONER ASSY. !", NORM | BOLD | BLNK);
        sleep(3);
        scr_rowcol(16,24);
        scr_clrl();
} tst_hma()

{
        scr_rowcol(14,0);
        scr_cls();
        scr_rowcol(16,27);
        scr_aputs("CHECKING HDA MOUNT ASSY. !", NORM | BOLD | BLNK);
        sleep(3);
        scr_rowcol(16,24);
        scr_clrl();
} scrn4()

{
        disp_logo();
        ident();
        typ_dis();
        scr_rowcol(7,25);
        scr_aputs(" SERVO WRITING IN PROGRESS !!! ", RVSE);
        scr_rowcol(10,21);
        scr_aputs("* * *  DO NOT TOUCH SERVO WRITER  * * *", NORM|BOLD|BLNK);
} scrn5()

{
        disp_logo();
        ident();
        typ_dis();
        dis_err();
        scr_rowcol(8,25);
        scr_aputs(" THE OPERATION IS COMPLETE !!! ", NORM|BOLD);
        scr_rowcol(20,20);
        scr_aputs("* * *  YOU MAY NOW REMOVE THE HDA  * * *", NORM|BOLD|BLNK);
        msg();
}

SWCOM2.C

/*

COMPANY: *****  DATA EXCHANGE CORPORATION  *****
      FILE: SWCOM2.C
   PURPOSE: COMMON SUBROUTINES FOR THE UNIVERSAL SERVO WRITER PROGRAM.
 REFERENCE: FILE SW.C

COPYRIGHT (C) 1987, 1988 BY DATA EXCHANGE CORPORATION.
             ALL RIGHTS RESERVED.
           PORTIONS OF THIS SOFTWARE COPYRIGHTED BY MICROSOFT INC. 1986

SOFTWARE PROJECT ENGINEER: PAUL ESPINOSA.

*/ define EXTERN  /* */ include "swdefs.h"
```

```c
era_sv()

{
        int j;

scr_rowcol(7,0);
        scr_cls();
        scr_rowcol(7,27);
        scr_aputs(" ERASING SERVO SURFACE !!! ", RVSE);
        ident();
        typ_dis();
        rstr();
        Ofst = 0;
        scr_rowcol(13,27);
        scr_aputs(" CYLINDER ", RVSE);
        scr_rowcol(13,45);
        scr_aputs(" OPERATION ", RVSE);
        set_idx();
        outp(SCDLY,0);
        outp(SCDC1,Dac1_val);
        outp(SCDC2,Dac2_val);
        outp(SCDC3,Dac3_val);
        sleep_tk(1);

for(j = -25; j != 0; ++j) {
                mc_skabs(Tpt[j*(-1)][0],REV);
                scr_rowcol(14,30);
                scr_clrl();
                printf("%i",j);
                scr_rowcol(14,47);
                puts("ERASING");
                while(!(inp(MCSTA) & 0x04))
                        scrap = SPACE;
                de_dh();
                if (kbhit()) {
                        scrap=getch();
                        if(scrap == 27)
                                break;
                }
        }
        for(j = 0; j != Tpd+25; ++j) {
                mc_skabs(Tpt[j][0],FWD);
                scr_rowcol(14,30);
                scr_clrl();
                printf("%i",j);
                Curcyl = j;
                scr_rowcol(14,47);
                puts("ERASING");
                while(!(inp(MCSTA) & 0x04))
                        scrap = SPACE;
                de_dh();
                if (kbhit()) {
                        scrap=getch();
                        if(scrap == 27)
                                break;
                }
        }
        outp(SCLCA,NOOP);
        Curcyl = 0;
        rstr();
        scr_rowcol(13,27);
        scr_cls();
} wrt_sv()

{
        unsigned int j,k;

scr_rowcol(7,0);
        scr_cls();
        scr_rowcol(7,24);
```

```
        scr_aputs(" SERVO WRITING AND VERIFYING !!! ", RVSE);
        ident();
        typ_dis();
        rstr();
        Ofst = 0;
        scrap = SPACE;
        scr_rowcol(13,27);
        scr_aputs(" CYLINDER ", RVSE);
        scr_rowcol(13,45);
        scr_aputs(" OPERATION ", RVSE);
        for (j = 0; j != 1450; ++j)
                for(k = 3; k != 6; ++k)
                        Tpt[j][k] = 0;
        Hrd_err = 0;

outp(CT1CT,C1MD2);
        outp(CT1C2,0xFD);
        outp(CT1C2,0x02);
        set_idx();
        outp(SCDC0,Dac0_val);
        outp(SCDC1,130);
        outp(SCDC2,130);
        outp(SCDC3,Dac3_val);
        sleep_tk(1);

for(j = 0; j != Tpd; ++j) {
                mc_skabs(Tpt[j][0],FWD);
                if (kbhit()) {
                        scrap=getch();
                        if(scrap == 27) {
                                break;
                        }
                }
                outp(SCDLY,0);
                scr_rowcol(14,30);
                scr_clrl();
                printf("%u",j);
                Curcyl = j;
                scr_rowcol(14,47);
                puts("WRITING");
                while(!(inp(MCSTA) & 0x04))
                        scrap = SPACE;
                outp(SCLCA,Tpt[j][i]);
                sleep_tk(1);
                if (inp(SCLCA) & 0x0080) {
                        outp(SCLCA,NOOP);
                        scr_rowcol(20,24);
                        scr_aputs(" SERVO HEAD WRITE TIMEOUT ERROR ",RVSE);
                        msg();
                        scr_rowcol(20,0);
                        scr_cls();
                }
                sv_vfy();
                if (Hrd_err)
                        break;
        }
        outp(SCLCA,NOOP);
        seek_pk();
        Curcyl = 0;
        scr_rowcol(13,27);
        scr_cls();
} sv_vfy()

{
        unsigned int a,b,j,l,x,y,pas;
        unsigned long int k;
        int c,corr;
        float tmp,ftmp,fcon;

scr_rowcol(14,46);
```

```c
puts("VERIFYING");

tmp = Curcyl;
ftmp = tmp * Comp_fact;
c = ftmp;
tmp = c;
if(ftmp < 0) {
        fcon = -.5;
        corr = ((ftmp - tmp) < fcon) ? (tmp - 1) : tmp;
} else {
        fcon = .5;
        corr = ((ftmp - tmp) > fcon) ? (tmp + 1) : tmp;
}
x = For_mrg + corr;
y = Aft_mrg + corr;
outp(CT2CT,C1MD2);
for(j = 0; j != 2; ++j) {
        if(j == 0) {
                outp(SCDLY,x);
        } else {
                outp(SCDLY,y);
        }
        for(pas = 0; pas != 3; ++pas) {
                outp(CT2C2,255);
                outp(CT2C2,255);
                outp(SCLCA,Tpt[Curcyl][2]);
                for(k = 0; k != 200000; ++k) {
                        if (!(inp(SCLCA) & 0x0030))
                                break;
                }
                if (inp(SCLCA) & 0x0080) {
                        outp(SCLCA,NOOP);
                        scr_rowcol(20,23);
                        scr_aputs(
                             " VERIFY DATA TIMEOUT ERROR ", RVSE);
                        msg();
                        scr_rowcol(20,0);
                        scr_cls();
                }
                outp(CT2CT,228);
                if((inp(CT2C2) & 64) != 0) {
                        if(j == 0) {
                                Tpt[Curcyl][3] = 0;
                        } else {
                                Tpt[Curcyl][4] = 0;
                        }
                        Hrd_err = 0;
                        break;
                } else {
                        a = inp(CT2C2) & 0x00FF;
                        b = inp(CT2C2) & 0x00FF;
                        l = ((256*(255 - b)) + (255 - a) + 1);
                        if(j == 0) {
                                Tpt[Curcyl][3] = l;
                        } else {
                                Tpt[Curcyl][4] = l;
                        }
                        if(l < 2) {
                                Hrd_err = 0;
                                break;
                        }
                        Tpt[Curcyl][5] = 1;
                        Hrd_err = 1;
                        if(pas == 0) {
                                if(j == 0) {
                                        Tpt[Curcyl][6] = 1;
                                } else {
                                        Tpt[Curcyl][7] = 1;
                                }
                        }
                }
        }
}
```

```c
         }
         scr_rowcol(18,20);
         scr_clrl();
         scr_aputs("DELAY LINE SETTING: ", NORM);
         printf("%u",x);
         scr_aputs("     ", NORM);
         scr_aputs("ERROR COUNT: ", NORM);
         printf("%lu",Tpt[Curcyl][3]);
         scr_rowcol(19,20);
         scr_clrl();
         scr_aputs("DELAY LINE SETTING: ", NORM);
         printf("%u",y);
         scr_aputs("     ", NORM);
         scr_aputs("ERROR COUNT: ", NORM);
         printf("%lu",Tpt[Curcyl][4]);
         outp(SCLCA,NOOP);
} stat_chk()

{
         if(!(Mcbd)) {
                 scr_rowcol(14,21);
                 scr_aputs(" MOTOR CONTROL BOARD DID NOT RESPOND !!! ", RVSE);
                 msg();
                 longjmp(Menu_area,1);
         }
         if(!(Scbd)) {
                 scr_rowcol(14,21);
                 scr_aputs(" SYSTEM CONTROL BOARD DID NOT RESPOND !!! ", RVSE);
                 msg();
                 longjmp(Menu_area,1);
         }
         outp(SCSUP,SPRST);
         sleep_tk(1);
         outp(SCSUP,SPRND);
         sleep_tk(1);
         outp(SCLCA,NOOP);
         sleep_tk(1);
         if((inp(SCSUP) & 0x00F0) != SPRND) {
                 scr_rowcol(14,30);
                 scr_aputs(" SUPERVISOR FAULT ERROR !!! ", RVSE);
                 outp(SCLCA,NOOP);
                 sleep_tk(1);
                 outp(SCSUP,SPRST);
                 msg();
                 longjmp(Menu_area,1);
         }
         Sc_sta = inp(SCSTA);
         if(Drv_typ == 6) {
                 if(Sc_sta & 0x0030) {
                         outp(SCSUP,SPRST);
                         scr_rowcol(14,26);
                         scr_aputs(" SPINDLE AT SPEED ERROR !!! ", RVSE);
                         outp(SCLCA,NOOP);
                         sleep_tk(1);
                         outp(SCSUP,SPRST);
                         msg();
                         longjmp(Menu_area,1);
                 }
         }
         if(Sc_sta & 0x0020) {
                 scr_rowcol(14,26);
                 scr_aputs(" CLOCK HEAD LOADED ERROR !!! ", RVSE);
                 outp(SCLCA,NOOP);
                 sleep_tk(1);
                 outp(SCSUP,SPRST);
                 msg();
                 longjmp(Menu_area,1);
         }
         if((Sc_sta & 0x0002) && (Sc_sta & 0x0001)) {
```

```
                scr_rowcol(14,22);
                scr_aputs(" INNER AND OUTER STOP TRUE ERROR !!! ", RVSE);
                outp(SCLCA,NOOP);
                sleep_tk(1);
                outp(SCSUP,SPRST);
                msq();
                longjmp(Menu_area,1);
        }
        if(Sc_sta & 0x0008) {
                strcpy(Mc_cmd,"DB0;");
                snd_mc();
                strcpy(Mc_cmd,"DH;");
                snd_mc();
                mstep(80000,REV);
                sleep(3);
                rst_mc();
        }
        if(Sc_sta & 0x0002) {
                strcpy(Mc_cmd,"DB0;");
                snd_mc();
                strcpy(Mc_cmd,"DH;");
                snd_mc();
                mstep(250000,REV);
                sleep(3);
                rst_mc();
        }
        if(Sc_sta & 0x0001) {
                strcpy(Mc_cmd,"DB0;");
                snd_mc();
                strcpy(Mc_cmd,"DH;");
                snd_mc();
                mstep(250000,FWD);
                sleep(3);
                rst_mc();
        }
        outp(SCSUP,SPRST);
} seek_cl()

{
        unsigned int j;

if((Drv_typ == 9) || (Drv_typ == 10) || (Drv_typ == 11)) {
                mc_skabs(Tpt[400][0], FWD);
        } else {
                mc_skabs(Tpt[400][0], REV);
        }
        while(!(inp(MCSTA) & 0x04))
                scrap = SPACE;
        sleep_tk(4);
        outp(SCLCA,STSP);
        sleep_tk(1);
        outp(SCDLY,128);
        sleep_tk(3);
        outp(SCDLY,0);
        sleep_tk(3);
        outp(SCLCA,NOOP);
        sleep_tk(1);
        outp(SCDC1,Dac1_val);
        outp(SCDC2,Dac2_val);
        outp(SCDC3,Dac3_val);
        set_idx1();
        outp(CT2CT,C2MD2);
        outp(CT2C3,Corrector);
        outp(CT2C3,0);
        sleep_tk(1);
        for(j = 395; j != 406; ++j) {
                if((Drv_typ == 9) || (Drv_typ == 10) || (Drv_typ == 11)) {
                        mc_skabs(Tpt[j][0],FWD);
                } else {
                        mc_skabs(Tpt[j][0],REV);
```

```c
            }
            while(!(inp(MCSTA) & 0x04))
                    scrap = SPACE;
            de_dh();
            de_dh();
            de_dh();
    }
    outp(SCLCA,NOOP);
    if((Drv_typ == 9) || (Drv_typ == 10) || (Drv_typ == 11)) {
            mc_skabs(Tpt[400][0], FWD);
    } else {
            mc_skabs(Tpt[400][0], REV);
    }
    while(!(inp(MCSTA) & 0x04))
            scrap = SPACE;
    sleep_tk(4);
} seek_pk()

{
    if((Drv_typ == 9) || (Drv_typ == 10) || (Drv_typ == 11)) {
            mc_skabs(Tpt[100][0], FWD);
    } else {
            mc_skabs(Tpt[200][0], REV);
    }
    while(!(inp(MCSTA) & 0x04))
            scrap = SPACE;
    sleep_tk(4);
} void mstep(steps,dir)

unsigned long int steps;
unsigned int dir;

{
    char *tmp;
    char tmpbuf[40];

strcpy(Mc_cmd,"PR");
    if(dir != FWD)
            strcat(Mc_cmd,"-");
    tmp = ultoa(steps,tmpbuf,10);
    strcat(Mc_cmd,tmp);
    strcat(Mc_cmd,";");
    snd_mc();
    strcpy(Mc_cmd,"BG;");
    snd_mc();
} rst_ps()

{
    if(!(Mcbd)) {
            scr_rowcol(14,21);
            scr_aputs(" MOTOR CONTROL BOARD DID NOT RESPOND !!! ", RVSE);
            msg();
            longjmp(Menu_area,1);
    }
    if(!(Scbd)) {
            scr_rowcol(14,21);
            scr_aputs(" SYSTEM CONTROL BOARD DID NOT RESPOND !!! ", RVSE);
            msg();
            longjmp(Menu_area,1);
    }
    if(Tpt[0][0] == 0x0000FFFF)
            bld_tpt();
    if((inp(SCSUF) & 0x00F0) != SFRNE) {
            outp(SCSUF,SPRST);
```

```
                sleep_tk(1);
                outp(SCSUP,SPRNE);
                sleep_tk(1);
        }
        rst_mc();
        strcpy(Mc_cmd,"DB0:");
        snd_mc();
        strcpy(Mc_cmd,"DH:");
        snd_mc();
        mstep(MXSK,REV);
        strcpy(Mc_cmd,"ST;");
        while (!(inp(SCSTA) & 0x04))
                scrap = SPACE;
        mc_abt();
        rst_mc();
        outp(SCSUP,SPRST);
        sleep_tk(1);
} ld_hd()

{
        outp(SCLCA,LALH);
/*
        while (!(inp(SCSTA) & 0x20))
                scrap = SPACE;

*/
        sleep(5);
} ul_hd()

{
        outp(SCLCA,UALH);
/*
        while (!(inp(SCSTA) & 0x40))
                scrap = SPACE;

*/
        sleep(5);
} de_ch()

{
        outp(SCLCA,NOOP);
/*
        outp(SCDC3,167);
*/
        outp(SCLCA,DECK);
        sleep_tk(1);
        if (inp(SCLCA) & 0x0080) {
                outp(SCLCA,NOOP);
                scr_rowcol(20,24);
                scr_aputs(" CLOCK HEAD ERASE TIMEOUT ERROR ",RVSE);
                msg();
                scr_rowcol(20,0);
                scr_cls();
        }
} de_dh()

{
        outp(SCLCA,NOOP);
/*
        outp(SCDC3,193);
```

```
*/          outp(SCLCA,DEDA);
            sleep_tk(1);
            if (inp(SCLCA) & 0x0080) {
                    outp(SCLCA,NOOP);
                    scr_rowcol(20,24);
                    scr_aputs(" SERVO HEAD ERASE TIMEOUT ERROR ",RVSE);
                    msg();
                    scr_rowcol(20,0);
                    scr_cls();
            }
    } tst_fun()

{
            int ch;

scr_clr();
            if(!(Scbd)) {
                    scr_rowcol(14,21);
                    scr_aputs(" SYSTEM CONTROL BOARD DID NOT RESPOND !!! ", RVSE);
                    msg();
                    longjmp(Menu_area,1);
            }
            putch(7);
            scr_rowcol(16,20);
            puts("DO YOU WANT TO RUN WITH FAULTS ENABLED ? ");
            ch=SPACE;
            while (ch != 'Y' && ch != 'N') {
                    scr_rowcol(16,61);
                    scr_clrl();
                    ch=getch();
                    ch=toupper(ch);
                    if (ch != CR && ch != BS) {
                            putch(ch);
                            scrap=SPACE;
                            while (scrap != CR && scrap != BS) {
                                    scrap=getch();
                            }
                            if (scrap==BS)
                                    ch=SPACE;
                    }
            }
            ld_lca();
            scr_clr();
            outp(SCSUP,SPRST);
            sleep_tk(1);
            if (ch == 'Y') {
                    outp(SCSUP,SPRNE);
            } else {
                    outp(SCSUP,SPRND);
            }
            sleep_tk(1);
            while (!(kbhit())) {
                    ld_hd();
                    if(kbhit())
                            break;
                    ul_hd();
                    if(kbhit())
                            break;
                    ld_hd();
                    if(kbhit())
                            break;
                    drv_up();
                    if(kbhit())
                            break;
                    drv_dn();
                    if(kbhit())
                            break;
                    ul_hd();
```

```
        }
        scrap=getch();
} stf_map(lolmt,uplmt,l1,l2,l3,l4)

unsigned int lolmt,uplmt,l1,l2,l3,l4;

{
        unsigned int j,k;
        unsigned int tmp[4];

tmp[0] = l1;
        tmp[1] = l2;
        tmp[2] = l3;
        tmp[3] = l4;
        k = 0;
        for (j = lolmt; j != uplmt; ++j) {
                Tpt[j][1] = tmp[k];
                ++k;
                if (k == 4)
                        k = 0;
        }
} stf_mapa(lolmt,uplmt,l1,l2,l3,l4)

unsigned int lolmt,uplmt,l1,l2,l3,l4;

{
        unsigned int j,k;
        unsigned int tmp[4];

tmp[0] = l1;
        tmp[1] = l2;
        tmp[2] = l3;
        tmp[3] = l4;
        k = 0;
        for (j = lolmt; j != uplmt; ++j) {
                Tpt[j][2] = tmp[k];
                ++k;
                if (k == 4)
                        k = 0;
        }
} dis_err()

{
        unsigned int j,k,l;

scr_rowcol(13,0);
        scr_cls();
        if(Hrd_err) {
                scr_rowcol(13,23);
                scr_aputs("* * *  HARD ERROR DETECTED  * * *", NORM|BOLD|BLNK);
                scr_rowcol(15,21);
                scr_aputs("THIS DRIVE WAS NOT BE SERVO WRITTEN !!!", NORM|BOLD);
        } else {
                k = 0;
                l = 0;
                for(j = 0; j != Cpd; ++j)
                        if(Tpt[j][3] > 1 || Tpt[j][4] > 1)
                                ++k;
                for(j = 0; j != Cpd; ++j)
                        if(Tpt[j][5] > 0)
                                if(Tpt[j][3] < 2 && Tpt[j][4] < 2)
                                        ++l;
                scr_rowcol(13,27);
                scr_aputs("TOTAL NUMBER OF SOFT ERRORS: ", NORM);
```

```
                printf("%u",l);
                scr_rowcol(15,20);
                scr_aputs("TOTAL NUMBER OF TRACKS WITH ERRORS: ", NORM);
                printf("%u",k);
        }
} scr_logo()

{
        disp_logo();
        scr_rowcol(4,0);
        scr_clrl();
        scr_rowcol(4,30);
        scr_aputs(" TRACK ERROR LISTING ", RVSE);
        scr_rowcol(6,17);
        puts("CYLINDER          FORWARD MARGIN           AFTER MARGIN");

} err_lst()

{
        unsigned int j,k,l,p;

scr_logo();
        k = 0;
        l = 8;
        p = 1;
        for (j = 0; j != Cpd; ++j) {
                if(Tpt[j][5] > 0) {
                        scr_rowcol(l,9);
                        printf("%u",++k);
                        putch(46);
                        scr_rowcol(l,19);
                        printf("%u",j);
                        if(Tpt[j][3] < 2 && Tpt[j][4] < 2) {
                                scr_rowcol(l,40);
                                printf("%lu",Tpt[j][6]);
                                scr_rowcol(l,60);
                                printf("%lu",Tpt[j][7]);
                                scr_rowcol(l,68);
                                puts("*** SOFT ***");
                        } else {
                                scr_rowcol(l,40);
                                printf("%lu",Tpt[j][3]);
                                scr_rowcol(l,60);
                                printf("%lu",Tpt[j][4]);
                        }
                        ++l;
                        if(l == 21) {
                                scr_rowcol(++l,32);
                                puts("***  PAGE");
                                scr_rowcol(l,42);
                                printf("%u",p);
                                puts("   ***");
                                msg();
                                if(scrap == 27)
                                        return;
                                scr_logo();
                                l = 8;
                                ++p;
                        }
                }
        }
        putch(10);
        putch(13);
        putch(10);
        putch(13);
```

```
            puts("                        *** END OF LIST ***");
            msg();
    } err_sum()

{
            err_lst();
            disp_logo();
            dis_err();
            msg();
    }

/*****************************************************************
     Function to send command string to DMC controller board.       
                                                                    
          Base (data) address of particular axis is passed in "Addr". 
          Pointer to command string is passed in "Command".         
          Status register bits are returned in "Status".            
          Pointer to response string is returned in "Response".     
                                                                    
          Function returns:                                         
                  0 if command accepted, and ':' returned as last char. 
                  1 if command accepted, but '?' returned as last char. 
                  2 if timeout occurs on transmitting a command char. 
                  3 if timeout occurs waiting to receive ':' or '?' as 
                     last receive char.                             
    **              4 if char overrun occurs for response string.     */ define     TIMEOUT     8000            /* arbitrary timeout count. */ send( Response, Status, Command, Addr )

char    *Response;              /* pointer to response string. */
    char    *Status;                /* status register copy upon return.*/
    char    *Command;               /* pointer to command string. */
    int     Addr;                   /* axis read/write data byte address. */

{
        int     Time ;              /* timeout counter. */
        int     RxChCount ;         /* receive char count. */

RxChCount = 0 ;             /* init receive char counter. */ while( *Command != '\0' )   /* while not end of command string... */
        {
            Time = TIMEOUT ;        /* init timeout counter. */ while(!(inp(Addr+1) & 0x02) && /*while transmit buffer not ready,and*/
                  (       --Time        ) &&   /*timeout count not zero, and */
                  (   RxChCount < 15    ) )    /*receive char count < 15..*/ if( (inp(Addr+1) & 0x01) == 0 )    /*...if receive char ready.*/
                {
                    *(Response++)=inp(Addr); /* read char into response string.*/
                    RxChCount++ ;            /*   increment receive char count. */
                    Time = TIMEOUT ;         /*   restart timeout counter. */
                } if( !Time )                 /* if timeout on command send, */
            {
                *Response = '\0' ;       /* terminate response string. */
                *Status = inp(Addr+1) & 0x0f ; /* provide copy of status bits.*/
                return( 2 ) ;                  /* return error flag #2. */
            }
            else if( RxChCount == 15 )
            {
                *Response = '\0' ;       /* terminate response string. */
                *Status = inp(Addr+1) & 0x000F; /* provide copy of status bits.*/
                return( 4 ) ;                  /* return error flag #5. */
```

```c
                }
        else
                {
                outp(Addr,*(Command++)); /* else write next byte to DMC board.*/
        /*      putchar(*(Command-1));*/ /* send char to screen for demo purposes.*/
                }
        } do                                          /* do for each received char. */
        {
        Time = TIMEOUT ;                        /* init timeout counter. */ while((inp(Addr+1) & 0x01) && /* while receive char not ready and.*/
                (       --Time       ) )        /* timeout count not zero.*/
                ;                               /* decrement timeout count.*/ if( !Time )                     /* if timeout on character receive.*/
                {
                *Response = '\0' ;              /* terminate response string. */
                *Status = inp(Addr+1) & 0x000F; /* provide copy of status bits. */
                return( 3 ) ;                   /* return error flag #3. */
                }
        else
                {
        *(Response++) = inp(Addr) ;/* else append char into response string.*/
                RxChCount++ ;                   /* increment receive char count. */
                }

} while((*(Response-1) != ':') && /* continue if last char was not ':' and.*/
                ( *(Response-1) != '?') && /* ...last char was not '?' and.*/
                ( RxChCount < 15 ) );   /* ...receive char count < 15.*/

*Response = '\0' ;                  /* terminate response string. */
    *Status   = inp(Addr+1) & 0x000F ;  /* provide copy of status bits. */ if( *(Response-1) == ':' )          /* if ':' received for last char.*/
        return( 0 ) ;                           /* return 'OK' flag (#0).*/
    else if( *(Response-1) == '?' ) /* else if '?' received for last char.*/
        return( 1 ) ;                           /* return '?' flag (#1). */
    else
        return( 4 ) ;           /* else return receive overrun flag (#4).*/
}

PCIO.ASM

;
;
;       COMPANY: *****  DATA EXCHANGE CORPORATION  *****
;          FILE: PCIO.ASM
;       PURPOSE: 'C' LANGUAGE CUSTOM SCREEN CONTROL FUNCTION LIBRARY.
;     REFERENCE: DATA EXCHANGE CORPORATION SOFTWARE ENGINEERING SPECIFICATION.
;
;       COPYRIGHT (C) 1987, 1988 BY DATA EXCHANGE CORPORATION.
;          ALL RIGHTS RESERVED.
;       PORTIONS OF THIS SOFTWARE COPYRIGHTED BY MICROSOFT INC. 1986
;
;       SOFTWARE PROJECT ENGINEER: PAUL ESPINOSA.
;
;
        TITLE   DRIVESET.ASM
        PAGE    57,132
;
;
;       PCIO.ASM   --   Screen and keyboard interface routines for the PC.
;
;
_DATA   SEGMENT WORD PUBLIC 'DATA'
        ASSUME DS:_DATA
;
```

;       In this implementation, all special and function keys are translated
;       to the following values.
;
;/* control key translations */
up_char         equ     30
down_char       equ     31
left_char       equ     29
right_char      equ     28
bol_char        equ     200
eol_char        equ     201
pageup_char     equ     202
pagedown_char   equ     203
bof_char        equ     204
eof_char        equ     205
Ins_char        equ     206
Del_char        equ     207
NextWord_char   equ     208
PrevWord_char   equ     209
;
M1              equ     210
M2              equ     211
M3              equ     212
M4              equ     213
M5              equ     214
M6              equ     215
M7              equ     216
M8              equ     217
M9              equ     218
M10             equ     219
;
;       the table that is used to make the translation
;
convert         db      72, up_char
                db      80, down_char
                db      75, left_char
                db      77, right_char
                db      71, bol_char
                db      79, eol_char
                db      73, pageup_char
                db      81, pagedown_char
                db      77H, bof_char
                db      75H, eof_char
                db      82, Ins_char
                db      83, Del_char
                db      115, PrevWord_char
                db      116, NextWord_char
                db      59, M1
                db      60, M2
                db      61, M3
                db      62, M4
                db      63, M5
                db      64, M6
                db      65, M7
                db      66, M8
                db      67, M9
                db      68, M10
                db      0, 255          ; illegal character
;
;       equates for bios interface.
;
;       the interrupt and codes for the screen interface interrupt.
;
video           equ     10h             ;interrupt for dealing with screen
;
mode            equ     0               ;code for setting new screen mode
curtype         equ     1               ;code for setting new cursor type
setcur          equ     2               ;code for addressing cursor
readcur         equ     3               ;code for reading cursor location
readlp          equ     4               ;code for reading light pen position
setpage         equ     5               ;code to select active page
scrollup        equ     6               ;code to scroll screen up
scrolldn        equ     7               ;code to scroll screen down

```
readch          equ     8               ;code to read a character from screen
writeach        equ     9               ;code to write char and attributes
writech         equ     10              ;code to write character only
setpal          equ     11              ;code to set new setpal or border
wdot            equ     12              ;code to write a dot
rdot            equ     13              ;code to read a dot
wtty            equ     14              ;code to write as if teletype
state           equ     15              ;code to find current screen status
;
;
;       the interrupt and codes for the keyboard interface.
;
keyboard        equ     16h             ;interrupt 16 to deal with keyboard
;
cicode          equ     0               ;code for reading a character
cstscode        equ     1               ;code for keyboard status
;
;
;
;       caution: must change column number if 40 column mode
;
crt_cols        equ     80
;
;       variables available to a C88 program
;
        public  scr_cols_, scr_rows_, scr_scrollup_, scr_scrolldown_
        public  scr_mode_, scr_page_, scr_attr_, scr_window_top_
;
scr_cols_       dw      crt_cols        ;current number of columns
;
;       note- make 25 for ms-dos and 24 for cp/m as cp/m steals the bottom
;       line.
scr_rows_       dw      25              ;current number of rows
scr_mode_       db      0               ;current screen mode
scr_page_       db      0               ;current page
scr_attr_       db      7               ;current attributes for screen
                                        ;7 is white letters on black
scr_window_top_ db      2               ;first line to scroll
;
;       variables needed by SEE. Not used here.
;
scr_scrollup_   db      0               ;zero if scrollup leaves top line alone
scr_scrolldown_ db      0               ;zero if scroll down supported
;
_DATA   ENDS
;
;
_TEXT   SEGMENT BYTE PUBLIC 'CODE'
        ASSUME CS:_TEXT
;
;       _SCR_SETUP      scr_setup must be called before any use of any
;                       other routine unless the starting mode is 80X25
;                       character mode (3,4 or 7). Must be called for monocrome
;                       (mode 7) for scr_curson to set a proper cursor.
;
;                       Usage:  scr_setup();
;
                public  _scr_setup
_scr_setup      PROC    NEAR
                push    bp
                mov     ah,state        ;get current state
                int     video
                mov     scr_mode_,al    ;current mode
                mov     cl,ah           ;make cols a word
                mov     ch,0
                mov     scr_cols_,cx    ;40 or 80 columns
                mov     scr_page_,bh
                mov     scr_attr_,7     ;set to white chars on black
                cmp     al,4            ;see if a character mode
                jc      got_attr
```

```
                cmp     al,7                    ;7 is for graphics mode
                jz      got_attr
                mov     scr_attr_,0             ;attribute is zero in graphics
got_attr:       mov     ah,0                    ;return int containing mode
                pop     bp
                ret
_scr_setup      ENDP
;
;
;       _SCR_TERM               do any required termination.
;
;                               Usage:  scr_term();
;
        public  _scr_term
_scr_term       PROC    NEAR
        ret
_scr_term       ENDP
;
;
;       _SCR_SETMODE            set a new screen mode
;
;                               Usage:  scr_setmode(new mode);
;
                public  _scr_setmode
_scr_setmode    PROC    NEAR
                push    bp
                mov     bp,sp
                mov     al,[bp+4]       ; new mode value
                mov     ah,mode
                int     video           ; set new mode
                call    _scr_setup      ;remember new values
                pop     bp
                ret
_scr_setmode    ENDP
;
;
;       _SCR_ROWCOL             sets cursor at any location.
;
;                               Usage:  scr_rowcol(new row, new column);
;
                public  _scr_rowcol
_scr_rowcol     PROC    NEAR            ; move cursor to x,y
                push    bp              ; save from bios
                mov     bp,sp
                mov     dx,[bp+6]       ; column
                mov     ax,[bp+4]       ; row
                mov     dh,al
                mov     bh,scr_page_    ; force page zero
                mov     ah,setcur       ; set cursor location
                int     video           ; call bios
                pop     bp
                ret
_scr_rowcol     ENDP
;
;
;       _SCR_CLR                clear entire screen
;
;                               Usage:  scr_clr();
;
                public  _scr_clr
_scr_clr        PROC    NEAR            ; clear screen
;
;
                push    bp                      ;save from video call
                mov     al,0                    ;ask for a clear window
                xor     cx,cx                   ;start at 0,0
                mov     dh,byte ptr scr_rows_   ;last line
                dec     dh
                mov     dl,byte ptr scr_cols_   ;clear entire width
                dec     dl                      ;last column is width-1
                mov     bh,scr_attr_            ;attributes for new blanks
                mov     ah,scrollup             ;ask for a scrollup to clear
                int     video                   ;do the clear
```

```
                    pop     bp
                    ret
_scr_clr            ENDP
;
;
;
;       _SCR_CLRL               clear rest of line.
;
;                               Usage:          scr_clrl();
;
                    public  _scr_clrl
_scr_clrl           PROC    NEAR            ; clear rest of line
                    push    bp
                    mov     bh,scr_page_
                    mov     ah,readcur      ;see where we are
                    int     video
                    mov     cl,byte ptr scr_cols_   ;calc how many chars left in line
                    sub     cl,dl           ;number left
                    mov     ch,0            ;number of blanks needed
                    mov     al,' '          ;write blanks
                    mov     bl,scr_attr_    ;normal attributes
                    mov     bh,scr_page_    ;page number
                    mov     ah,writeach     ;write the blanks
                    int     video
                    pop     bp
                    ret
_scr_clrl           ENDP
;
;
;
;       _SCR_CLS                clear rest of screen.
;
;                               Usage:  scr_cls();
;
                    public  _scr_cls
_scr_cls            PROC    NEAR                    ; clear rest of screen
                    push    bp
                    call    _scr_clrl       ;clear rest of line
                    mov     ah,readcur      ;see where we are
                    mov     bh,scr_page_
                    int     video
                    mov     al,0            ;ask for a clear window
                    mov     ch,dh           ;current row
                    inc     ch              ;+1
                    cmp     ch,byte ptr scr_rows_  ;see if in last line
                    jz      cleared         ;all done
                    mov     cl,0            ;first column
                    mov     dh,byte ptr scr_rows_  ;24 is the last line
                    dec     dh
                    mov     dl,byte ptr scr_cols_   ;clear entire width
                    dec     dl              ;last column is width-1
                    mov     bh,scr_attr_    ;attributes for new blanks
                    mov     ah,scrollup     ;ask for a scrollup to clear
                    int     video           ;do the clear
cleared:            pop     bp
;
                    ret
_scr_cls            ENDP
;
;
;       _SCR_SCUP               scroll text up leaving top lines alone.
;
;                               Usage:  scr_scup();
;
                    public  _scr_scup
_scr_scup           PROC    NEAR    ; scroll last line, screen from line
                                    ; scr_windor_top to end
                    mov     ax,scr_cols_    ;need last column of screen
                    dec     ax
                    push    ax
                    mov     ax,scr_rows_    ;scroll through last line
                    dec     ax
                    push    ax
                    xor     ax,ax           ;from column 0
```

```
                        push    ax
                        mov     al,scr_window_top_ ;leave top line alone
                        push    ax
                        mov     al,1
                        push    ax              ;scroll by 1
                        call    _scr_scrup      ;do the scroll
                        add     sp,10           ;clear arge
                        ret
_scr_scup               ENDP
;
;       _SCR_SCRUP              Scroll the screen up. The window is scrolled
;                               up nline lines. A zero nline will clear the
;                               window. Top left of the screen in 0,0.
;
;                       Usage: scr_scrup(nline,fromrow,fromcol,torow,tocol);
;
                        public  _scr_scrup
_scr_scrup              PROC    NEAR
                        push    bp
                        mov     bp,sp
                        mov     al,[bp+4]       ;number of lines
                        mov     ch,[bp+6]       ;starting row
                        mov     cl,[bp+8]       ;starting column
                        mov     dh,[bp+10]      ;ending row
                        mov     dl,[bp+12]      ;ending column
                        mov     bh,scr_attr_    ;current attribute
                        mov     ah,scrollup
                        int     video           ;do the scroll
                        pop     bp
                        ret
_scr_scrup              ENDP
;
;
;       _SCR_SCDN               scroll all but the top lines down one.
;
;                       Usage:  scr_scdn();
;
                        public  _scr_scdn
_scr_scdn               PROC    NEAR
                        mov     ax,scr_cols_    ;need last column of screen
                        dec     ax
                        push    ax
                        mov     ax,scr_rows_    ;scroll through last line
                        dec     ax
                        push    ax
                        xor     ax,ax           ;from column 0
                        push    ax
                        mov     al,scr_window_top_ ;leave top lines alone
                        push    ax
                        mov     al,1
                        push    ax              ;scroll by 1
                        call    _scr_scrdn      ;do the scroll
                        add     sp,10           ;clear arge
                        ret
_scr_scdn               ENDP
;
;       _SCR_SCRDN              scroll the screen down. the window is scrolled
;                               down nline lines. A zero nline will clear the
;                               window. Top left of the screen in 0,0.
;
;                       Usage: scr_scrdn(nline,fromrow,fromcol,torow,tocol);
;
                        public  _scr_scrdn
_scr_scrdn              PROC    NEAR
                        push    bp
                        mov     bp,sp
                        mov     al,[bp+4]       ;number of lines
                        mov     ch,[bp+6]       ;starting row
                        mov     cl,[bp+8]       ;starting column
                        mov     dh,[bp+10]      ;ending row
                        mov     dl,[bp+12]      ;ending column
                        mov     bh,scr_attr_    ;current attribute
                        mov     ah,scrolldn
```

```
                    int     video               ;do the scroll
                    pop     bp
                    ret
_scr_scrdn          ENDP
;
;
;       _SCR_CO                     write a character to the screen. this
;                                   routine increments the cursor position
;                                   after writing. normal C89 puts and printf
;                                   statements can also be used to write to the
;                                   screen.
;
;                                   Usage:  scr_co_(character);
;
                    public  _scr_co
_scr_co             PROC    NEAR                ; standard console output
                    push    bp
                    mov     bp,sp
                    mov     al,[bp+4]           ;character to write
                    mov     bh,scr_page_
                    mov     ah,wtty             ;use tty write routine
                    int     video
                    pop     bp
                    ret
_scr_co             ENDP
;
;
;       _SCR_CI                     keyboard input. function and soft keys are
;                                   translated, see equates for values.
;
;                                   Usage:  character = scr_ci();
;
                    public  _scr_ci
_scr_ci             PROC    NEAR    ;return the next character
                                    ; translate if necessary
                    push    bp
                    mov     ah,cicode           ;ask for a keyboard character
                    int     keyboard
                    cmp     al,0
                    jne     not_special
                    mov     bx, offset convert      ; convert special key
ci_loop:
                    cmp     byte ptr [bx],0
                    jz      got_it
                    cmp     ah, byte[bx]
                    je      got_it
                    add     bx,2
                    jmp     ci_loop
got_it:             inc     bx
                    mov     al,[bx]
                    mov     ah,0
                    pop     bp
                    ret
not_special:        mov     ah,0
                    pop     bp
                    ret
_scr_ci             ENDP
;
;       _SCR_CSTS                   return character if any available. otherwise
;                                   return zero.
;
;                                   Usage:  character = scr_csts():
;
                    public  _scr_csts
_scr_csts           PROC    NEAR    ;return coded character if any available
                    push    bp
                    mov     ah,cstscode
                    int     keyboard
                    mov     ax,0
                    jz      csts_over
                    call    _scr_ci             ;get the coded character
```

```
csts_over:      pop     bp
                ret
_scr_csts       ENDP
;
;       _SCR_SINP -             screen input (read character from the screen).
;
;                       Usage:  character = scr_sinp();
;
                public  _scr_sinp
_scr_sinp       PROC    NEAR
                push    bp              ;save the registers
                mov     bh,scr_page_
                mov     ah,readch       ;code to read a character
                int     video           ;al is letter, ah=attributes
                or      al,al           ;zero returned instead of blank in
                                        ;graphics mode
                jnz     ret_ch
                mov     al,' '
ret_ch:         mov     ah,0            ;kill the attributes
                pop     bp
                ret
_scr_sinp       ENDP
;
;
;
;       _SCR_CURSOFF            turn cursor off.
;
;                       Usage:  scr_cursoff();
;
                public  _scr_cursoff
_scr_cursoff    PROC    NEAR
                push    bp              ;save registers
                cmp     scr_mode_,4     ;see if graphics
                jc      text_coff
                cmp     scr_mode_,7
                jnz     no_cur
text_coff:
                mov     cx,0f00h        ;should turn cursor off
new_cur:        mov     ah,curtype      ;set a new cursor type
                int     video
no_cur:         pop     bp
                ret
_scr_cursoff    ENDP
;
;
;
;       _SCR_CURSON             turn cursor back on.
;
;                       Usage:  scr_curson();
;
                public  _scr_curson
_scr_curson     PROC    NEAR
                push    bp
                mov     cx,0c0dh        ;assume monocrome
                cmp     scr_mode_,7     ;true is mono
                jz      new_cur         ;set it
                mov     cx,0607h        ;assume color card in text mode
                cmp     scr_mode_,4     ;color text is 0 to 3
                jc      new_cur
                pop     bp              ;do nothing if in graphics mode
                ret
_scr_curson     ENDP
;
;
;
;       _SCR_MARK  --   mark the current character on the screen.
;                       Used to delimit block areas in SEE. Just write
;                       an X or something if reverse video is not available.
;                       Usage:  scr_mark(current character);
;
                public  _scr_mark
_scr_mark       PROC    NEAR                    ; mark the passed char,
                                                ; cursor does not advance
;
```

```
                    push    bp
                    mov     al,219              ;just write a block character
                    mov     bl,scr_attr_        ;normal attributes
                    mov     cx,1                ; one character
                    mov     bh,scr_page_        ;page number
                    mov     ah,writeach         ;write char and attr
                    int     video               ;write character and attributes
                    pop     bp
                    ret
_scr_mark           ENDP
;
;
;       _SCR_APUTS              write a string and attributes to the screen.
;                               the cursor is moved normally
;
;                               Usage:  scr_aputs("Print This",attribute);
;                               attribute is BRGBIRGB
;                                            : : : :
;                                            : : : color for letter. 7 is white
;                                            : : intensity for letter
;                                            : color for background. 0 is black
;                                            blinking
;
                    public  _scr_aputs
_scr_aputs          PROC    NEAR
                    push    bp
                    mov     bp,sp
                    push    ds
                    push    si
                    mov     ah,readcur          ;see where we are
                    int     video               ;dx is cursor location, bh is page
                    mov     si,[bp+4]           ;string pointer (offset)
                    mov     cx,1                ;number of characters to write
                    mov     ax,[bp+6]           ;string pointer (segment)
                    mov     ds,ax               ;set data segment
                    mov     bl,[bp+8]           ;attribute
naputs:             cld
                    lodsb                       ;next character to write
                    or      al,al               ;zero at end
                    jz      eaputs
                    cmp     al,10               ;look for LF
                    jnz     normal_ap
ap_scroll:          mov     bp,sp               ;reset pointer to next char
                    mov     [bp+4],si
                    mov     al,13               ;use tty output to scroll screen
                    mov     ah,wtty
                    int     video               ;write cr,lf
                    mov     ah,wtty
                    mov     al,10
                    int     video
                    pop     bp
                    jmp     _scr_aputs          ;start over
normal_ap:
                    mov     bh,scr_page_        ;page number
                    mov     ah,writeach         ;write char and attr
                    int     video               ;write character and attributes
                    inc     dl                  ;next column
                    cmp     dl,crt_cols         ;see if wrapping around
                    jc      set_loc
                    mov     dl,0                ;at start of column
                    inc     dh                  ;at next row
                    cmp     dh,byte ptr scr_rows_ ;see if need a scroll
                    jc      set_loc
                    jmp     ap_scroll           ;do a scroll up
set_loc:            mov     ah,setcur           ;move the cursor
                    int     video
                    jmp     naputs
eaputs:             pop     si
                    pop     ds
                    pop     bp
                    ret
_scr_aputs          ENDP
```

```
;
;       _SLEEP_TK        SLEEP FOR TWO TIMER TICKS TIMES THE PASSED VALUE.
;
;                        Usage:  sleep_tk(value);
;
                public  _sleep_tk
_sleep_tk       PROC    NEAR
                push    bp
                mov     bp,sp
                mov     al,[bp+4]       ; passed value
                mov     ah,0
                mov     bl,2
                mul     bl
                push    ax
                mov     ah,0
                int     1AH
                pop     ax
                add     dx,ax
                mov     bx,dx
wstlp:          mov     ah,0
                int     1AH
                cmp     dx,bx
                jne     wstlp
                pop     bp
                ret
_sleep_tk       ENDP
;
;
;
;
_TEXT   ENDS
;
;
;
        END
;
;
;
```

Appendix B

```
TITLE   PROJECT HECTOR ADDRESS DECODER
PATTERN U35X1.PDS
REVISION        X1
AUTHOR  DOUG WIDNEY
COMPANY DATA EXCHANGE CORPORATION
DATE

CHIP    U35     PAL12L10

/BRD /BWT BA1 BA0 A2 A3 A10 A11 AEN NOR1 NOR2 GND
BRST /BUFEN /CTC1 /CTC2 /LCARD /LCAWT /SBRD /DLWT /DACWT /SUPWT /SUPRD VCC

STRING  BASE    ' /AEN * /BRST * A10 * A11 * NOR1 * NOR2 '

EQUATIONS

SUPWT   = BASE * /BA0 * /BA1 * /A2 * /A3 * BWT
SUPRD   = BASE * /BA0 * /BA1 * /A2 * /A3 * BRD
LCAWT   = BASE *  BA0 * /BA1 * /A2 * /A3 * BWT
LCARD   = BASE *  BA0 * /BA1 * /A2 * /A3 * BRD
DLWT    = BASE * /BA0 *  BA1 * /A2 * /A3 * BWT
SBRD    = BASE * /BA0 *  BA1 * /A2 * /A3 * BRD
DACWT   = BASE *  A2 * /A3 * BWT
CTC1    = BASE * /A2 *  A3
CTC2    = BASE *  A2 *  A3
BUFEN   = BASE
```

20RS4
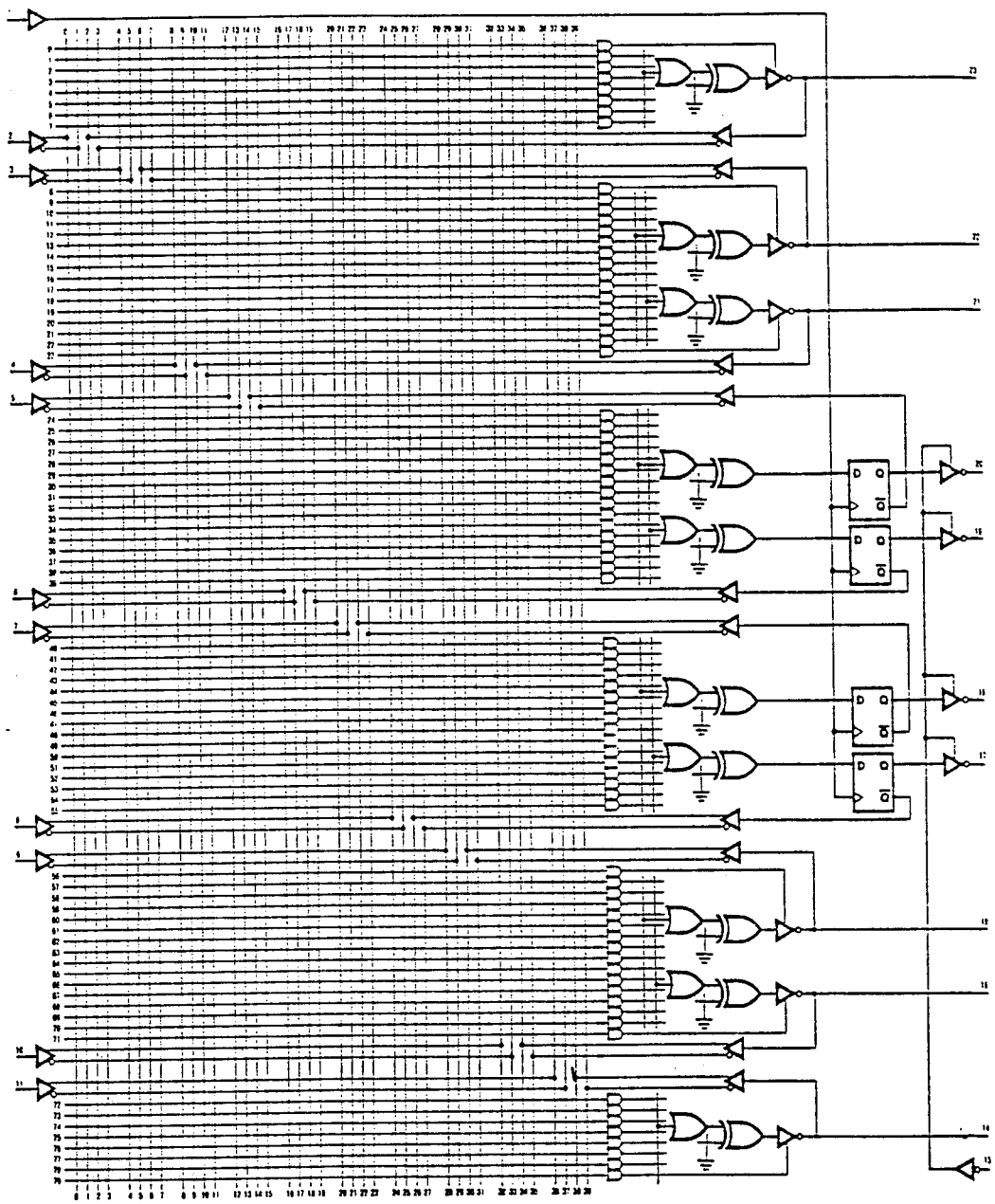

SYSTEM SUPERVISOR PAL THEORY OF OPERATION

THE SYSTEM SUPERVISOR PAL IS A STATE MACHINE WHICH ASSISTS IN
LOADING AND READING BACK THE LCA PROGRAM, AND ALSO MONITORS CERTAIN
OTHER STATUS INFORMATION ABOUT THE SERVOWRITER SYSTEM.

THE 20RS4 CHIP CONTAINS FOUR REGISTER BITS, EACH WITH A
COMBINATIONAL INPUT FUNCTION AND AN OUTPUT PIN, SIX COMBINATIONAL
OUTPUT FUNCTIONS, AND TEN PINS WHICH MAY BE USED AS INPUTS TO ANY OF
THE COMBINATIONAL FUNCTIONS.

THE REGISTER BITS FORM A FOUR BIT STATE MACHINE. THE STATE
MACHINE MAY BE STARTED IN ANY STATE BY THE MICROPROCESSOR BY WRITING
TO FOUR INPUT PINS WHICH ARE CONFIGURED AS DIRECT LOAD INPUTS. THE
REGISTER BITS MAY ALSO BE READ BY THE PROCESSOR AT ANY TIME.

THE STATE DESCRIPTIONS ARE AS FOLLOWS:

| STATE | NAME | CODE | DESCRIPTION | NEXT STATE | PREV. |
|---|---|---|---|---|---|
| S0 | RESET | FFH | INITIAL STATE | USER WRITE | N/C |
| S1 | LTRIG | 0H | INITIATES LOAD | S2 (AUTOMATIC) | N/C |
| S2 | LOAD | 1H | ENABLES LCA LOAD | S3 (AFTER LOAD DONE) | S? |
| S3 | WAIT | 3H | LOAD IS DONE | USER WRITE | S2 |
| S4 | RTRIG | 4H | INITIATES READBACK | S5 | N/C |
| S5 | READ | 5H | READBACK | USER WRITE | S4 |
| S6 | RUNE | 6H | RUN, SFAULT ENABLE | USER WRITE OR FAULT | S6 0.S? |
| S7 | RUND | 7H | RUN, STFAULT DISBLE | USER WRITE OR FAULT | S6 0.S3 |
| S8 | PPF | 8H | PRESENT POWER FLT | S9 | ANY |
| S9 | LPF | 9H | LATCHED POWER FLT | S9 | S8 |
| S10 | STATF | 11H | STATUS FAULT | S10 OR USER WRITE | S4 |

REGISTER OUTPUT PINS:   /DB40-/DB70

COMBINATIONAL OUTPUT PIN DESCRIPTIONS:

LCARST:   TO RESET PIN ON LCA
CCLK:     CLOCK USED TO AID LCA READBACK
DB30:     LCA READBACK DATA TO PROCESSOR
24VEN:    ENABLES POWER SUPPLY RELAYS IN CHASSIS
MORTRG:   TO LCA--INITIATES READBACK MODE
DNEPRG:   BIDIRECTIONAL. TO LCA--INITIATES PROGRAMMING. FROM
    LCA--SIGNALS END OF PROGRAMMING

INPUT PIN DESCRIPTIONS:

CK:          SYSTEM CLOCK TO FLIP FLOPS
STATFLT:     STATUS FAULT SIGNAL FROM SERVO LOGIC WITHIN LCA
MIRDTA:      READBACK DATA FROM LCA
PWROK:       POWER GOOD SIGNAL FROM POWER MONITOR CIRCUITS
/DB41-/DB71: INPUTS TO LOAD STATE REGISTER
/SUPWT:      PROCESSOR WRITE STROBE
BRST:        SYSTEM RESET IN
/SUPRD:      PROCESSOR READ STROBE
/OE:         OUTPUT ENABLE FOR REGISTER BITS--TIED TO READ STROBE

TITLE       PROJECT HECTOR SYSTEM SUPERVISOR

PATTERN     X4

REVISION

AUTHOR      DOUG WIDNEY

COMPANY     DATA EXCHANGE CORPORATION

DATE        3 NOVEMBER 1987

CHIP        U16     PAL20RS4

CK STATFLT M1RDTA PWROK /DB4I /DB5I /DB6I /DB7I /SUPWT BRST /SUPRD GND
/OE DNEPRG MORTRG 24VEN /DB70 /DB60 /DB50 /DB40 DB30 CCLK /LOARST VCC

; THE FOLLOWING REPRESENT MINTERMS FOR EACH STATE.

```
STRING RESET        ' (/DB70 * /DB60 * /DB50 * /DB40)'
STRING LTRG         ' (DB70 * DB60 * DB50 * DB40)'
STRING LOAD         ' (DB70 * DB60 * DB50 * /DB40)'
STRING WAIT         ' (DB70 * DB60 * /DB50 * /DB40)'
STRING RUNE         ' (DB70 * /DB60 * /DB50 * DB40)'
STRING RUND         ' (DB70 * /DB60 * /DB50 * /DB40)'
STRING RTRG         ' (DB70 * /DB60 * DB50 * DB40)'
STRING READ         ' (DB70 * /DB60 * DB50 * /DB40)'
STRING PPF          ' (/DB70 * DB60 * DB50 * DB40)'
STRING LPF          ' (/DB70 * DB60 * DB50 * /DB40)'
STRING STATF        ' (/DB70 * DB60 * /DB50 * /DB40)'
```

; THE FOLLOWING REPRESENT UTILITY MACROS FOR INTERMEDIATE TERMS IN EXPRESSIONS.

```
STRING DB7SET       ' (SUPWT * /DB7I + /PWROK + /SUPWT * RUNE * STATFLT)'
STRING DB7RST       ' (SUPWT * DB7I + PWROK)'

STRING DB6SET       ' (SUPWT * /DB6I * PWROK)'
STRING DB6RST       ' (SUPWT * DB6I + /PWROK + /SUPWT * RUNE * STATFLT)'

STRING DB5SET       ' (PWROK * (SUPWT * /DB5I + /SUPWT * (LOAD * DNEPRG + RUNE * STA
TFLT)))'
STRING DB5RST       ' (SUPWT * DB5I + /PWROK)'

STRING DB4SET       ' (PWROK * (SUPWT * /DB4I + /SUPWT * (PPF * PWROK + RUNE * STATF
LT)))'
STRING DB4RST       ' (SUPWT * DB4I + /PWROK)'
```

EQUATIONS

; THE FIRST GROUP OF EQUATIONS COMPRISES COMBINATIONAL OUTPUT DECODES.

```
LOARST          = BRST + RESET + PPF + LPF
CCLK            = READ + SUPRD
CCLK.TRST       = DNEPRG
DB30            = /M1RDTA
DB30.TRST       = SUPRD
24VEN           = RUNE + RUND
MORTRG          = /RTRG
DNEPRG          = /LTRG
DNEPRG.TRST     = LTRG
```

; THE SECOND GROUP OF EQUATIONS COMPRISES NEXT-STATE DECODES.

```
/DB70      := BRST + DB70 * DB7SET + /DB70 * /DB7RST

/DB60      := BRST + DB60 * DB6SET + /DB60 * /DB6RST

/DB50      := BRST + DB50 * DB5SET + /DB50 * /DB5RST

/DB40      := BRST + DB40 * DB4SET + /DB40 * /DB4RST
```

Appendix C

Xilinx LCA P6650.LCA 2018PC84
File P6650.rbt
10:11:22 SEP 1, 1988
10:11:22 SEP 1, 1988
Source
Version

```
Produced by XACT version 2.01
11110010000000000100010111101101111
01110111111011111111100111011111111111111100111110111111101111101111111
1111111111
01101101111110111111100111110111111111111110101011111011111101111101111111
11101111111
0111111111111101111101011110010011110111111101101010111101101110111001101110
11001111111
0111111111111101101011111111111111111111011111111111111111111011011111111
1111111111
01111111111111011111110111111101111001011111101111111101111110110011011111110
01101111111
01111111111011111111101111111011111011111111110111101111111011101111011111101
1111111111
00111110111100111101011101101111111110111111111101111111111111111111111111111
1111111111
001111111111110111111011111111111111101111111111101110111110111111100111111111
1111111111
0111011101111111110111111101111111111111101111111111101111111111111101111011011
1111011111
0101110111111101011001101100111011111111110111101011111100011111111111
11010111111
011111110111111011110110111111111011111110111111110111111111111011111111111111
11011111111
011111111111110101101101011111110111111111111111111110110111111111
11101111111
011011110111111011111101101111111111111111101111111111111111011101110111111111
11111111111
001101111111111111101110111111111111111011111111111111111111011011111011011111
11111111111
01111001110111011011111111111100111111111101011110111101001111111111111011
11011110111
00111011011010110111010111111110200111110111011101101101111111111110
01111101111
01111111111111010111111101111111111100111101111111111111111011111111010011
11110111111
011101111101110101100111011101111111110111111111111111111111110101111101101011
11011111111
001111111111111111111

```
01111011111111111111110101111111111110001011011101111111111111111110111
11011111111
00111111101111111101111111101011101111101011111111011111111111110111111011
11111110111
00211111110111101101100010011101111111111111101011101111011111111111001111
01111111111
01111101111001101111011111100111011111111111101110110001110111111111111111
110101111111
0111101111111011111110111101110111101111011111111011111110111111011111010111111
1111111111
00111111110100110111111010110111111111111111101111111011111110101111111101111
11111111111
001001111111011100010111111101111110111110101111111111111111111110111110011111111
11110010111
011111100110101001111101001110100100111110011001101011011111100111001011
100111110111
001100110111010111111111111111101111111111101111111111100111111111111111111111011
11010111111
0111101110111110110111110111111111111101111011111111111111111111111111
01111111111
0111111111111111111111110111110111111111110111111111111111111111111111011111
0101111111
0110111101111111011101101111111111111011111111111111111111111111111111
11111111111
01111110111111011111111111111111101111111111111111111101111110111111101111111011
11111111111
01111110111111101111111110111111111101101111111111111111111011111110121111011
1111001111
011101111111111111111111011111111111111111111111111111111111111111110111011
11111111111
01111111111111111111111011101101111111111111110111111110111111111011111101111111110
10111111111
0111111101111110110111111011111111101111111111111111111111111111111111110
01111111111
001111111111111111111111111111111111011111111111111111111111111111111111
10111111111
01111011011111101111111011111111011111011111111111111111111111111111111110
1001111111
000011111111111111001111111011111110111101111111111011111111111111110111111111110
11111101111
0111010111110010111101111111110111110111111111111111111111111111111111
01111111111
01110001011010001011101101111110

```
01111001101111011001101100011011111110111111110111111111101111111110
11011111111
00111011111111110111101011111101011111111111111111111111111111111110
11111110111
01110111111111110011010111110110101011011111111111111111111011111110
1111111111
00111111101111111111101011111111111110111110111111111111111111111111
1111111011
00111011101101111110111111101111110110101111111111111111111111110111
01011110111
01111011011110110101111111000111110111101111111111111111111111111110
11011111111
01110111111101111111111110111011111011111110111110111110111111111101
1111111111
00111011101111111110111111111111111111011111110101111111101111111111
11101110111
00101011111101111011111111101011111011111111010111110101111111111100
11111110111
01110010111111000011101011010100111011101111011110111111111111111111
10011001111
01111010001111011111111111011101111111111111111111111111110111011111
11111100111
01011010110111111110100111110101111100111111111110111111111111111110
11111001111
00011011011111111110111111100111011111111001111111111111111111111110
1111111111
01101101011111011110101111111101110111011110111111111100101111101101
11011110111
01111111101111111111111111111110110111011111111101011111111010111
11111110111
01110101111111111110111111111111110111101101101111101110101111011110
11111101111
01110011101111111111111011011111111011111111111111111111110101111110
1111111111
00011100011101111011101111111011111111110101111111111110101111011111
01111110111
01111111010011110101111110011111011111011111011011111111100110101111
01111101111
0011101110111110111101111101111011111011111010111111111111111010110
11111110111
01110101110111111111111101101111010101011111011111111110101011101111
1111111111
0001111101111111111111101011101111111111111111111111110111111111111
1111111111
00101101101110111101100100111100101100100111011111111111111100111110
01111110111
01110110101100101101011110111111111111111101111111101010110111011111
01011110111
01110111111011111111101111011111111110101111111111111111111011111111
1111111111
00111111011001111111111101110111101111011111111111101111111001111110
11011111111
00111111111011111111111101011000111111111111111111110111110011111100
1111110111
00110100110111001111011111110111101111011011101111111101001111011111
10111110111
01111110111111111001111111011011111011111111111101011111111110111
10111111111
0111111101111011101111111101111111110111011111111110111101111011110
11101111111
0111001111011111111111110111111011111111111111110111111111111111111
1111111111
01110101111111110111111101111011111111101111101011111111101111011011
1111111111
00111111111111111111110111111111111101011110111101011110111111111111
1111111111
01111111110111111111111111110110111001101101111110111011111101011
11101011111
0101101111101110110111010111111101111111011111111110111101111101011111
1111111111
00110101111011111011111101111111110101111011111111111110111111111111
1111111111
```

```
0101101100101001101010011011111111101110111011111111111111100110111111111111
1111111111
0011101100111011101110111011111110101011111101110111111111111011111110001111
1111110111
0111101110111111111011111111110111111011100111011111111111111111011101011111
1111111111
0001111111111111110111111110111111011111111111111111111111011111111111111111
1111110111
0111001001010011011110111111101111110011010100110011111111001101110111111111
11101111111
0111100101111111011110110111110101110010111101100110111110101101111011111111
1111111111
0111111101101110010111110101110110101111010111111111111111101111101111111111
1111111111
0011111101110111011111111001011111111110111111111111111111111111011111101110111
1111110111
0011111111011101111111111111111011101001111111111111111111111111111101111101
1111110111
0111010011110001011100111101001111100100111001011111110111100101110111111
1111101111
0111001111111111111111111011111111111111111111111111111111111111110111111111111
1111001111
0111111111101110101101101111111110111111111101111111111111011111111101111111
11101011111
0111101111111011111110111111111111111111111110111111111111111111111111011111
1111111111
0011101111110111111101111011111111011111111111101111111111111111111111111111
1111111111
0111111111111110111110111111011111111111111111111111111111111111111111111111
1111111111
0110111101111111011111110101111111111101111111111101111111111111111111111111
1111111011
0111101110111111010111111111111110110101111111111111111111111111111111111011
1111111111
0101111101101110011111111111111111111111111111011111111101111111111111111111
11110111111
0111111111111111111111110111111111101111010111111111111111111111111111111111
1111111111
0111111111111110011111101110111111101001111101111111111111111111111111111111
1111111111
0111111101110011010110111111101111111000101111111111111111111111111111111111
1111111111
0011111111110111110101111111111111111110111111111111111111111111111011111111
11111110111
0111101101111011110101111111011110001101101111111111110111111101111111111111
11111101111
0010111111111111011111110110111101011111111111111101111111111111111111111111
1111110111
0111101111100111111101011111110111101111111111111111111111111111111111111011
1111110111
0111001011100101110110111111010111101011101111111111111111111111111111111111
1111111111
0111001111110011110110111101111111111111111011111111011111111011111111011111
1111111111
0011101111110111111101111111111110111101101011111111111111111111111111111111
1111111111
0011101111110111011111111110110111011011

|  171  |  172  |
|---|---|

```
0111111111111101111111111111111111111111101111011101110111011101111011101111111
1111111111
0001111111111011111111111111111111111111111111111111111111111111111111011101010
0111111011
0111111111101101111111111111111111111011011111101101111001101111111111110
0111110111
0111111111110001011111111111111111111111110110111011111111111110111011111111111
1111111111
0111101110101110111101111111011011110111111111011111111101111011111111101110
1111111111
0011111110011111111111011111111111111111111111110111111111111111111111111
1111110111
0111101101111011011100110111100110111111111111111110100110011101101111110
1111111111
0111101011111111111101111011101110111010111101111101110111011101111111111110
1101111111
0111101111101111111111111110111011111011111111111111111111011111011101111110
1100111111
0111121100111011101111011101110111111111111111111111011101110111111111111010
1111110111
00101111111111111110111110111011011111011111110111110110110110101100110111110
1111110111
00111010111101011111100111111001100101111011111101111101101101101111111110
1011101111
0111101111111011111110111011111111110111111011111111011111111110111111111111111
0011110111
010111010111001111111111111011011101111111011110011111111101111111111111
1111111111
0111001111111111111111111111110011111111111111111011111011110111110111100.11101
1101101111
0101111111111011111111111011011101111011111111111111111111111111011011110111111
1111111111
0010111011111111011111111111111011111111111111101111011111011110111111111111
1111111111
01111111111111111111111110111111011101111111111111111111111111111111111111
1111111111
0110111011111111110111101111011111011111111111111111111011110110111111010
1101111111
0011111111101111111011110111011110000111111110111101011110111111111111111
1011111111
0101101101111111111111111100111111111111111101111011111000110101111111
1011111111
0011110001111111111111111111111111110301111111111010111011110111010111
1111111111
0111101011011111101111110110111110101111011111111101011110110111111111110
1111111111
00111110111111111111111111101111011111111111111111110111111111111111111111
1111110111
001110101101111101111001011110101101011111111111100101111011111110000111
1111111111
0111111110111111111111110101111011111111111111111110111111111101111011110
1101101111
0111111111111111111101111111111101110111011111111111111011111111101011111101
1111111111
0011101111110111111101111111111011111011111111101111111011111111001111111
1111101111
00101011111011111110011111110111111011110111111110100110110111111011111110
1111110111
0101101011011111010111100111011111101111011111111110011101101110001101111111
1001110111
01011111011111111111101111111011111011111111112111101111101111111110111
1111111111
0111000111111111110001110100011111101111111111101101110111111110110111
0111110111
0111111111110011110111011111111110111011100111101011111101101111110111110
1101111111
0111100101111111010111110111110111101011111101111100111110011111111010110
1111110111
0111101111101111111111111111111111111111111111111011011101110100111110110
1111110111
0111111111110110111111111111111101111010110111011111110111111111111111
1111111111
```

```
0111111111101101111111110111111111011101101101111110111111111101011111111010
1111110111
0111011111111111111111111111111111111111011111111000111100111111011110
11011110111
01111000101100111111111101111111111011111111011111111011111110010011111110
10111110111
01111110111010111111101111111011111010111111011111101110111111001111111011
11111110111
0111101111110110101110101111101011111110111111101111101111111011101110111100110
1111111111
0011111111111111111111111011101111111111111111110111111111111111111111111111
11110110111
0111101111110011011101111110011101100111111010011110111011100111101100110
01111110111
011111110101101111111011111111001111111111111111111110001011100101111011111
11011111111
011111111111011111100111110101111011111111001111110101111111011111001111111
1111111111
001110111111011101111111111011111110111111011111111011111111111111101111110
11101110111
001110110111101111111111111101111110011101101111111111101111111011110111100
11011110111
010111101111110111100101111101011111101111111011111110011111000111011111
10101110111
01011101111111111111001111111111111111101111101110110111101111011111112010111
00110111111
01110101110111001111111111111100111111011111100111111010100111111111111110
1111111111
001111111111101111111111111111111111111111111111111111111111111111111111111
1111111111
0011111101110110111101001111110011111011111010011111100111010011101001110
10111111111
011111111111011111110111111011111111111111111111111111111101111101111111101
11011111111
1111
```

Appendix D
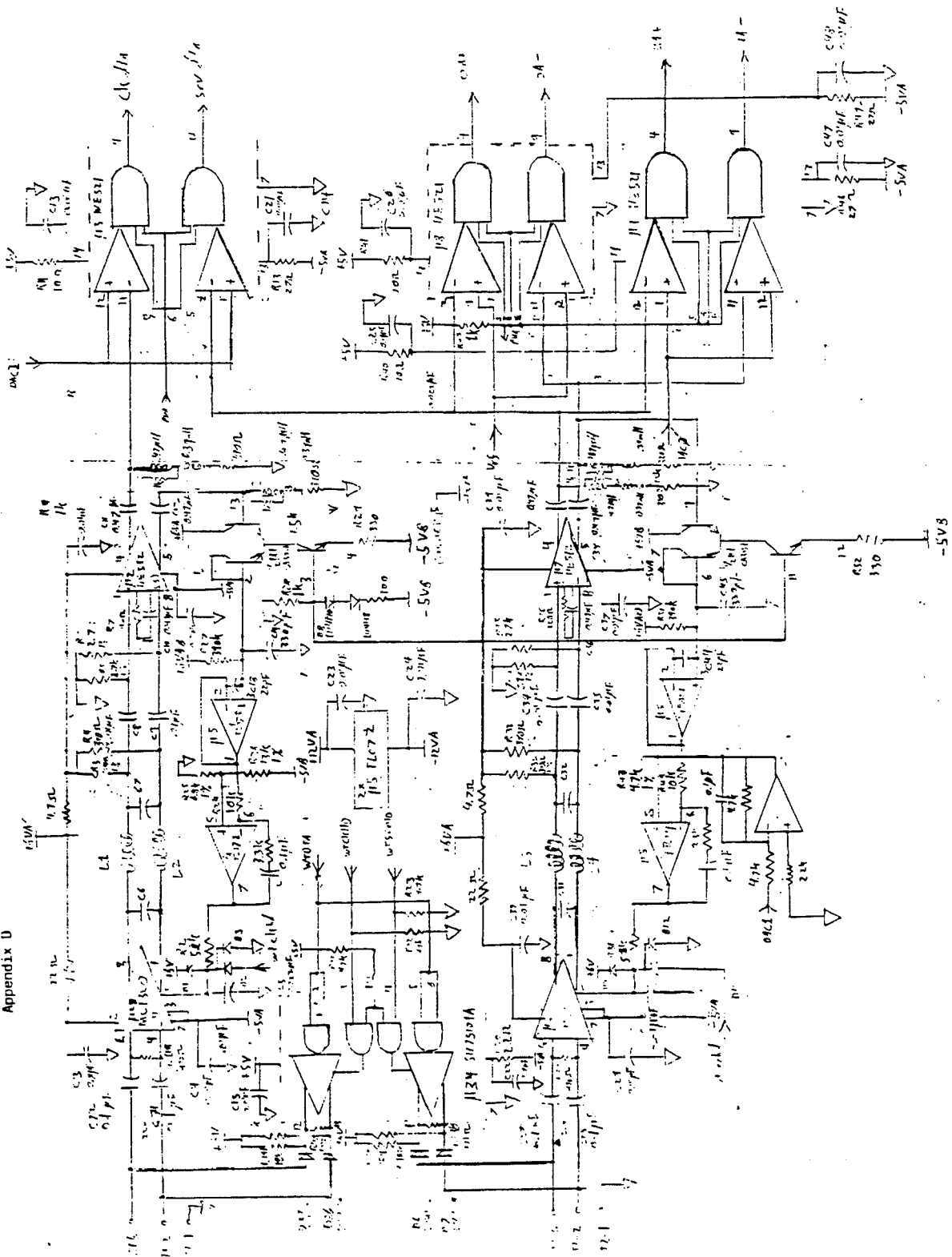

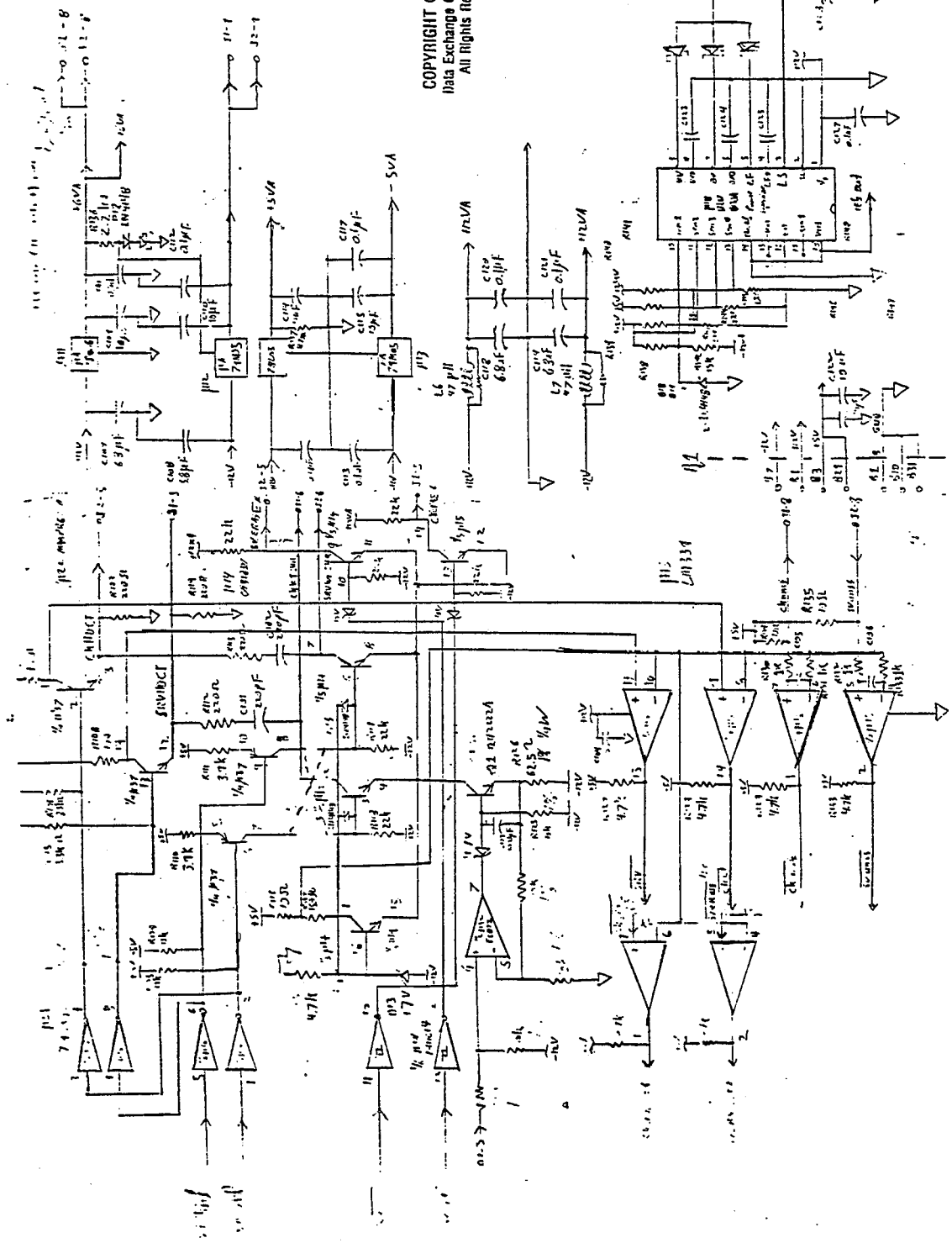

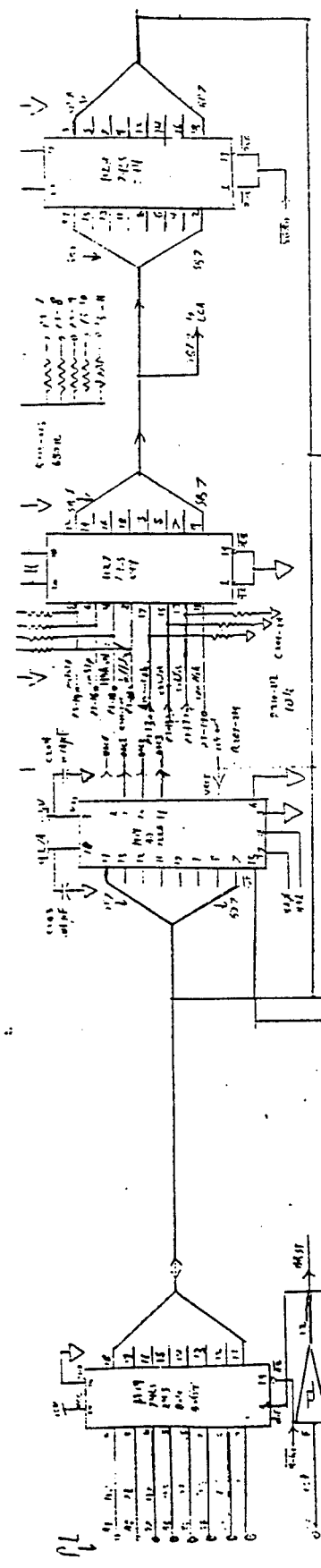

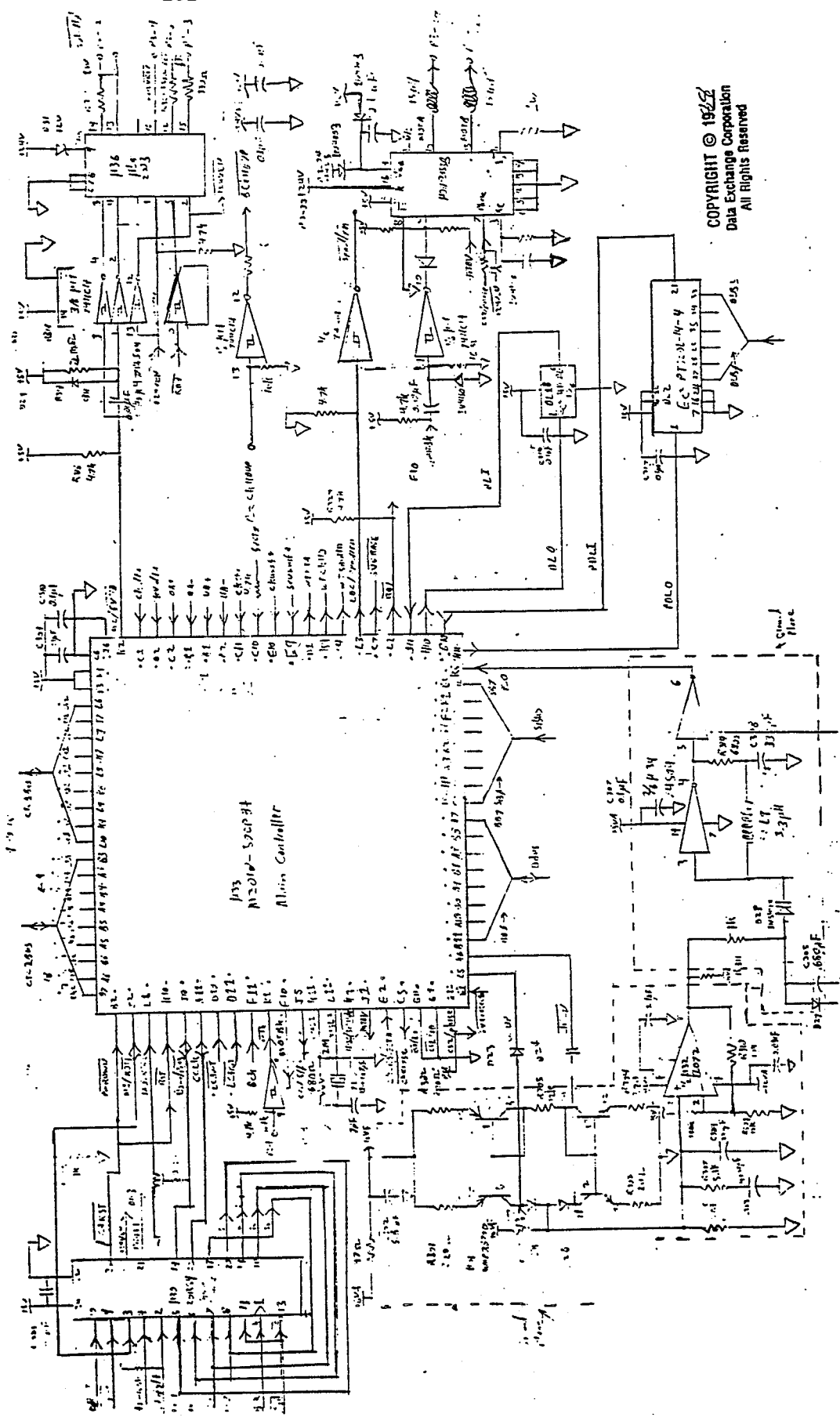

I claim:

1. A configurable servo pattern writer for writing a selected servo pattern composed of a plurality of servo pattern types which are to be written in a selected order onto a magnetic disc of a magnetic disc drive data storage device, comprising:
   (a) clock signal producing means for providing a plurality of clock signals which bear a fixed relation to one another and which differ form one another with respect to one of frequency and phase;
   (b) pattern type control signal generating means for producing control signals representative of a desired servo pattern type;
   (c) a programmable gate array composed of a plurality of logic gates and programmable interconnection means for interconnecting said logic gates in a logic pattern in response to program signals, said programmable gate array having a plurality of signal inputs connected to receive the plurality of clock signals and the control signals and a single data output for providing an output signal dependent on the clock signals, the control signals and the logic pattern in which said logic gates are interconnected;
   (d) a servo read-write head having a signal input connected to said data output of said gate array and constructed for writing upon a magnetic disc a servo pattern corresponding in form to the output signal provided at said output of said gate array; and
   (e) means for storing, and applying to said interconnection means, a logic gate interconnection program which defines an interconnection of said logic gates in a pattern for giving the output signal at said data output of said gate array the form of the selected servo pattern.

2. The configurable servo pattern writer of claim 1 wherein the clock signals provided by said clock signal producing means include three different clock signals all of which have the same frequency, and wherein a first and a second one of said three clock signals differ from one another in phase and the third one of said three clock signals has a pattern different from that of the first and second clock signals.

3. The configurable servo pattern writer of claim 1 wherein the means for storing further stores a logic function program, and said logic gates include programmable logic blocks for implementing selected logic functions in response to the logic function program so that the output of the logic gates is the selected servo pattern.

4. The configurable servo pattern writer of claim 3 wherein the programmable logic blocks are arranged in an array and the programmable interconnection means comprises a first plurality of connecting lines disposed in the array, a second plurality of connecting lines disposed in the array and a plurality of switching matrices for selectively interconnecting connecting lines of the first plurality to connecting lines of the second plurality in response to the logic gate interconnection program.

5. The configurable servo pattern writer of claim 4 wherein the plurality of logic gates and programmable interconnection means comprise a logic cell array integrated circuit chip.

* * * * *